(12) United States Patent
Okugi et al.

(10) Patent No.: US 8,054,201 B2
(45) Date of Patent: Nov. 8, 2011

(54) SURROUNDINGS MONITORING DEVICE FOR VEHICLE

(75) Inventors: Tomokazu Okugi, Yokohama (JP);
Masaki Chiba, Yokahama (JP);
Kazuyuki Okuda, Yohohama (JP);
Yuka Ohe, Hatsukaichi (JP)

(73) Assignee: Mazda Motor Corporation (JP)

( * ) Notice: Subject to any disclaimer, the term of this patent is extended or adjusted under 35 U.S.C. 154(b) by 380 days.

(21) Appl. No.: 12/350,480

(22) Filed: Jan. 8, 2009

(65) Prior Publication Data

US 2009/0237269 A1 Sep. 24, 2009

(30) Foreign Application Priority Data

Mar. 19, 2008 (JP) ................. 2008-071870
Mar. 19, 2008 (JP) ................. 2008-071871
Mar. 19, 2008 (JP) ................. 2008-071872
Mar. 19, 2008 (JP) ................. 2008-071873
Mar. 19, 2008 (JP) ................. 2008-071874

(51) Int. Cl.
*G08G 1/00* (2006.01)

(52) U.S. Cl. .............. 340/901; 340/903; 382/104

(58) Field of Classification Search .......... 340/901, 340/903, 933, 988; 382/103, 104, 106; 348/47, 348/118, 119, 148, 837; 180/169
See application file for complete search history.

(56) References Cited

U.S. PATENT DOCUMENTS

| | | | |
|---|---|---|---|
| 7,190,282 B2 * | 3/2007 | Maemura et al. | 340/903 |
| 7,218,758 B2 * | 5/2007 | Ishii et al. | 382/104 |
| 7,400,233 B2 * | 7/2008 | Kondo | 340/435 |
| 2006/0192660 A1 * | 8/2006 | Watanabe et al. | 340/435 |
| 2007/0003162 A1 * | 1/2007 | Miyoshi et al. | 382/276 |
| 2007/0053551 A1 | 3/2007 | Kubo et al. | |
| 2009/0005961 A1 * | 1/2009 | Grabowski et al. | 701/200 |
| 2009/0102858 A1 * | 4/2009 | Eggers et al. | 345/617 |

FOREIGN PATENT DOCUMENTS

| | | |
|---|---|---|
| DE | 10 2006 012 773 A1 | 11/2006 |
| EP | 1 642 770 A2 | 4/2006 |
| FR | 2 845 331 A | 4/2004 |
| JP | 11-338074 | 10/1999 |
| JP | 2007-172462 | 5/2007 |

OTHER PUBLICATIONS

The partial European search report issued on May 13, 2009 for Application No. 09003114.7-2421.

* cited by examiner

*Primary Examiner* — John A Tweel, Jr.
(74) *Attorney, Agent, or Firm* — Studebaker & Brackett PC; Donald R. Studebaker

(57) ABSTRACT

A real-image picking-up means picks up a real image of a blind area. A moving object detecting means recognizes a moving object from the real image and detects a moving state of the moving object. An imaginary-image specifying means specifies an indication manner of an imaginary image which is to be indicated for showing the moving state of the moving object. An indicating means indicates the imaginary image of the moving object in the indication manner which is specified by the imaginary-image specifying means such that the imaginary image of the moving object indicated by the indicating means overlaps the real image picked up by the real-image picking-up means. There can be provided a surroundings monitoring device for a vehicle which can easily recognize the state of the moving object in the image of the blind area.

14 Claims, 42 Drawing Sheets

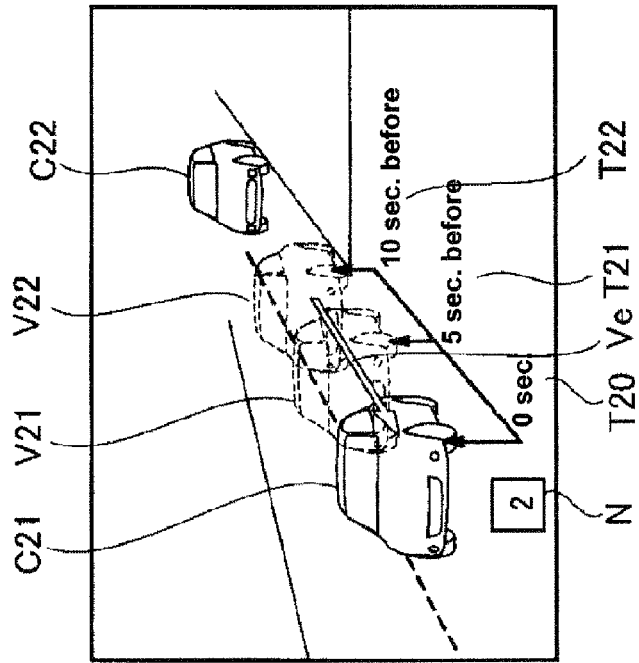
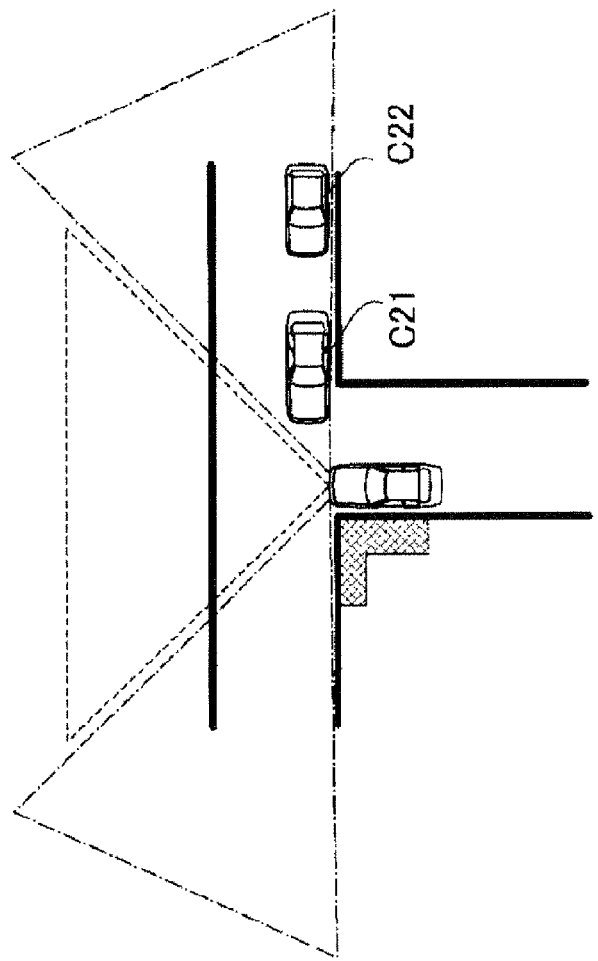

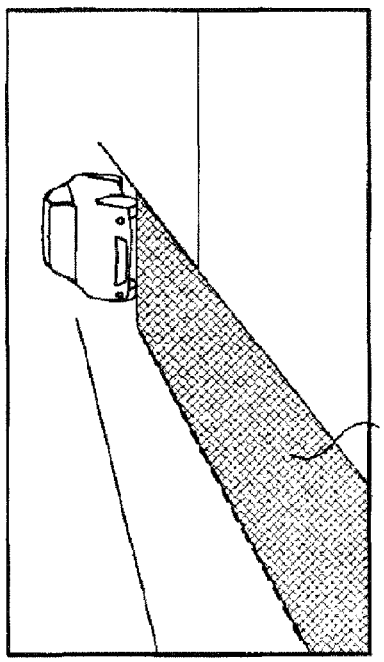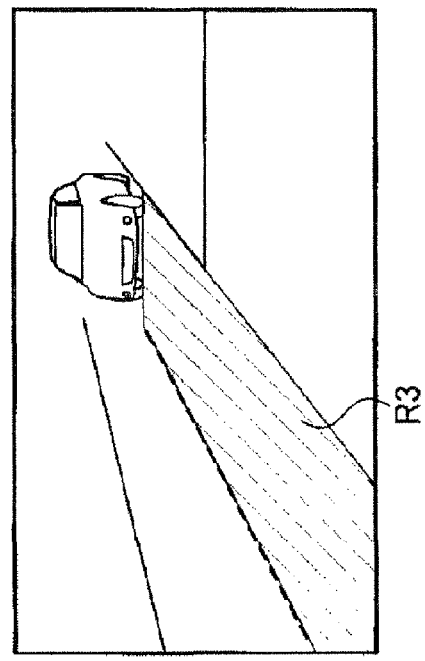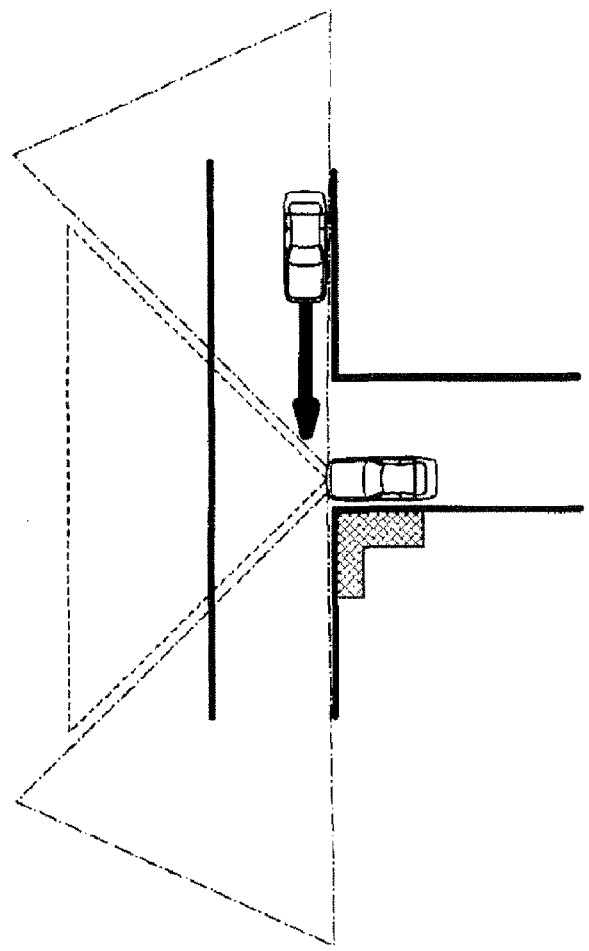

Real Image | Compensative Image

SURROUNDINGS MONITORING DEVICE FOR VEHICLE

BACKGROUND OF THE INVENTION

The present invention relates to a surroundings monitoring device for a vehicle, and particularly relates to a surroundings monitoring device for a vehicle which monitors a blind area of a driver.

Conventionally, a device which picks up an image of a blind area in front of a vehicle on its both sides and conducts a monitor indication is known (see Japanese Patent Laid-Open Publication Nos. 2007-172462 and 11-338074, for example). In the above-described device, the blind area on both vehicle sides is merely indicated on the monitor. The driver may recognize a state of the blind area from the monitor. Herein, in case there is a moving object, such as another vehicle, which approaches, it may be difficult for the driver to differentiate the approaching moving object from a stationary object and to recognize the distance from the vehicle to the moving object or the moving speed of the moving object.

SUMMARY OF THE INVENTION

The present invention has been devised in view of the above-described problem of the conventional device, and an object of the present invention is to provide a surroundings monitoring device for a vehicle which can easily recognize the state of the moving object in the image of the blind area.

According to the present invention, there is provided a surroundings monitoring device for a vehicle, which monitors a blind area within an area expanding in front of a driver on both sides, comprising a real-image picking-up means provided at a front portion of the vehicle so as to pick up a real image of the blind area, a moving object detecting means operative to recognize a moving object from the real image picked up by the real-image picking-up means and detect a moving state of the moving object, an imaginary-image specifying means operative to specify an indication manner of an imaginary image which is to be indicated for showing the moving state of the moving object detected by the moving object detecting means, and an indicating means operative to indicate the imaginary image of the moving object in the indication manner which is specified by the imaginary-image specifying means such that the imaginary image of the moving object indicated by the indicating means overlaps the real image picked up by the real-image picking-up means.

According to the above-described present invention, since the imaginary image of the moving object is indicated in the indication manner to show its moving state such that the imaginary image overlaps the real image, the driver can easily recognize the moving state of the moving object. As a result, differentiation of the moving object from the stationary object and recognition of the moving state of the moving object in the image of the blind area can be made easy.

According to an embodiment of the present invention, the imaginary-image specifying means is configured to specify the indication manner of the imaginary image of the moving object such that the imaginary image of the moving object is indicated at an arrival position where the moving object is predicted to arrive after a specified time on an extended line of a moving direction of the moving object. Thereby, the driver can intuitively recognize the position of the moving object after the specified time, so that, for example, the driver can determine easily whether the vehicle may be started or not.

According to another embodiment of the present invention, the imaginary-image specifying means is configured to specify the indication manner of the imaginary image of the moving object such that the imaginary image of the moving object is indicated as an afterimage at plural positions where the moving object has actually passed. Thereby, the driver can intuitively recognize the moving state of the moving object up to the present time, so that, for example, the driver can determine easily whether the vehicle may be started or not.

According to another embodiment of the present invention, the indicating means is configured such that an indication size of the imaginary image of the moving object to be indicated thereby changes in accordance with the distance to the moving object from the vehicle in such a manner the indication size is enlarged in case the distance to the moving object is greater than a specified distance. Thereby, the driver can easily recognize the moving state of the moving object which is located far away from the driver's vehicle.

According to another embodiment of the present invention, the imaginary-image specifying means is configured to specify the indication manner of the imaginary image of the moving object in case of the moving object detecting means detecting plural moving objects such that only the imaginary image of a specified moving object which is the closest to the vehicle or whose arrival time to the vehicle is the shortest is indicated. Thereby, the moving state of the moving object which the vehicle may possibly crash against can be recognized surely.

According to another embodiment of the present invention, the imaginary-image specifying means is configured to specify the indication manner of the imaginary image of the moving object such that an imaginary road image which is to be indicated for showing the moving state of the moving object is indicated in front of the moving object moving. Thereby, the direction where the moving object exits and the moving state can be recognized surely.

According to another embodiment of the present invention, a real object which is memorized, a size of which is known, or a real object which exists within a range of vision of the driver are captured as an imaginary image, and the imaginary-image specifying means is configured to specify a position of the imaginary image of the real object such that the imaginary image of the real object is indicated beside the moving object so as to be located at a roadside. Thereby, the driver can recognize the sense of distance to the moving object precisely.

According to another embodiment of the present invention, the surroundings monitoring device for a vehicle further comprises a real-image memorizing means operative to memorize the real image picked up by the real-image picking-up means, an imaginary-image creating means operative to create an imaginary image of an area which is blind for the real-image picking-up means from the real image which has been memorized by the real-image memorizing means, and a memorized-image moving-object detecting means operative to detect a moving object from the real image memorized by the real-image memorizing means, wherein the imaginary-image creating means is configured to create the imaginary image of the moving object at a point before a view of the moving object is interrupted by an obstacle, and the indicating means is configured to indicate the imaginary image of the moving object which is created by the imaginary-image creating means when the view of the moving object is interrupted by the obstacle. Thereby, the driver can recognize the existence of the moving object which the vehicle may possibly collide against.

According to another embodiment of the present invention, the above-described imaginary-image creating means is further configured to create the imaginary image of the obstacle within the real image picked up by the real-image picking-up means in such a manner that an area behind the obstacle is visible through the imaginary image of the obstacle, and the indicating means is configured to indicate the imaginary image of the obstacle so as to overlap the imaginary image of the moving object indicated. Thereby, the driver can recognize the existence of the moving object more effectively.

According to another embodiment of the present invention, the above-described imaginary-image creating means is further configured to create the imaginary image of the obstacle within the real image picked up by the real-image picking-up means in such a manner that the position of the imaginary image of the obstacle created is off set from the actual position of the obstacle such that the area behind the obstacle is visible beside the imaginary image of the obstacle, and the indicating means is configured to indicate the imaginary image of the obstacle and the imaginary image of the moving object side by side. Thereby, the driver can recognize the existence of the moving object more effectively.

According to another embodiment of the present invention, the surroundings monitoring device for a vehicle further comprises an imaginary light-source setting means operative to set an imaginary light source for making an imaginary shadow for the moving object, and an imaginary-shadow-image creating means operative to create an image of the imaginary shadow which is made for the moving object when the moving object is lighted with the imaginary light source set by the imaginary light-source setting means, wherein the above-described indicating means is configured to indicate the created image of the imaginary shadow for the moving object in such a manner that the imaginary-shadow image is attached to the moving object indicated. Thereby, the driver can see the imaginary shadow image of the moving object within the mage of the blind area, and therefore intuitively recognize the sense of the distance to the moving object or the sense of the length of the moving object.

According to another embodiment of the present invention, a position of the imaginary light source set by the imaginary light-source setting means is set to be a position which substantially corresponds to the position of the sun. Thereby, the sun is set as the imaginary light source, so that the driver can more intuitively recognize the sense of the distance to the moving object or the sense of the length of the moving object.

According to another embodiment of the present invention, a position of the imaginary light source set by the imaginary light-source setting means is set to be a position which is a specified distance away from an intersection which the vehicle approaches and a specified height above a surface of a road on which the vehicle travels, the specified distance being long enough for the driver to determine that the vehicle is to be started or stopped when another vehicle approaches the vehicle. Thereby, the driver sees the imaginary shadow image of the moving object, considering the position of the imaginary light source, and therefore precisely recognizes the sense of the distance to the moving object or the sense of the length of the moving object. Further, the driver sees the imaginary shadow image of the moving object, considering the standard of the position which is the specified distance which may allow the driver to determine that the vehicle is to be started or stopped when another vehicle approaches the vehicle. Accordingly, the above-described determination by the driver can be made properly safe.

According to another embodiment of the present invention, the indicating means is configured to change an indication manner of the imaginary-shadow image in accordance with a traveling location of another vehicle relative to the position which is the specified distance away from the intersection. Thereby, since the indication manner of the imaginary-shadow image is changed when another vehicle has passed the specified distance away from the intersection, the driver can more precisely recognize the sense of the distance to the moving object or the sense of the length of the moving object.

According to another embodiment of the present invention, a state of the moving object which includes at least one of the kind of the moving object, a moving speed of the moving object, and a moving direction of the moving object is configured to be detected, and the indicating means is configured to change an indication manner of the imaginary-shadow image in accordance with the state of the moving object. Thereby, the driver can get the information (kind, moving speed, and moving direction) of the moving object from the imaginary shadow image, and therefore more precisely recognize the sense of the distance to the moving object or the sense of the length of the moving object and the state of the moving object.

According to another embodiment of the present invention, the surroundings monitoring device for a vehicle further comprises a grid-image creating means operative to create an imaginary grid image for giving a sense of the width of a road to the blind area picked up by the real-image picking-up means, and an imaginary-grid image specifying means operative to specify a size, and a shape and a direction of a grid of the imaginary grid image in accordance with the real image of the blind area picked up by the real-image picking-up means, wherein the above-described indicating means is configured to indicate the imaginary grid image so as to overlap the real image with the size, the shape and the direction specified by said imaginary-grid image specifying means, there is further provided a moving-object-state detecting means operative to detect a position and/or kind of the moving object when the moving-object detecting means detects the moving object, and the indicating means is further configured to indicate a luminous point which makes the position and/or kind of the moving object recognizable so as to overlap the imaginary grid image. Thereby, the driver can recognize the position and/or the kind of the moving object easily.

According to another embodiment of the present invention, the surroundings monitoring device for a vehicle further comprises a grid-image creating means operative to create an imaginary grid image for giving a sense of the width of a road to the blind area picked up by said real-image picking-up means, and an imaginary-grid image specifying means operative to specify a size, and a shape and a direction of a grid of the imaginary grid image in accordance with the real image of the blind area picked up by the real-image picking-up means, wherein the indicating means is configured to indicate the imaginary grid image so as to overlap the real image with the size, the shape and the direction specified by the imaginary-grid image specifying means, there is further provided a moving-object-state detecting means operative to detect at least one of a kind, a moving speed and a moving direction of the moving object when said moving-object detecting means detects the moving object, and the indicating means is further configured to indicate an arrow which makes the moving speed and/or moving direction of the moving object recognizable so as to overlap the imaginary grid image. Thereby, the driver can recognize the moving speed and/or the moving direction of the moving object easily.

Other features, aspects, and advantages of the present invention will become apparent from the following description which refers to the accompanying drawings.

BRIEF DESCRIPTION OF THE DRAWINGS

FIG. 11A is a diagram showing an example of the scope of the image picked up by the camera of the surroundings monitoring device for a vehicle and the moving object, and FIG. 11B is a diagram showing an example of the image in which an imaginary image overlaps a real image according to the second embodiment of the present invention.

FIG. 16A is a diagram showing an example of the scope of the image picked up by the camera of the surroundings monitoring device for a vehicle and the moving object, FIG. 16B is a diagram showing an example of the image in which the imaginary image overlaps the real image, and FIG. 16C is a diagram showing an example of the image in which the imaginary image overlaps the real image according to the third embodiment of the present invention.

DETAILED DESCRIPTION OF THE INVENTION

Figure 1:
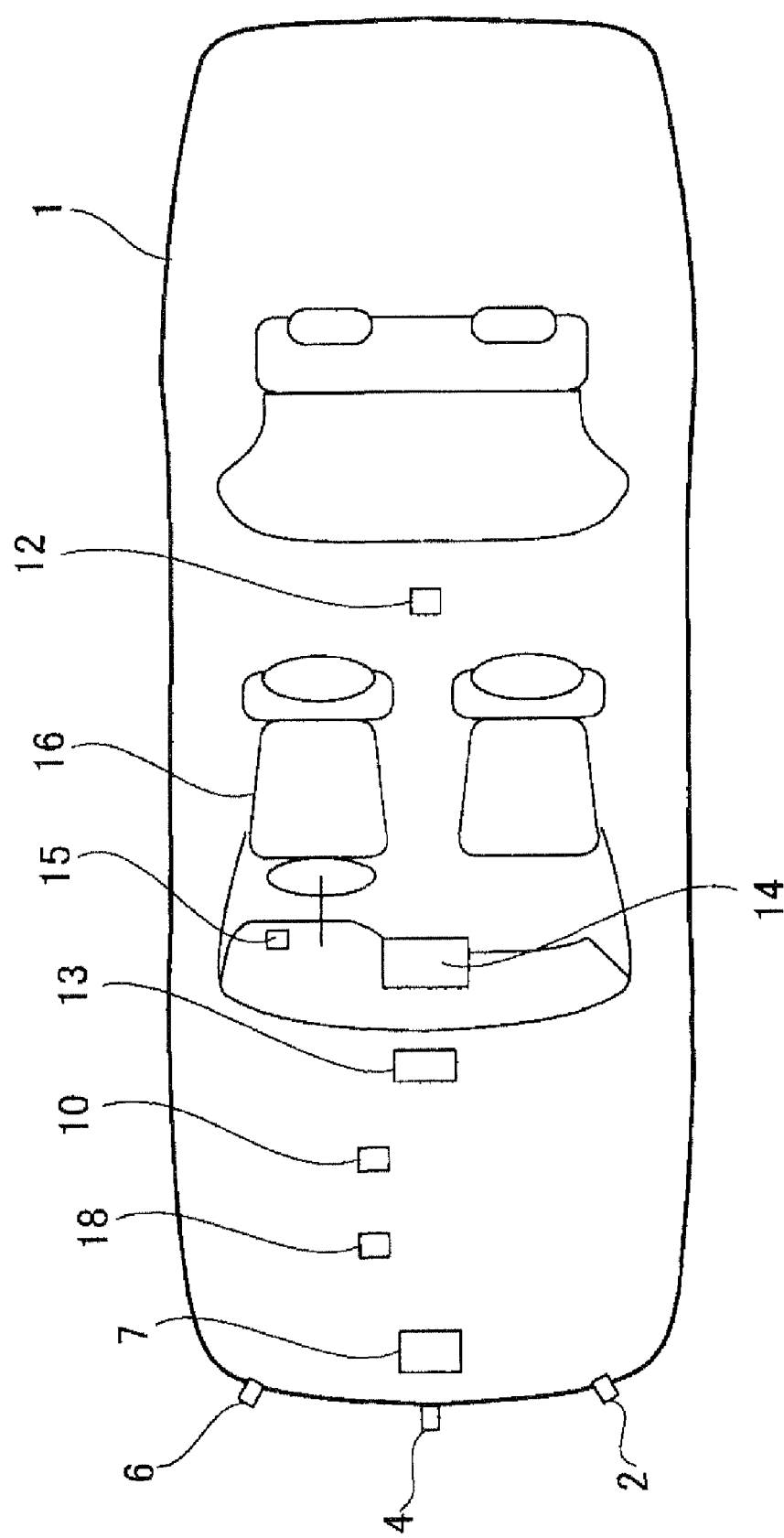
FIG. 1 is an entire constitution diagram of a vehicle to which a surroundings monitoring device for a vehicle according to embodiments of the present invention is applied.
Figure 2B:
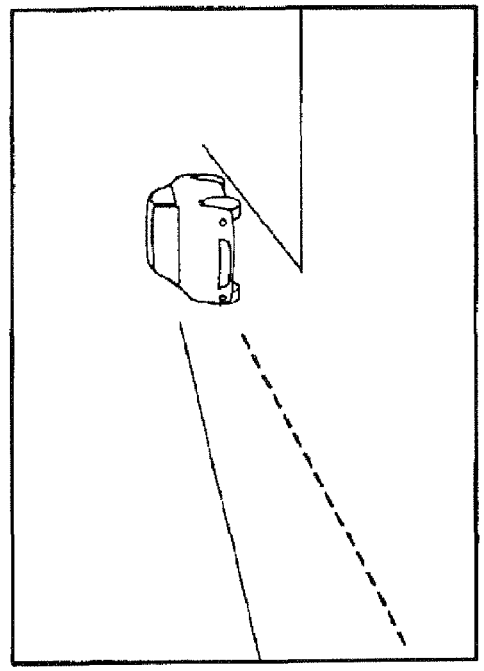
FIG. 2B is a diagram showing an example of the image picked up.
Figure 2A:
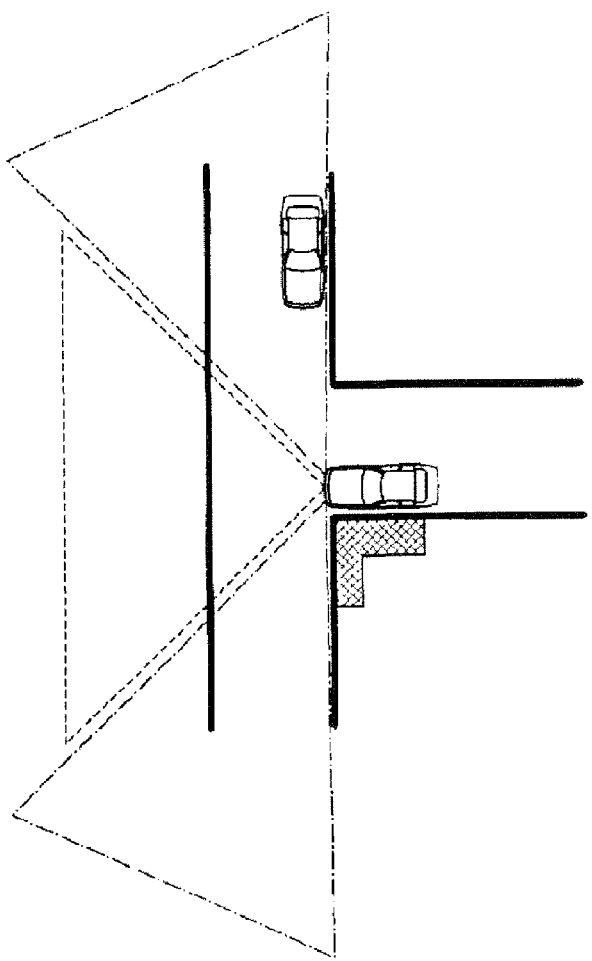
FIG. 2A is a diagram showing an example of a scope of an image picked up by a camera of the surroundings monitoring device for a vehicle according to the embodiments of the present invention.

Hereinafter, preferred embodiments of the present invention will be described. A basic constitution of a surroundings monitoring device for a vehicle which is common among the embodiments of the present invention will be described referring to FIGS. 1 and 2A, 2B. FIG. 1 is an entire constitution diagram of a vehicle to which the surroundings monitoring device for a vehicle according to the embodiments of the present invention is applied. FIG. 2A is a diagram showing an example of a scope of an image picked up by a camera of the surroundings monitoring device for a vehicle according to the embodiments of the present invention, and FIG. 2B is a diagram showing an example of the image picked up. As shown in FIG. 1, a vehicle 1 has a monitoring camera for the left 2, a monitoring camera for the front 4, and a monitoring camera for the right 6, which are installed to a front end portion of the vehicle 1. These cameras are a CCD camera equipped with a wide-angle lens, which can pick up a scope shown in FIG. 2A and an image shown in FIG. 2B, for example. The vehicle 1 has also a vehicle-speed sensor 10, a GPS device 12, a navigation device 13, an image indication monitor 14 and a speaker 15. The monitor 14 is disposed at a position where the driver in a driver's seat 16 can see it. Further, the vehicle 1 has an ECU 18, to which signals from the above-described cameras 2, 4, 6, speed sensor 10, GPS device 12 are inputted, so that specified images are indicated by the monitor 14 and specified sounds are produced by the speaker 15. The vehicle 1 is further equipped with a laser radar 7 which detects the distance to another vehicle from the vehicle 1. Herein, this distance may be obtained from a vehicle-to-vehicle transmission system or a vehicle-to-road transmission system in place of the laser radar 7.

Figure 3:
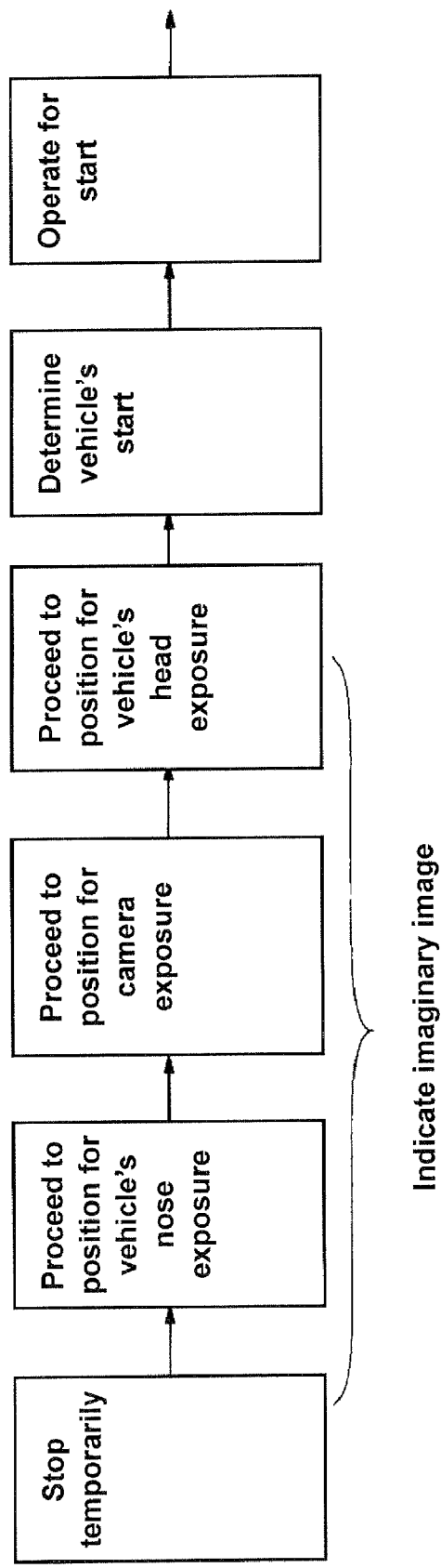
FIG. 3 is an explanatory diagram showing a driving action of a driver when entering into an intersection.
Figure 4:
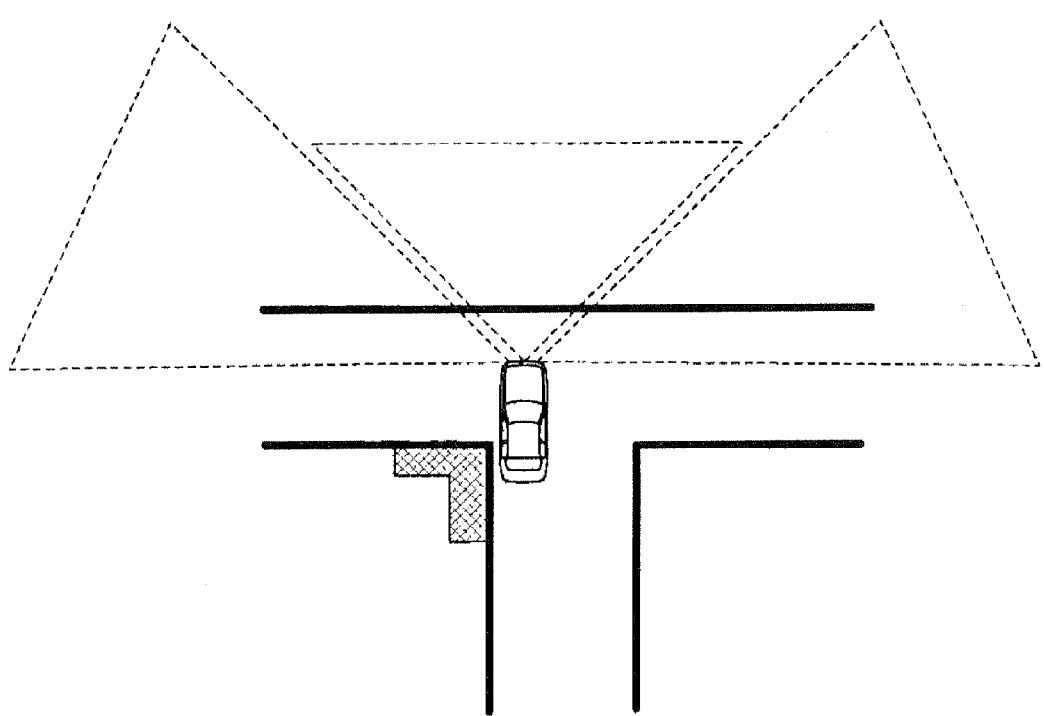
FIG. 4 is an explanatory diagram showing a position for vehicle's head exposure on a road.

Next, a driving action of the driver when entering into an intersection will be described referring to FIG. 3. FIG. 3 is an explanatory diagram showing the driving action of the driver when entering into the intersection. At first, the vehicle stops at the entrance of the intersection. Then, it proceeds slowly to a position for vehicle's nose exposure, a position for camera exposure (see FIG. 2A), and a position for vehicle's head exposure. Herein, the respective positions for vehicle's nose exposure, camera exposure, and vehicle's head exposure will be described. FIG. 4 is an explanatory diagram showing the position for vehicle's head exposure on a road. Herein, the position for vehicle's nose exposure is the one operative to make another vehicle or a pedestrian recognize the existence of the vehicle 1. The position for camera exposure is the one where the front end of the vehicle just enters into the intersection, which enables the cameras 2, 4, 6 provided at the vehicle front end portion to observe the inside area of the intersection as shown in FIG. 2A, despite the driver being unable to see the inside the intersection. The position for vehicle's head exposure is the one where the vehicle further proceeds and the driver's seat is located inside the intersection, which enables the driver to observe the inside area of the intersection directly as shown in FIG. 4. The surroundings monitoring device for a vehicle according to the embodiments of the present invention is configured to indicate imaginary images, which will be described below, at respective positions from the temporary stop position through the position for vehicle's head exposure. Herein, the imaginary image at the position for vehicle's head exposure is intermittently indicated so as to blink, and the indication of the imaginary image is stopped after the vehicle further proceeds passing the position for vehicle's head exposure.

Figure 5:
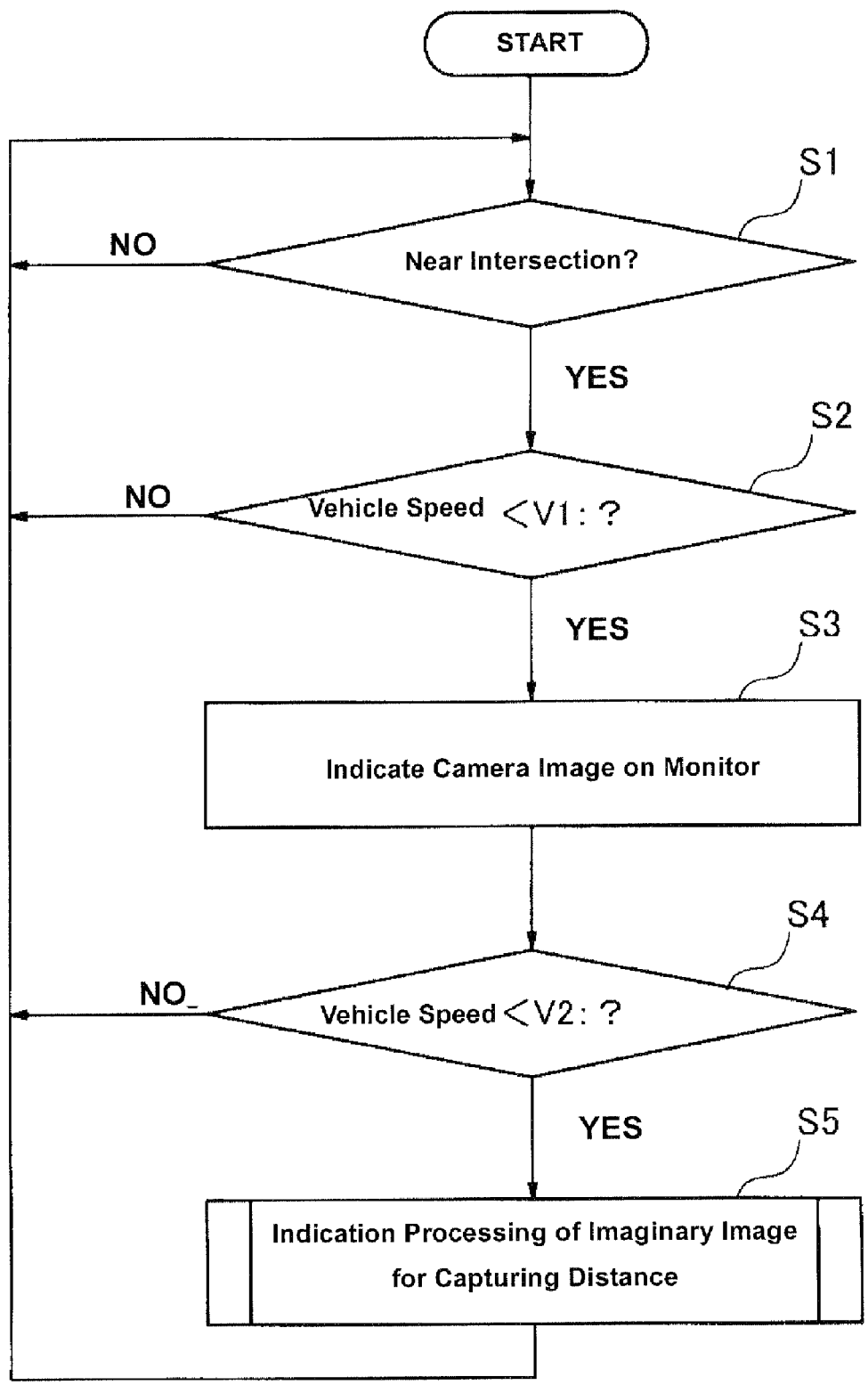
FIG. 5 is a flowchart of processing of determination as to whether or not an imaginary image for recognizing the distance by the surroundings monitoring device for a vehicle according to the embodiments of the present invention is indicted.

Next, a control flow to determine whether or not an imaginary-image indication processing of the surroundings monitoring device for a vehicle according to the embodiments of the present invention is executed will be described referring to FIG. 5. FIG. 5 is a flowchart of processing of determination as to whether or not the imaginary image for recognizing the distance by the surroundings monitoring device for a vehicle according to the embodiments of the present invention is indicted. As shown in FIG. 5, an imaginary-image processing execution determining portion 52 (see FIGS. 6, 9 and 13) determines whether the vehicle is located near the intersection or not based on the signals from the GPS 12 and the navigation device 13 in step S1. Next, in step S2, the imaginary-image processing execution determining portion 52 (see FIGS. 6, 9 and 13) determines whether the vehicle speed is less than V1 or not based on the signal from the vehicle-speed sensor 10. Herein, the vehicle speed V1 is set to be slow enough to enable the driver to see the monitor 14 safely. When the vehicle speed decreases below the vehicle speed V1, the control proceeds to step S3, where the real image is indicated based on the image signal from an image correcting portion 24. Then, in step S4, the imaginary-image processing execution determining portion 52 (see FIGS. 6, 9 and 13) determines whether the vehicle speed is lower than V2 or not. Herein, the value of the vehicle speed V2 is set to be zero or almost zero, whereby it can be determined that the vehicle has stopped substantially. When the vehicle speed is lower than V2, the control proceeds to processing of an imaginary-image indication for distance recognition of step S5. Meanwhile, when the vehicle speed of V1 or higher is determined in the step S2, or the vehicle speed of V2 or higher is determined in the step S4, the control does not proceed to the step S5.

Embodiment 1

Figure 6:
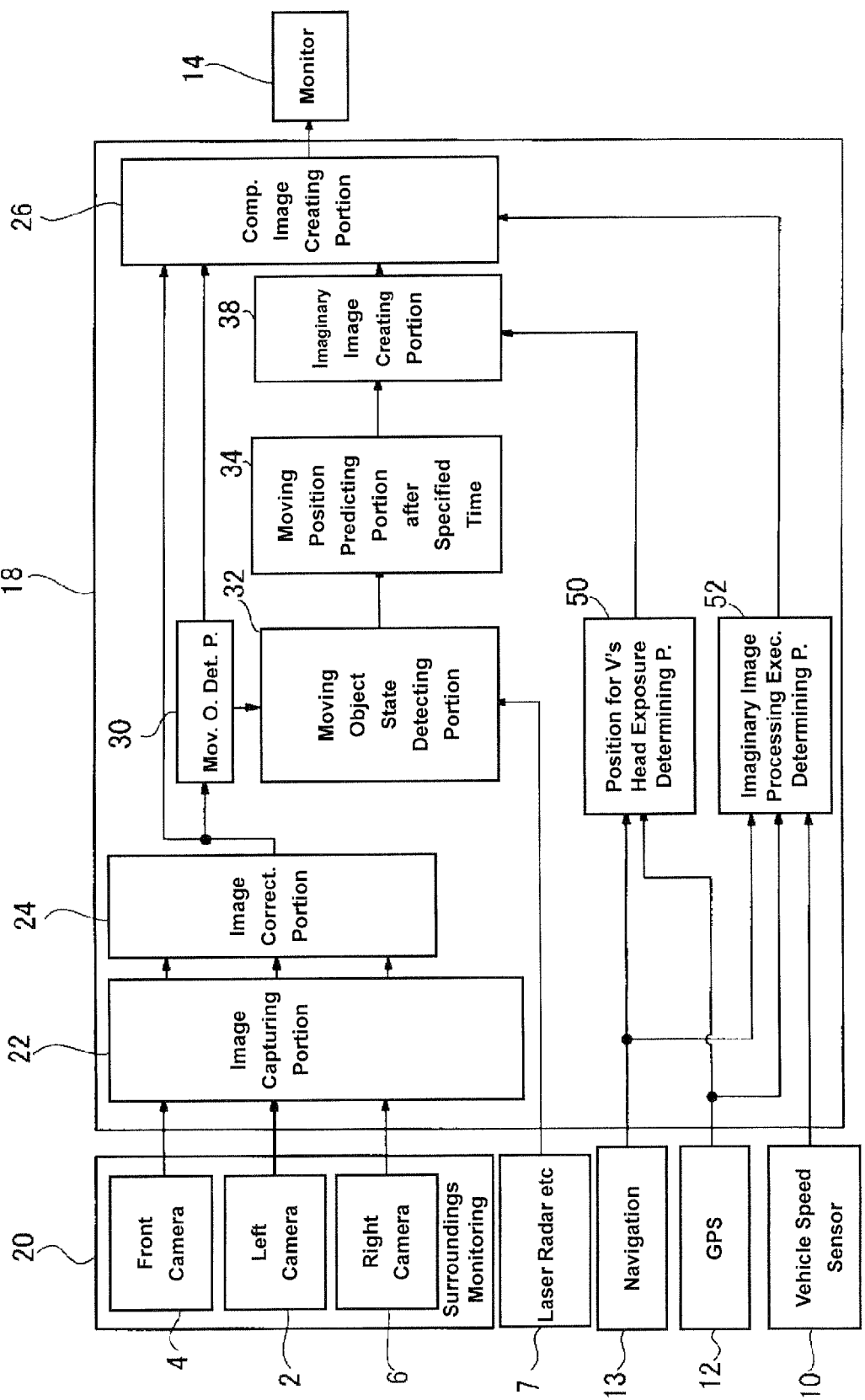
FIG. 6 is a block diagram showing the constitution of the surroundings monitoring device for a vehicle according to a first embodiment of the present invention.

Hereinafter, the constitution of the surroundings monitoring device for a vehicle according to a first embodiment of the present invention will be described referring to FIG. 6. FIG. 6 is a block diagram showing the constitution of the surroundings monitoring device for a vehicle according to the first embodiment of the present invention.

According to the first embodiment, the imaginary image of any moving object (another vehicle approaching the intersection or the like) is indicated, overlapping its real image, at its arrival position where the moving object is predicted to arrive after a specified time, so that the driver can recognize the moving state of the moving object. Thereby, the driver's determination as to whether the vehicle may be started or not can be helped, for example. The image signals from the cameras 2, 4, 6 which are a surroundings monitoring sensor 20 are inputted to an image capturing portion 22 of the ECU 18 as shown in FIG. 6. Herein, the inputted image signals are a wide-angle image and have some distortion, so the image is corrected at the image correcting portion 24. An image signal from the image correcting portion 24 is inputted to a composite-image creating portion 26 as the real image. A moving-object detecting portion 30 detects whether or not any moving object, such as another vehicle, motor cycle, or bicycle, exits in the inputted image from the image correcting portion 24. When such moving object does not exist, the imaginary image, which will be described later, is not indicated at the composite-image creating portion 26 and therefore this non-existence signal is supplied to the composite-image creating portion 26. Meanwhile, when such moving object exists, the imaginary image is indicated at the composite-image creating portion 26 and therefore this existence signal is supplied to the composite-image creating portion 26. The composite-image created at the composite-image creating portion 26 is indicated on the monitor 14. Further, a moving-object moving-state detecting portion 32 detects the distance of the moving object approaching to the vehicle and its speed and moving direction with the laser radar 7 by the existence signal from the moving-object detecting portion 30.

The moving-object moving-state detecting portion 32 further calculates an arrival time of the moving object which may reach to the vehicle. Herein, the above-described distance, speed and moving direction may be obtained from the vehicle-to-vehicle transmission system or the vehicle-to-road transmission system in place of the laser radar 7. Further, a moving-position predicting portion 34 predicts the position of the moving object after a specified time (10 sec. in the present embodiment) has passed. An imaginary-image creating portion 38 creates the imaginary image of the moving object such that the moving object is indicated at the position predicted by the moving-position predicting portion 34 after the specified time. The created imaginary image is modified at the composite-image creating portion 26 such that it overlaps the real image obtained by the cameras 2, 4, 6, and the composite image is indicated on the monitor 14. The ECU 18 includes a vehicle's-head-exposure-position determining portion 50, which determines that the vehicle proceeds to the position for vehicle's head exposure (see FIG. 4). In this position the driver can observe the intersection fully, so a specified signal to stop the creation of the imaginary image at the imaginary-image creating portion 38 is supplied, so that the imaginary image is not indicated on the monitor 14. Further, the ECU 18 includes the imaginary-image-processing-execution determining portion 52, which determines whether or not the vehicle is located and stops temporarily near the intersection based on the map data from the navigation device 13, the position data from the GPS device 12 and the vehicle speed data from the vehicle-speed sensor 10. When the vehicle is located near the intersection and stops temporarily, a specified signal is supplied to the composite-image creating portion 26 for the indication of the imaginary image, which will be described later.

Figure 7:
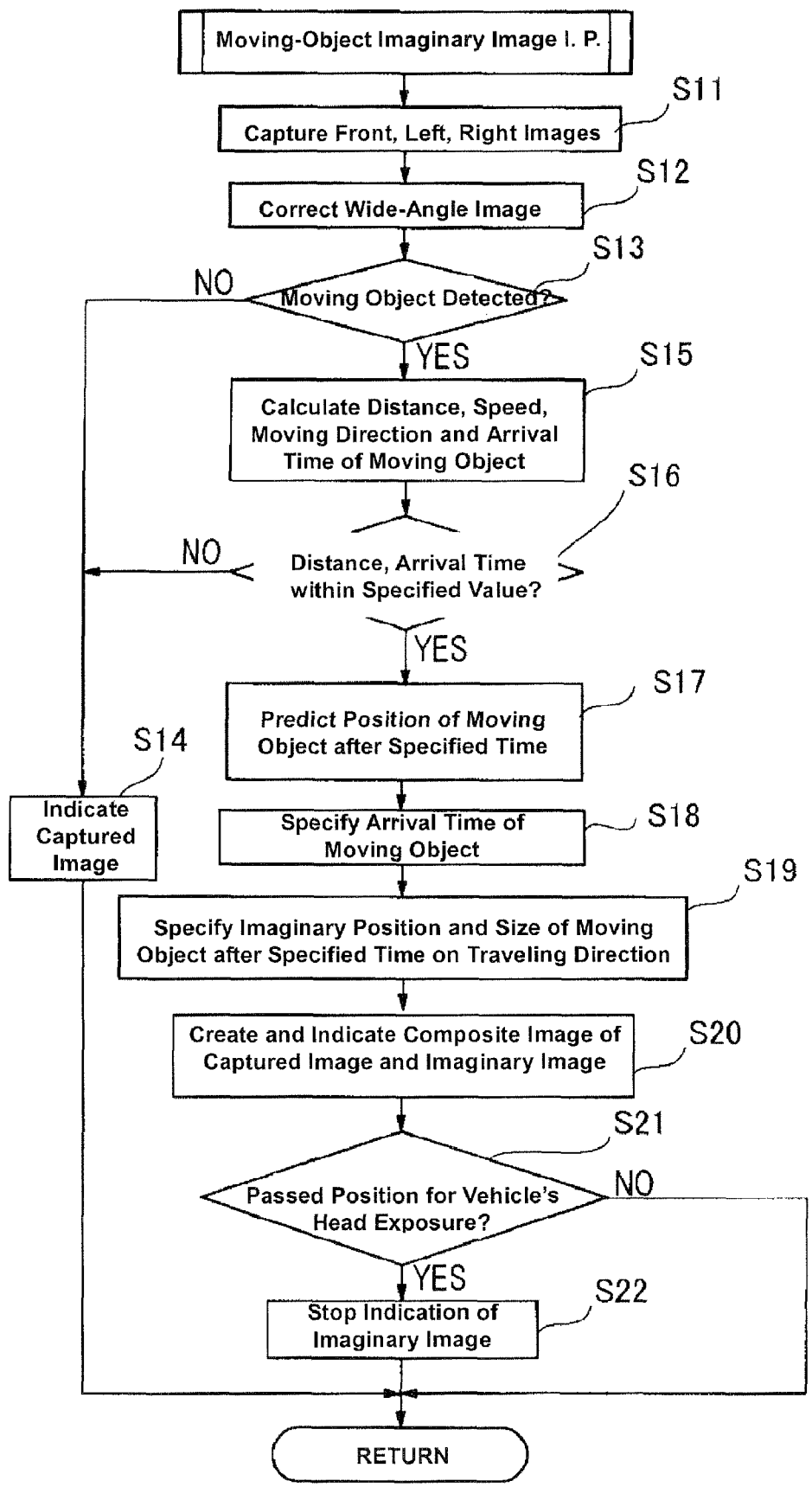
FIG. 7 is a flowchart of an indication processing of the imaginary image for recognizing the distance of the surroundings monitoring device for a vehicle according to the first embodiment of the present invention.
Figure 8B:
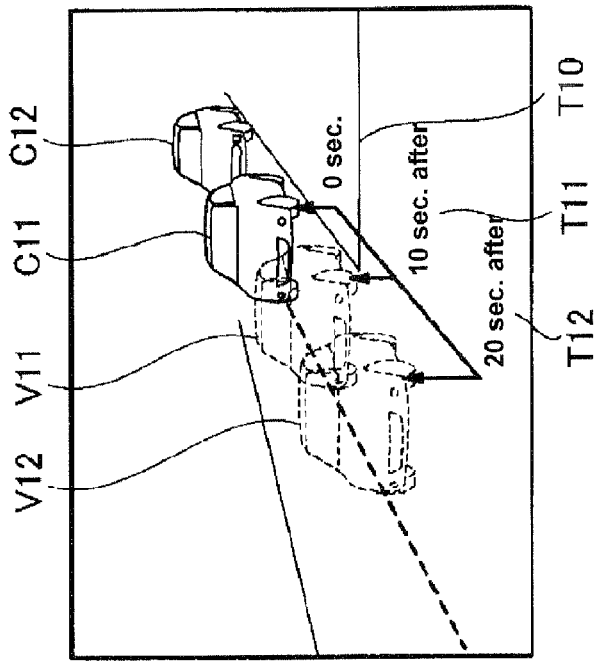
FIG. 8B is a diagram showing an example of the image in which an imaginary image overlaps a real image according to the first embodiment of the present invention
Figure 8A:
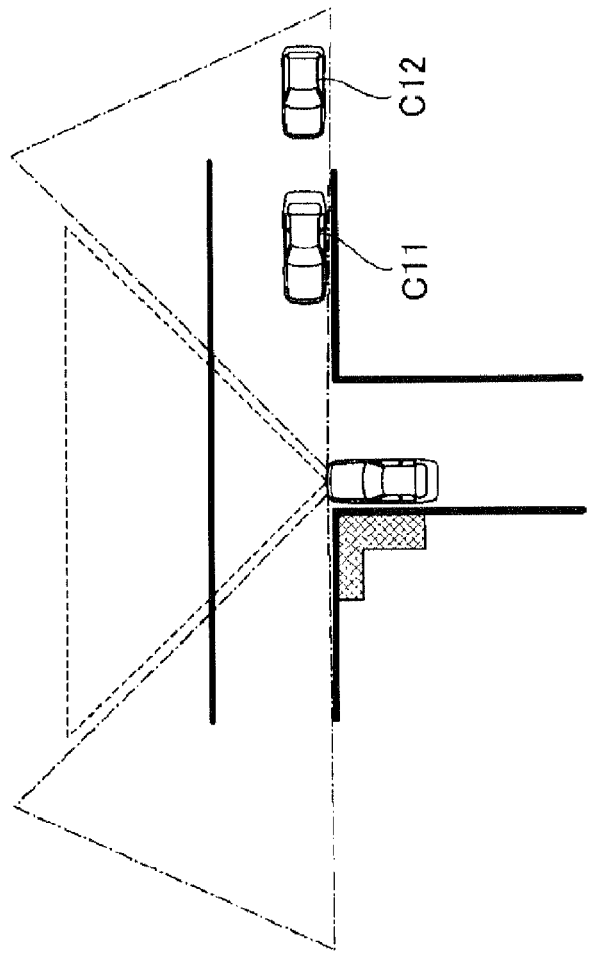
FIG. 8A is a diagram showing an example of the scope of the image picked up by the camera of the surroundings monitoring device for a vehicle.

Next, the control of the surroundings monitoring device for a vehicle according to the first embodiment of the present invention will be described referring to FIGS. 7, 8A and 8B. FIG. 7 is a flowchart of the indication processing of the imaginary image for recognizing the distance of the surroundings monitoring device for a vehicle according to the first embodiment of the present invention. FIG. 8A is a diagram showing an example of the scope of the image picked up by the camera of the surroundings monitoring device for a vehicle, and FIG. 8B is a diagram showing an example of the image in which the imaginary image overlaps the real image according to the first embodiment of the present invention. As shown in FIG. 7, at first in step S11, the image capturing portion 22 (see FIG. 6) captures the images from the camera for the left 2, the camera for the front 4, and the camera for the right 6 at the intersection, for example. Then, the captured wide-angle images are corrected by the image correcting portion 24 in step S12. Subsequently, in step S13, the moving object is detected from the real images obtained in the steps S11 and S12 by the moving-angle detecting portion 30. This moving-object detection in the step S13 is conducted through the optical flow processing. Herein, the moving object may be detected in another manner than the optical flow processing, such as a background-differentiation processing, or a between-frames-differentiation processing, or a lazar or millimeter ways. When any moving object is not detected, the control proceeds to step S14, where the real images obtained in the steps S11 and S12 which are inputted to the composite-image creating portion 26 (see FIG. 6) are indicated simply. That is, the indication of the imaginary images is prohibited.

When the moving object is detected in the step S13, the control proceeds to step S15, where the moving-object moving-state detecting portion 32 detects the distance from the moving object to the vehicle and its speed and moving direction, and calculates the arrival time of the moving object to the vehicle. In case of plural moving objects existing, the distance from the moving object to the vehicle, the speed and the moving direction of a specified moving object which is the closest to the vehicle or whose arrival time to the vehicle is the shortest are detected, and the arrival time of the specified moving object is calculated. Meanwhile, when the imaginary images of the plural moving objects do not overlap each other even if they are indicated, the distance to the vehicle, the speed and the moving direction of any moving object which is following the vehicle (following vehicle) are detected, and the arrival time of the following object to the vehicle is calculated. Next it is determined in step S16 whether or not the distance of the moving object to the vehicle is shorter than a specified distance or whether or not the arrival time of the moving object to the vehicle is shorter than a specified time.

Herein, the specified distance is set to be 10-30 m, and the specified time is set to be 2-3.5 seconds, for example. When the distance of the moving object to the vehicle is not shorter than the specified distance or when the arrival time of the moving object to the vehicle is not shorter than the specified time, the indication of the imaginary image is considered to be unnecessary and therefore the real image is indicated simply in step S14. This is because the moving state of the moving object may be recognized properly without the indication of the imaginary image when the moving object is located near, such as within the 10 m distance or within the 2 sec. arrival time.

Meanwhile, when it is determined in the step S16 that distance of the moving object to the vehicle is shorter than the specified distance or that the arrival time of the moving object to the vehicle is shorter than the specified time, the control proceeds to step S17, where the moving-position predicting portion 34 predicts the position of the moving object after the specified time (10 sec. in the present embodiment) has passed. In case of the plural moving objects existing, the above-described position prediction is conducted for the specified moving object which is the closest to the vehicle or whose arrival time to the vehicle is the shortest. Then, the time from the current position of the moving object to the position where an imaginary indication of the moving object is conducted is specified in step S18. That is, when the state of the moving object (specified time) should be indicated is set (e.g., after how much seconds, every how much seconds) for the imaginary indication. Likewise, where the state of the moving object should be indicated (specified distance) may be set (e.g., every how long distance). Next, in step S19, the position and the size of the moving object to be indicated on an extended line of the moving direction of the moving object are specified as an imaginary state of the moving object at the specified time (after how much seconds, every how much seconds) which has been specified in the step S18.

In the next step S20, as shown in FIG. 8A, the specified times (after how much seconds) T10, T11, T12 which have been specified in the step S18 are indicated on the monitor 14 overlapping the real images, and imaginary indications V11, V12 of the moving object with its positions and the sizes on the extended line of the moving direction of the moving object which have been specified in the step S19 are indicated on the monitor 14 overlapping the real images. In FIG. 8B, the vehicle (moving object) C11, C12 located at the current positions and the current state of the road are indicated on the monitor 14 as the real image. The imaginary images of the moving object are always indicated overlapping the current (updated) background and moving object in the step S20, so that the driver can see the current (updated) image as the real image. As shown in FIG. 8B, in case the plural moving objects C11, C12 exist, only the imaginary images V11, V12, T10, T11, T12 of the specified moving object (C11) which is the closest to the vehicle or whose arrival time to the vehicle is the shortest are indicated according to the present embodiment. Herein, in FIG. 8B, if the imaginary indication of the moving object C12 does not overlap the moving object C11 itself and its imaginary image, the imaginary indication of the moving object C12 may be conducted. In other words, in case the imaginary indication of the moving object C12 overlaps the moving object C11 itself and its imaginary image, the indication of the imaginary image of the following vehicle is prohibited. It may be preferable that the imaginary indication (V11, V12) be conducted with only its contour, a transparent light color, or intermittent indication blinking, so that the imaginary images can be differentiated from the real images.

Further, the imaginary indication (V11, V12) are conducted every specified period of time.

The control proceeds to step S21, where the vehicle's-head-exposure-position determining portion 50 (see FIG. 6) determines whether the vehicle has passed the position for vehicle's head exposure (see FIG. 4) or not. There are some methods of determining the position for vehicle's head exposure, for example, such as determination based on the vehicle's position obtained from the GPS device 12 and the map data of the navigation device 13, determination as to how far the vehicle moves from the position of a stop line which may be obtained from the cameras 2, 4, 6 and the moving distance detected by a moving distance sensor (not illustrated), determination of the position for vehicle's head exposure where a clear view on the left and right sides can be obtained (no obstacle to prevent the clear view at a short distance) from the images picked up by the left and right cameras 2, 6, or determination based on the position of the stop line and the surroundings image of the intersection which are obtained from the cameras 2, 4, 6. When the vehicle has the position for vehicle's head exposure, the control proceeds to step S22, where the indication of the imaginary image with the intermittent indication blinking by the composite-image creating portion 26 (see FIG. 6), which has been conducted in the step S20, is stopped. The intermittent indication blinking of the imaginary image may enable the driver to recognize the possibility of actually seeing any moving object with the driver's own eyes or recognize any moving object which cannot be actually seen with the driver's own eyes. Meanwhile, when the vehicle does not have the position for vehicle's dead exposure, the indication of the imaginary image and the real image in the step S20 is maintained.

Hereinafter, the operations and advantages of the first embodiment of the present invention will be described. According to the surroundings monitoring device of the first embodiment of the present invention, the blind area within the area expanding in front of the driver on the both (right and left) sides can be monitored. The cameras 2, 4, 6 are provided at the front portion of the vehicle so as to pick up the real image of the blind area, and the moving object can be recognized by the moving-object detecting portion 30 from the real image picked up by the cameras 2, 4, 6. Further, the moving state of the moving object is detected by the moving-object moving-state detecting portion 32, and the position and size of the moving object for the imaginary indication is specified by the moving-position predicting portion 34 after the specified time. Then, the imaginary image of the moving object is created by the imaginary-image creating portion 38, and the imaginary image of the moving object is indicated on the monitor 14 by the composite-image creating portion 26 with the position and size of the moving object specified by the moving-position predicting portion 34 after the specified time in such a maimer that the imaginary image overlaps the real image. Thereby, the driver can easily recognize the moving state of the moving object. As a result, differentiation of the moving object from the stationary object and recognition of the moving state of the moving object in the image of the blind area can be made easy.

Further, according to the first embodiment, the driver's blind area is the one which is located around the intersection in front of the vehicle, and the cameras 2, 4, 6 are provided at the vehicle front end so as to pick up the real images around the intersection when approaching the intersection. Thereby, the moving state in the dangerous area at the intersection, which may have a high risk of vehicle-collision occurrence, can be recognized properly and easily. Also, according to the first embodiment, the position and size of the moving object for the imaginary indication is specified by the moving-position predicting portion 34 after the specified time such that the imaginary image of the moving object is indicated at the arrival position where the moving object is predicted to arrive after the specified time on the extended line of the moving direction of the moving object, and these are indicated by the indicating means so as to overlap the real image. Thereby, the driver can intuitively recognize the position of the moving object after the specified time, so that, for example, the driver can determine easily whether the vehicle may be started or not. Further, according to the first embodiment, the indication of the arrival predicted time of the moving object from the current indicated position of the moving object is indicated overlapping the imaginary image of the moving object based on the specified time. Thereby, the driver can further intuitively recognize the moving state of the moving object.

Also, according to the first embodiment, the composite-image creating portion 26 is configured to conduct the indication of the imaginary image of the moving object when the distance of the moving object to the vehicle is shorter than the specified distance or the arrival time of the moving object to the vehicle is shorter than the specified time. Thereby, even if the moving object is located within the specified distance where the driver may waver in judgment of starting or keeping on stopping the vehicle, for example, the driver can properly recognize the moving state of the moving object. Further, according to the first embodiment, the composite-image creating portion 26 is configured to indicate the imaginary image of the moving object so as to be differentiated from the real state of the actual vehicle of the moving object. Thereby, the recognition of the moving object can be easier for the driver. Also, according to the first embodiment, the imaginary-image creating portion 38 is configured to create the imaginary image of the moving object in case of the moving object detecting portion 30 detecting the plural moving objects such that only the imaginary image of the specified moving object which is the closest to the vehicle or whose arrival time to the vehicle is the shortest is indicated. Thereby, the moving state of the moving object which the vehicle may possibly crash against can be recognized surely.

Further, according to the first embodiment, in case all of the image images of the plural moving objects are indicated by the composite-image creating portion 26 and thereby they are indicated so as to overlap the plural moving objects, only the imaginary image of the specified moving object which is the closest to the vehicle or whose arrival time to the vehicle is the shortest is configured to be created by the imaginary-image creating portion 38. Thereby, the moving state of the moving object which the vehicle may possibly crash against can be recognized surely. Also, according to the first embodiment, the composite-image creating portion 26 is configured to indicate the imaginary image with only its contour, the transparent light color, or the intermittent indication blinking so that the imaginary image can be differentiated from the real image. Thereby, the driver can recognize the imaginary image properly without confusing it with the real image. Further, according to the first embodiment, the composite-image creating portion 26 is configured to conduct the imaginary indication of the moving object or the imaginary road indication, overlapping the current (updated) background and moving object. Thereby, the driver can see the current (updated) image as the real image, thereby recognizing the surrounding state and the moving state of the moving object more properly.

Embodiment 2

Figure 9:
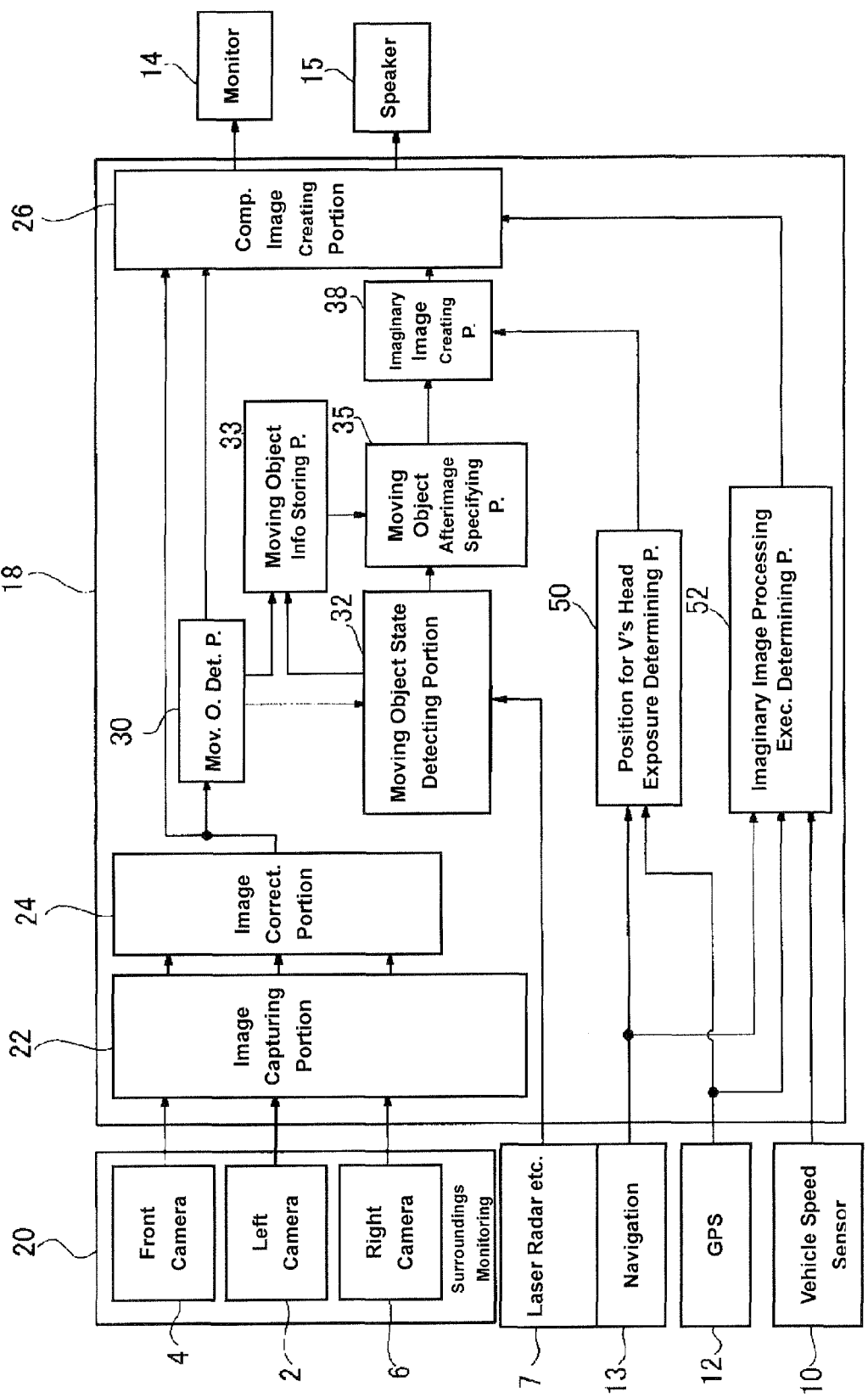
FIG. 9 is a block diagram showing the constitution of the surroundings monitoring device for a vehicle according to a second embodiment of the present invention.

A surroundings monitoring device for a vehicle according to a second embodiment of the present invention will be described referring to FIG. 9. FIG. 9 is a block diagram showing the constitution of the surroundings monitoring device for a vehicle according to the second embodiment of the present invention. In the second embodiment, the imaginary image of the moving object is indicated so as to overlap the actual moving object (another vehicle approaching the vehicle or the like) at plural positions where the moving object has actually passed. Thereby, the driver can properly recognize the moving state of the moving object up to the present time, so that, for example, the driver can determine easily whether the vehicle may be started or not.

As shown in FIG. 9, the image signals from the cameras 2, 4, 6 as the surroundings monitoring sensor 20 are inputted to the image capturing portion 22 of the ECU 18. Since the inputted image signals are the wide-angle image and have some distortion, the image is corrected at the image correcting portion 24. The image signal from the image correcting portion 24 is inputted to the composite-image creating portion 26 as the real image. The moving-object detecting portion 30 detects whether or not any moving object, such as another vehicle, motor cycle, or bicycle, exits in the inputted image from the image correcting portion 24. When such moving object does not exist, the imaginary image, which will be described later, is not indicated by the composite-image creating portion 26 and therefore this non-existence signal is supplied to the composite-image creating portion 26. Further, the moving-object moving-state detecting portion 32 detects the distance of the moving object approaching to the vehicle and its speed and moving direction with the laser radar 7 by the existence signal from the moving-object detecting portion 30. The moving-object moving-state detecting portion 32 further calculates the arrival time of the moving object to the vehicle. Herein, the above-described distance, speed and moving direction may be obtained from the vehicle-to-vehicle transmission system or the vehicle-to-road transmission system in place of the laser radar 7, and the arrival time to the vehicle may be calculated thereby.

A moving-object information storing portion 33 receives the position information of the moving object detected by the moving-object detecting portion 30 from the moving-object moving-state detecting portion 32 and stores that thereat. A moving-object afterimage specifying portion 35 specifies an afterimage of the moving object based on the past position of the moving object which has been stored at the moving-object information storing portion 33 and the current position of the moving object which is obtained from the moving-object moving-state detecting portion 32. Specifically, it specifies the position and size of the moving object at the specified past time every a specified period of time. Further, the moving-object afterimage specifying portion 35 calculates a vector showing the moving direction of the moving object based on the past position of the moving object which has been stored at the moving-object information storing portion 33 and the current position of the moving object which is obtained from the moving-object moving-state detecting portion 32.

The imaginary-image creating portion 38 creates an imaginary image (afterimage) of the moving object with the past position and size which has been specified by the moving-object afterimage specifying portion 35. This created imaginary image is made overlap the real image from the cameras 2, 4, 6 by the composite-image creating portion 26, and then the composite image is indicted on the monitor 14. Further, the speaker 15 produces a specified sound operative to notify the driver of updating of the imaginary image. The ECU 18 includes the vehicle's-head-exposure-position determining portion 50, which determines that the vehicle proceeds to the position for vehicle's head exposure (see FIG. 4). When the vehicle has the position for vehicle's head exposure, the driver can see over the intersection by himself (herself). Accordingly, the specified signal to stop the imaginary indication of the moving object by the imaginary-image creating portion 38 is supplied at this time. The ECU 18 further includes the imaginary-image processing execution determining portion 52, which determines whether or not the vehicle is located near the intersection and stops temporarily based on the map data from the navigation device 13, the position data from the GPS 12, and the vehicle speed data from the vehicle-speed sensor 10. As described later, when the vehicle is located near the intersection and stops temporarily, the specified signal is supplied to the composite-image creating portion 26 for indicating the imaginary image.

Figure 10:
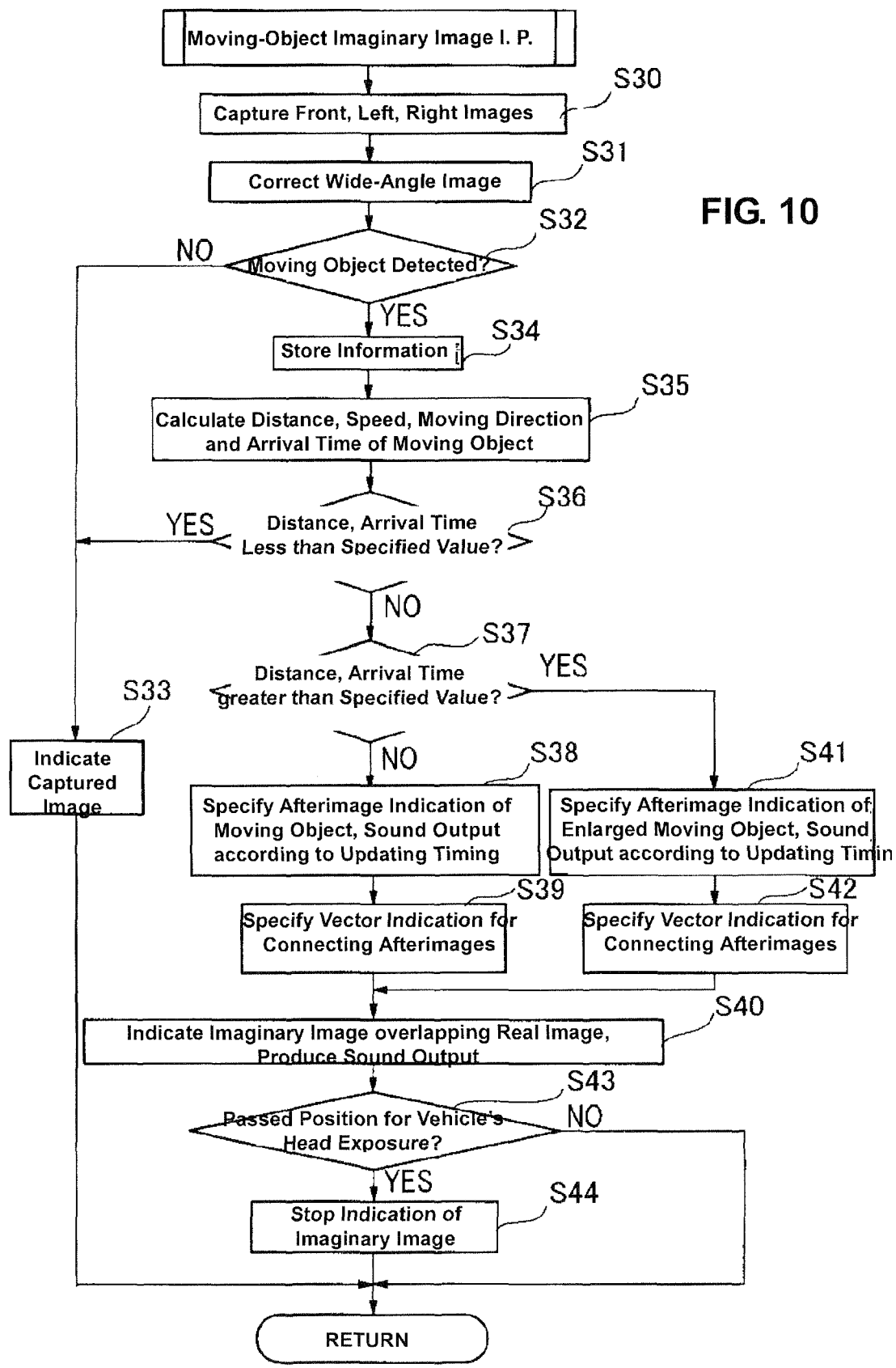
FIG. 10 is a flowchart of an indication processing of the imaginary image for recognizing the distance of the surroundings monitoring device for a vehicle according to the second embodiment of the present invention.
Figure 12:
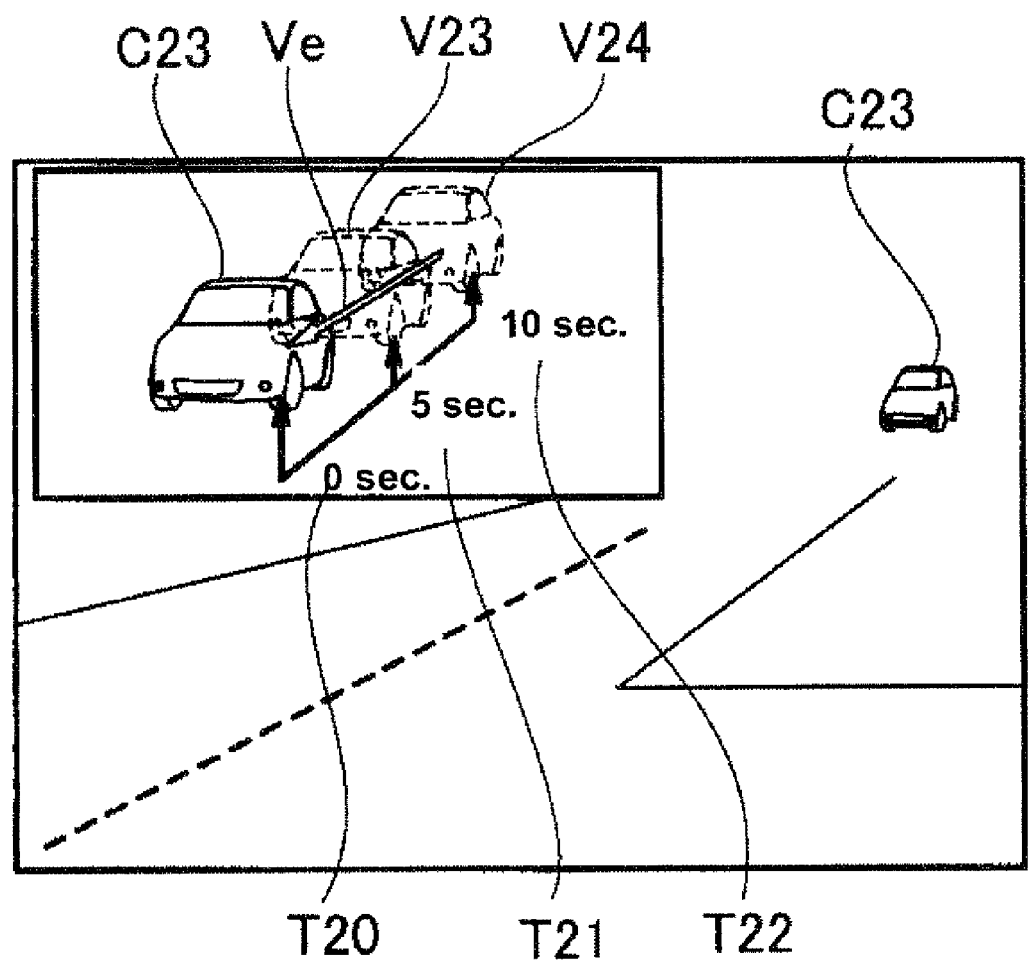
FIG. 12 is an example of the image in which the imaginary image overlaps the real image according to the second embodiment of the present invention.

Hereinafter, the control of the surroundings monitoring device for a vehicle according to the second embodiment of the present invention will be described referring to FIGS. 10-12. FIG. 10 is a flowchart of an indication processing of the imaginary image for recognizing the distance of the surroundings monitoring device for a vehicle according to the second embodiment of the present invention. FIG. 11A is a diagram showing an example of the scope of the image picked up by the camera of the surroundings monitoring device for a vehicle and the moving object, and FIG. 11B is a diagram showing an example of the image in which the imaginary image overlaps the real image according to the second embodiment of the present invention. FIG. 12 is an example of the image in which the imaginary image overlaps the real image according to the second embodiment of the present invention. A reference character S denotes each step in FIG. 10. As shown in FIG. 10, at first in step S30, the image capturing portion 22 (see FIG. 9) captures the images from the camera for the left 2, the camera for the front 4, and the camera for the right 6 at the intersection, for example. Then, the captured wide-angle images are corrected by the image correcting portion 24 in step S31. Subsequently, in step S32, the moving object is detected from the real images obtained in the steps S30 and S31 by the moving-angle detecting portion 30. This moving-object detection in the step S32 is conducted through the optical flow processing. Herein, the moving object may be detected in another manner than the optical flow processing, such as the background-differentiation processing, or the between-frames-differentiation processing, or the lazar or millimeter ways. When any moving object is not detected, the control proceeds to step S33, where the real images obtained in the steps S30 and S31 which are inputted to the composite-image creating portion 26 (see FIG. 9) are indicated simply. That is, the indication of the imaginary images is prohibited.

When the moving object is detected in the step S32, the control proceeds to step S34, where the moving-object information storing portion 33 (see FIG. 9) stores the information regarding the position at which the moving object has existed or exists currently and its size. Then, the control proceeds to step S35, where the moving-object moving-state detecting portion 32 detects the distance from the moving object to the vehicle and its speed and moving direction, and calculates the arrival time of the moving object to the vehicle. In case of plural moving objects existing, the distance from the moving object to the vehicle, the speed and the moving direction of a specified moving object which is the closest to the vehicle or whose arrival time to the vehicle is the shortest are detected, and the arrival time of the specified moving object is calculated. Meanwhile, when the imaginary images of the plural moving objects do not overlap each other even if they are indicated, the distance to the vehicle, the speed and the moving direction of any moving object which is following the vehicle (following vehicle) are detected, and the arrival time of the following object to the vehicle is calculated. Next, it is determined in step S36 whether or not the distance of the moving object to the vehicle is shorter than a specified distance or whether or not the arrival time of the moving object to the vehicle is shorter than a specified time. Herein, the specified distance is set to be 0-10 m, and the specified time is set to be 0-1 second, for example. When the distance of the moving object to the vehicle is shorter than the specified distance or when the arrival time of the moving object to the vehicle is shorter than the specified time, that is, when the moving object is located near, the control proceeds to step S33, where the real images captured in the steps S30 and S31 are indicated simply. That is, the indication of the imaginary image is prohibited. This is because when the moving object is located near, the driver may drive the vehicle properly with giving attention to the moving object. Meanwhile, when it is not determined in the step S36 that distance of the moving object to the vehicle is shorter than the specified distance or that the arrival time of the moving object to the vehicle is shorter than the specified time, the control proceeds to step S37, where it is determined whether or not the distance of the moving object to the vehicle is the specified distance or longer or whether or not the arrival time of the moving object to the vehicle is the specified time or longer. Herein, the specified distance may be 30 m, and the specified time may be 3 seconds, for example.

When it is not determined in the step S37 that distance of the moving object to the vehicle is the specified distance or longer or that the arrival time of the moving object to the vehicle is the specified time or longer, that is, the distance of the moving object to the vehicle is within 10-30 m or the arrival time of the moving object to the vehicle is within 1-3 seconds, in which the moving object is considered to be located at the middle distance according to the present embodiment, the control proceeds to step S38. When the moving object is located at the middle distance like this, the driver may waver in judgment as to whether the driver should wait for the moving object passing or makes the vehicle proceed forward first. Namely, this is a situation in which the driver needs to recognize the moving object carefully and precisely from the distance, moving speed, and moving direction of the moving object. In this situation, the position and size of the afterimage indication of the moving object are specified, and the output of the sound to be generated according to the timing for updating of the afterimage indication is specified in the step S38. These specifications also include specifying the afterimage indication every how much seconds. In the present embodiment, the updating of the afterimage indication is conducted every 0.5-2 seconds with regular intervals. In the next step S39, the vector indication for connecting afterimages is specified. The vector indication is configured such that the centers of gravity of the two-dimension images of the moving objects or the centers of gravity of the moving objects which may be obtained from the three-dimension coordinate are interconnected. Thereby, the moving direction of the moving object is made precise.

In the next step S40, as shown in FIG. 11B, the imaginary images V21, V22 are indicated on the monitor 14 overlapping the real images with the indicating position and size which have been specified in the step S38. Further, as shown in FIG. 11B, a vector Ve specified in the step S39 is indicated on the monitor 14 so as to overlap the real image. Further, as shown in FIG. 11B, T20, T21, T22 to show the timing the imaginary images V1, V2 exist (i.e., before how much seconds) are indicated on the monitor 14 so as to overlap the real image as well. Herein, the currently existing vehicle (moving object)

C21, C22 and the current road state are indicated on the monitor 14 as the real image. In this step S40, the imaginary images of the moving object are always indicated overlapping the current (updated) background and moving object, so that the driver can see the current (updated) image as the real image. As shown in FIG. 11B, in case the plural moving objects C21, C22 exist, only the imaginary images V21, V22, T20, T21, T22 of the specified moving object (C21) which is the closest to the vehicle or whose arrival time to the vehicle is the shortest are indicated according to the present embodiment. Herein, in FIG. 11B, if the imaginary indication of the moving object C22 does not overlap the moving object C21 itself and its imaginary image, the imaginary indication of the moving object C22 may be conducted. In other words, in case the imaginary indication of the moving object C22 overlaps the moving object C21 itself and its imaginary image, the indication of the imaginary image of the following vehicle is prohibited. Further, in case the following moving objects (following vehicles) exists, the number of the following moving objects is indicated as shown with reference character N in FIG. 11B.

It may be preferable that the imaginary indication (V21, V22) be conducted with only its contour, the transparent light color, or the intermittent indication blinking, so that the imaginary images can be differentiated from the real images. Further, a beep sound like "pi pi pi" is produced by the speaker 15 corresponding to the timing of the updating of afterimage indication in the step S40. This updating timing may be set to be 0.5-2 seconds so that the driver can see the moving object sufficiently. This kind of sound is emitted so that the driver can recognize the speed sense properly. Next, when it is determined in the step S37 that distance of the moving object to the vehicle is the specified distance or longer or that the arrival time of the moving object to the vehicle is the specified time or longer, that is, the distance of the moving object to the vehicle is 30 m or longer or the arrival time of the moving object to the vehicle is 3 seconds or longer, in which the moving object is considered to be located at the far distance according to the present embodiment, the control proceeds to step S41. This is a situation in which the driver may want to confirm that there is no risk of collision and recognize changes of the moving speed and moving direction of the moving object precisely. In this situation, the position and size of the afterimage indication of the moving object are specified in step S41. Since the indication of the moving object and the afterimage is enlarged on the monitor 14 when the moving object is located at the far distance according to the present embodiment, the position and size of the enlarged indication of the moving object and the afterimage are specified as well. Further, the output of the sound corresponding to the timing of the updating of the afterimage indication is specified. Also, specifying the afterimage indication every how much seconds is conducted.

In the next step S42, the vector indication for connecting the afterimages is specified. The vector indication is configured such that the centers of gravity of the two-dimension images of the moving objects or the centers of gravity of the moving objects which may be obtained from the three-dimension coordinate are interconnected. Thereby, the moving direction of the moving object is made precise. Then, in the next step S40, the vehicle as the moving object C23 is indicated on the left of the monitor 14 so as to be enlarged as shown in FIG. 12. The position of enlargement indication may be chosen at anywhere as long as the indication of the moving object C23 within the real image is not prevented. In this case, the imaginary indication of the moving object or the imaginary road indication are always conducted overlapping the current (updated) background and moving object in the step S40, so that the driver can see the current (updated) image as the real image. In the example shown in FIG. 12, the imaginary images V23, V24 as the afterimage indication of the moving object are indicated on the monitor 14 with the positions and sizes which have been specified in the step S41 so as to overlap the real image.

Herein, the vector Ve, the times T20, T21, T22 are also indicated, which is similar to FIG. 11B. Further, likewise, in case the plural moving objects exist, only the imaginary image of the specified moving object which is the closest to the vehicle or whose arrival time to the vehicle is the shortest is indicated. Herein, in case the imaginary indication of the moving object overlaps the following moving object itself and its imaginary image, the indication of the imaginary image of the following vehicle is prohibited. It may be preferable that the imaginary indication (V21, V22) be conducted with only its contour, the transparent light color, or the intermittent indication blinking, so that the imaginary images can be differentiated from the real images. Further, the beep sound like "pi pi pi" is produced by the speaker 15 corresponding to the timing of the updating of afterimage indication in the step S40. This updating timing may be set to be 0.5-2 seconds. Then, the control proceeds to step S43, where the vehicle's-head-exposure-position determining portion 50 (see FIG. 9) determines whether the vehicle has passed the position for vehicle's head exposure (see FIG. 4) or not. When the vehicle has the position for vehicle's head exposure, the control proceeds to step S44, where the indication of the imaginary image with the intermittent indication blinking by the composite-image creating portion 26 (see FIG. 9), which has been conducted in the step S40, is stopped.

Hereinafter, the operations and advantages of the second embodiment of the present invention will be described. According to the surroundings monitoring device of the second embodiment of the present invention, the blind area within the area expanding in front of the driver on the both (right and left) sides can be monitored. The cameras 2, 4, 6 are provided at the front portion of the vehicle so as to pick up the real image of the blind area, and the moving object can be recognized by the moving-object detecting portion 30 from the real image picked up by the cameras 2, 4, 6. Further, the moving state of the moving object is detected by the moving-object moving-state detecting portion 32, and the position and size of the moving object for the imaginary indication is specified by the moving-object afterimage specifying portion 35 before the specified time. Then, the imaginary image of the moving object is created by the imaginary-image creating portion 38, and the imaginary image of the moving object is indicated on the monitor 14 by the composite-image creating portion 26 with the position and size of the moving object specified by the moving-object afterimage specifying portion 35 before the specified time in such a manner that the imaginary image overlaps the real image. Further, according to the second embodiment, the moving-object afterimage specifying portion 35 specifies the position and size of the indication of the imaginary image of the moving object such that the imaginary image of the moving object is indicated as the afterimage at plural positions where the moving object has actually passed. Thereby, the driver can intuitively recognize the moving state of the moving object up to the present time, so that, for example, the driver can determine easily whether the vehicle may be started or not.

Also, according to the second embodiment, the driver can more intuitively recognize the moving state of the moving object up to the present time with the vector indication corresponding to the afterimage. Further, according to the second embodiment, the indication size of the imaginary image of the moving object changes in accordance with the distance to the moving object from the vehicle in such a manner the indication size is enlarged in case the distance to the moving object is greater than the specified distance. Thereby, the driver can easily recognize the moving state of the moving object which is located far away from the driver's vehicle. Also, according to the second embodiment, the composite-image creating portion 26 is configured to conduct the indication of the imaginary image of the moving object when the distance of the moving object to the vehicle is shorter than the specified distance or the arrival time of the moving object to the vehicle is shorter than the specified time. Thereby, even if the moving object is located within the specified distance where the driver may waver in judgment of starting or keeping on stopping the vehicle, for example, the driver can properly recognize the moving state of the moving object.

Further, according to the second embodiment, the composite-image creating portion 26 is configured to indicate the imaginary image of the moving object so as to be differentiated from the real state of the actual vehicle of the moving object. Thereby, the recognition of the moving object can be easier for the driver. Also, according to the second embodiment, the imaginary-image creating portion 38 is configured to create the imaginary image of the moving object in case of the moving object detecting portion 30 detecting the plural moving objects such that only the imaginary image of the specified moving object which is the closest to the vehicle or whose arrival time to the vehicle is the shortest is indicated. Thereby, the moving state of the moving object which the vehicle may possibly crash against can be recognized surely. Further, according to the second embodiment, in case all of the image images of the plural moving objects are indicated by the composite-image creating portion 26 and thereby they are indicated so as to overlap the plural moving objects, only the imaginary image of the specified moving object which is the closest to the vehicle or whose arrival time to the vehicle is the shortest is configured to be created by the imaginary-image creating portion 38. Thereby, the moving state of the moving object which the vehicle may possibly crash against can be recognized surely.

Also, according to the second embodiment, the composite-image creating portion 26 is configured to indicate the imaginary image with only its contour, the transparent light color, or the intermittent indication blinking so that the imaginary image can be differentiated from the real image. Thereby, the driver can recognize the imaginary image properly without confusing it with the real image. Further, according to the second embodiment, the composite-image creating portion 26 is configured to conduct the imaginary indication of the moving object or the imaginary road indication, overlapping the current (updated) background and moving object. Thereby, the driver can see the current (updated) image as the real image, thereby recognizing the surrounding state and the moving state of the moving object more properly.

Embodiment 3

Figure 13:
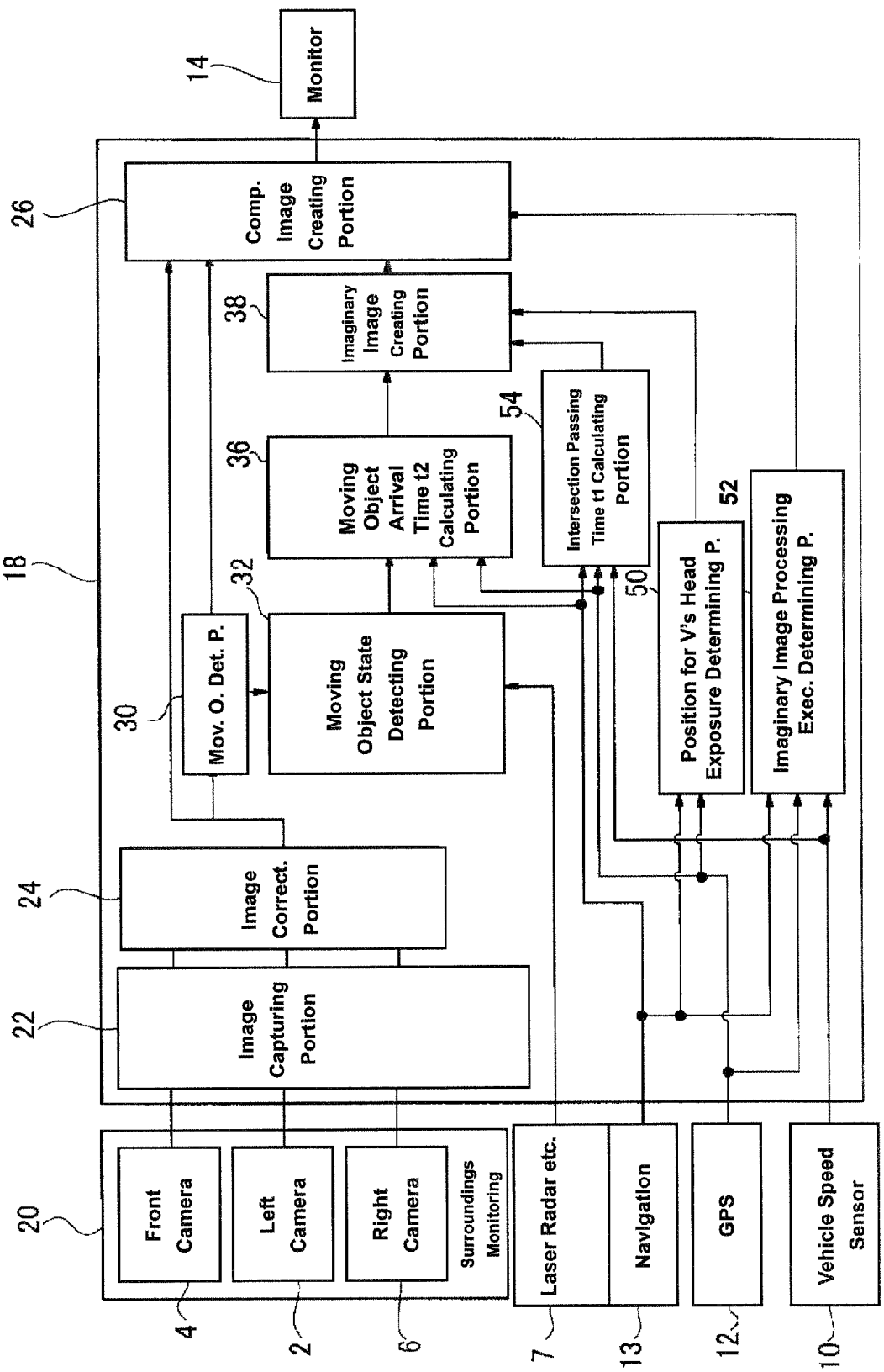
FIG. 13 is a block diagram showing the constitution of the surroundings monitoring device for a vehicle according to a third embodiment of the present invention.

Hereinafter, the constitution of the surroundings monitoring device for a vehicle according to a third embodiment of the present invention will be described referring to FIG. 13. FIG. 13 is a block diagram showing the constitution of the surroundings monitoring device for a vehicle according to the third embodiment of the present invention.

The image signals from the cameras 2, 4, 6 which are the surroundings monitoring sensor 20 are inputted to the image capturing portion 22 of the ECU 18 as shown in FIG. 13. Herein, the inputted image signals are the wide-angle image and have some distortion, so the image is corrected at the image correcting portion 24. The image signal from the image correcting portion 24 is inputted to the composite-image creating portion 26 as the real image. The moving-object detecting portion 30 detects whether or not any moving object, such as another vehicle, motor cycle, or bicycle, exists in the inputted image from the image correcting portion 24. When such moving object does not exist, the imaginary image, which will be described later, is not indicated at the composite-image creating portion 26 and therefore this non-existence signal is supplied to the composite-image creating portion 26. Meanwhile, when such moving object exists, the imaginary image is indicated at the composite-image creating portion 26 and therefore this existence signal is supplied to the composite-image creating portion 26. The composite image created at the composite-image creating portion 26 is indicated on the monitor 14. Further, the moving-object moving-state detecting portion 32 detects the distance of the moving object approaching to the vehicle and its speed and moving direction with the laser radar 7 by the existence signal from the moving-object detecting portion 30, and calculates the arrival time to the vehicle. Herein, the above-described distance, speed and moving direction may be obtained and further the arrival time to the vehicle may be calculated from the vehicle-to-vehicle transmission system or the vehicle-to-road transmission system in place of the laser radar 7.

Further, it is detected whether the moving object makes a turn or proceeds straight by detecting a state of a turn signal through image processing of the images picked up by the cameras 2, 4, 6. Herein, the state of making a turn may be detected from the vehicle-to-vehicle transmission system or the vehicle-to-road transmission system. Further, an arrival-time calculating portion 36 calculates an arrival time t2 when the moving object reaches the vehicle based on the distance to the vehicle, the moving speed and the moving direction of the moving object approaching to the vehicle which are detected by the moving-object moving-state detecting portion 32. The position of the vehicle is determined by the navigation device 13 or the GPS device 12. Herein, an arrival time when the moving object reaches the intersection may be calculated instead of the arrival time t2 of the moving object to the vehicle. In this case, the position of the intersection is determined by the navigation device. Also, an intersection-passing time calculating portion 54 calculates a time t1 which may be necessary for the vehicle to pass the intersection (or which is the arrival time when the vehicle reaches the intersection) based on the information of the navigation device 13, GPS device 12 and vehicle-speed sensor 10. An imaginary-image creating portion 38 creates an imaginary road image on the road face in accordance with the determination as to whether the moving object makes a turn or not and a dangerous degree which is determined from the time t1 which may be necessary for the vehicle to pass the intersection or which is the arrival time when the vehicle reaches the intersection and the arrival time t2 of the moving object to the vehicle. The imaginary-image creating portion 38 specifies the position and size of the imaginary road image. For example, the position and size of the imaginary road image is specified such that its width is the same as the width of the road or the traveling line and it is located so as to extend in front of the moving object. The created imaginary road image is indicated on the monitor 14 by the composite-image creating portion 26 so as to overlap the real image captured by the cameras 2, 4, 6.

The ECU 18 includes the vehicle's-head-exposure-position determining portion 50, which determines that the vehicle proceeds to the position for vehicle's head exposure (see FIG. 4). In this position the driver can observe the intersection fully, so a specified signal to stop the creation of the imaginary image at the imaginary-image creating portion 38 is supplied, so that the imaginary image is not indicated on the monitor 14. Further, the ECU 18 includes the imaginary-image-processing-execution determining portion 52, which determines whether or not the vehicle is located and stops temporarily near the intersection based on the map data from the navigation device 13, the position data from the GPS device 12 and the vehicle speed data from the vehicle-speed sensor 10. When the vehicle is located near the intersection and stops temporarily, a specified signal is supplied to the composite-image creating portion 26 for the indication of the imaginary image, which will be described later.

Figure 14:
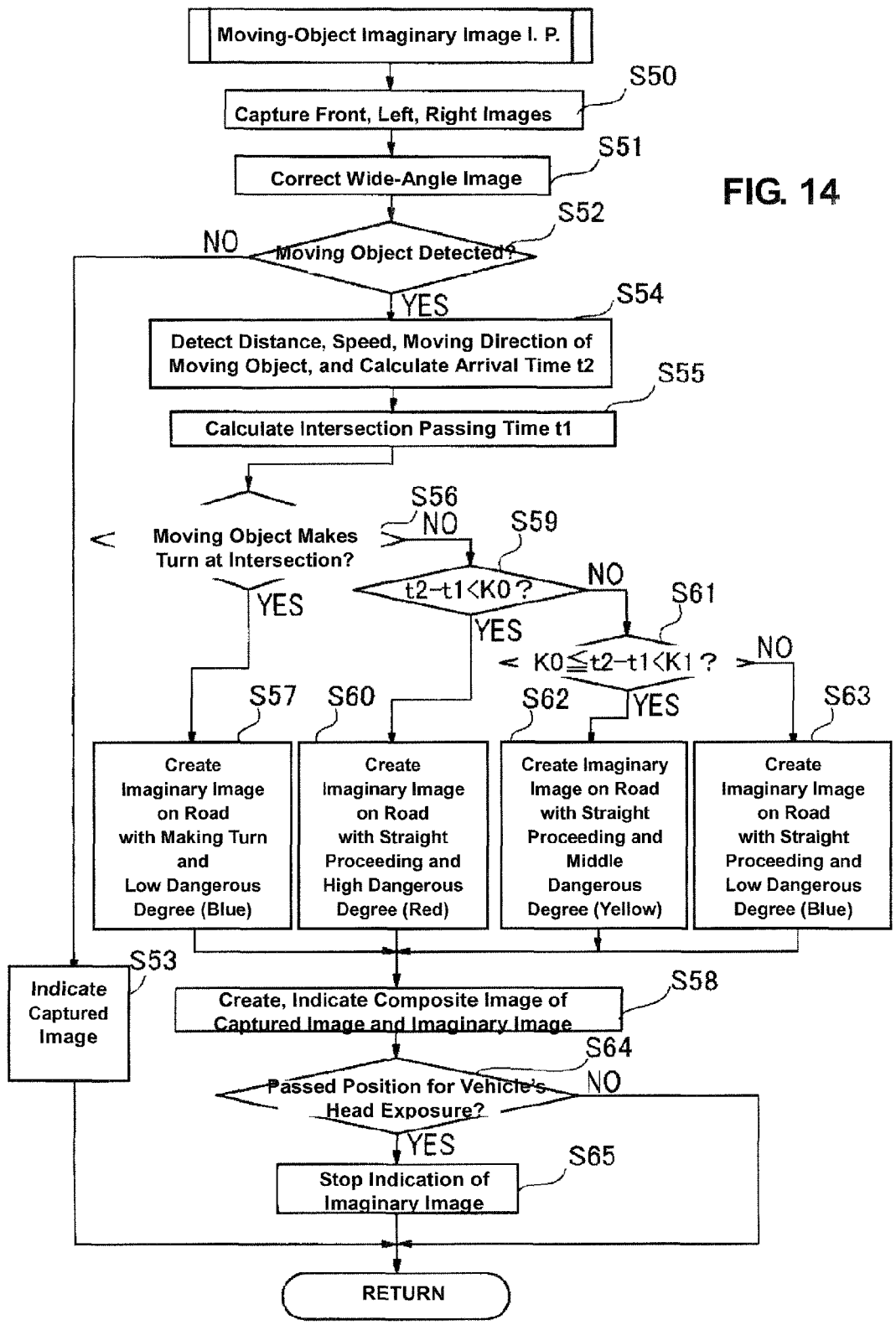
FIG. 14 is a flowchart of an indication processing of the imaginary image for recognizing the distance of the surroundings monitoring device for a vehicle according to the third embodiment of the present invention.
Figure 15B:
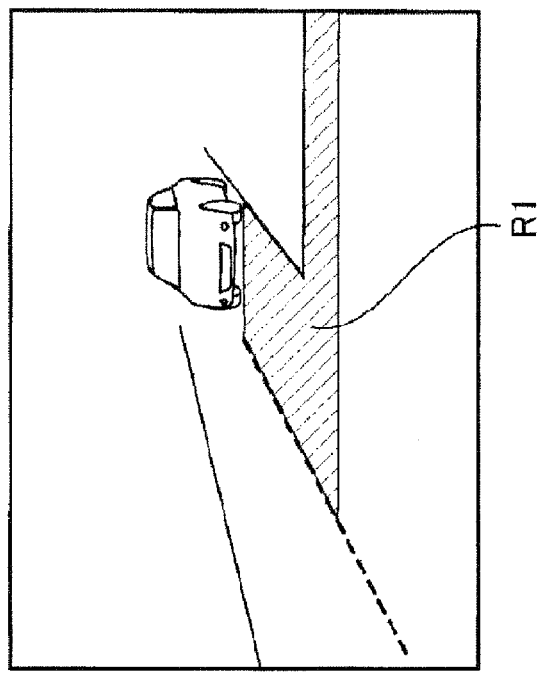
FIG. 15B is a diagram showing an example of the image in which an imaginary image overlaps a real image according to the third embodiment of the present invention.
Figure 15A:
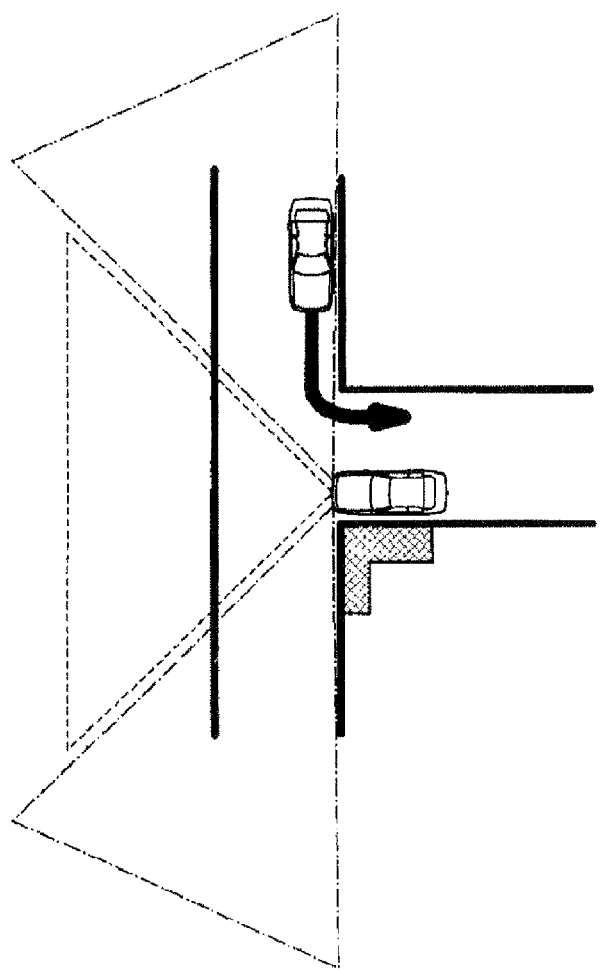
FIG. 15A is a diagram showing an example of the scope of the image picked up by the camera of the surroundings monitoring device for a vehicle and the moving object.

Next, the control of the surroundings monitoring device for a vehicle according to the third embodiment of the present invention will be described referring to FIGS. 14-16C. FIG. 14 is a flowchart of an indication processing of the imaginary image for recognizing the distance of the surroundings monitoring device for a vehicle according to the third embodiment of the present invention. FIG. 15A is a diagram showing an example of the scope of the image picked up by the camera of the surroundings monitoring device for a vehicle and the moving object, and FIG. 15B is a diagram showing an example of the image in which the imaginary image overlaps the real image according to the third embodiment of the present invention. FIG. 16A is a diagram showing an example of the scope of the image picked up by the camera of the surroundings monitoring device for a vehicle and the moving object, FIG. 16B is a diagram showing an example of the image in which the imaginary image overlaps the real image, and FIG. 16C is a diagram showing an example of the image in which the imaginary image overlaps the real image according to the third embodiment of the present invention. Reference characters S denotes each step in FIG. 14.

According to the third embodiment, the imaginary road image is indicated on the road face in accordance with the dangerous degree as to how soon the moving object reaches the vehicle or the intersection (when or how far) so as to overlap the real image of the surroundings including the actually existing moving object (another vehicle approaching the intersection and the like), thereby making the driver recognize the moving state of the moving object properly. Accordingly, the driver can be properly helped determine whether the vehicle may be started or not, for example. As shown in FIG. 14, at first in step S50, the image capturing portion 22 (see FIG. 13) captures the images from the camera for the left 2, the camera for the front 4, and the camera for the right 6 at the intersection, for example. Then, the captured wide-angle images are corrected by the image correcting portion 24 in step S51. Subsequently, in step S52, the moving object is detected from the real images obtained in the steps S50 and S51 by the ECU 18. This moving-object detection in the step S52 is conducted through the optical flow processing. Herein, the moving object may be detected in another manner than the optical flow processing, such as the background-differentiation processing, or the between-frames-differentiation processing, or the lazar or millimeter ways. When any moving object is not detected, the control proceeds to step S53, where the real images obtained in the steps S50 and S51 which are inputted to the composite-image creating portion 26 (see FIG. 13) are indicated simply. That is, the indication of the imaginary images is prohibited.

When the moving object is detected in the step S52, the control proceeds to step S54, where the moving-object moving-state detecting portion 32 detects the distance from the moving object to the vehicle and its speed and moving direction, and the arrival-time calculating portion 36 calculates the arrival time t2 of the moving object to the vehicle (see FIG. 13). The arrival time t2 of the moving object may be an arrival time to the intersection. In case of plural moving objects existing, the distance from the moving object to the vehicle, the speed and the moving direction of a specified moving object which is the closest to the vehicle or whose arrival time to the vehicle is the shortest are detected, and the arrival time of the specified moving object is calculated. Then, the intersection-passing time calculating portion 54 (see FIG. 13) calculates the time t1 which may be necessary for the vehicle to pass the intersection in step S55. Next, the control proceeds to step S56, where it is determined whether the moving object make a turn at the intersection or not based on the detection of the moving-object moving-state detecting portion 32 (see FIG. 13). When the moving object makes a turn, the control proceeds to step S57, where it is determined that the dangerous degree is low, and the imaginary-image creating portion 38 creates an imaginary road indication which is to be indicated so as to overlap the real image of a road face of a straight moving portion toward the intersection and a road face after a making a left turn. Herein, since the dangerous degree is low, the imaginary road indication is conducted in blue (color). In case of no colored indication, the indication may be shaded differently. In this case, the imaginary road indication may be shaded little (light), for example. Next, the control proceeds to step S58, where the imaginary road indication created in the step S57 is indicated as shown by R1 in FIG. 15B so as to overlap the real image. The driver can recognize quickly that the moving object is making a left turn from this imaginary road indication, so that the driver's determination of starting the vehicle can be easier.

When it is determined in the step S56 that the moving object proceeds straight, the control proceeds to step S59, where it is determined whether the difference between the arrival time t2 of the moving object to the vehicle and the arrival time t1 of the moving object to the intersection is less than a specified value k0 or not. When it is less than the specified value k0, the control proceeds to step S60, where it is determined that the dangerous degree is high because the vehicle may reach the intersection almost at the same time as the moving object, and the imaginary-image creating portion 38 creates an imaginary road indication which is to be indicated so as to overlap the real image of the road face of the straight moving portion to the intersection, including the area of the intersection. Herein, since the dangerous degree is high, the imaginary road indication is conducted in read (color). In case of no colored indication, the imaginary road indication may be shaded a lot (dark), for example. Next, the control proceeds to step S58, where the imaginary road indication created in the step S60 is indicated as shown by R2 in FIG. 16B so as to overlap the real image. The driver can recognize quickly that the moving object is coming straight toward the vehicle and being located close to the vehicle from this imaginary road indication, so that the driver's determination of staying there can be easier.

When it is determined in the step S59 that the moving object proceeds straight, the control proceeds to step S61, where it is determined whether the difference between the arrival time t2 of the moving object to the vehicle and the arrival time t1 of the moving object to the intersection is the specified value k0 or more and less than a specified value k1 or not. When it is the specified value k0 or more and less than the specified value k1, the control proceeds to step S62, where it is determined that the dangerous degree is middle because there is some difference in the arrival times of the moving object and the vehicle, and the imaginary-image creating portion 38 creates an imaginary road indication which is to be indicated so as to overlap the real image of the road face of the straight moving portion to the intersection, including the area of the intersection. Herein, since the dangerous degree is middle, the imaginary road indication is conducted in yellow (color). In case of no colored indication, the imaginary road indication may be shaded in a middle degree, for example. Next, the control proceeds to step S58, where the imaginary road indication created in the step S62 is indicated as shown by R3 in FIG. 16C so as to overlap the real image. The driver can recognize quickly that the moving object is coming straight toward the vehicle and reaching the vehicle shortly from this imaginary road indication, so that the driver's determination as to whether the vehicle may be started or should be stayed there can be easier. When it is determined in the step S61 that the difference between the arrival time t2 of the moving object to the vehicle and the arrival time t1 of the moving object to the intersection is the specified value k1 or more, the control proceeds to step S63, where it is determined that the dangerous degree is low because there is a large difference in the arrival times of the moving object and the vehicle, and the imaginary-image creating portion 38 creates an imaginary road indication which is to be indicated so as to overlap the real image of the road face of the straight moving portion to the intersection, including the area of the intersection. Herein, since the dangerous degree is low, the imaginary road indication is conducted in blue (color). In case of no colored indication, the imaginary road indication may be shaded little, for example. Next, the control proceeds to step S58, where the imaginary road indication created in the step S63 is indicated so as to overlap the real image. The driver can recognize quickly that the moving object is coming straight toward the vehicle and reaching the vehicle in a while from this imaginary road indication, so that the driver's determination of starting the vehicle can be easier.

Herein, while the manner of the imaginary road indication is changed in accordance with the arrival times t1, t2 in the step S58, it may be changed in accordance with the degree of preciseness of the calculation of the arrival time of the moving object. The degree of preciseness means the preciseness of the information, such as the autonomic-sensor information, vehicle-to-vehicle transmission information, vehicle-to-road transmission information, information-center supply information, and the like. For example, it may be determined that the degree of preciseness of the information is higher in the order of the autonomic-sensor information, vehicle-to-vehicle transmission information, vehicle-to-road transmission information, and information-center supply information. In case the degree of preciseness is high, the imaginary road indication may be indicated intermittently so as to blink, or the interval of blinking indication may be changed further, so that the driver can recognize the degree of preciseness. After the step S58, the control proceeds to step S64, where the vehicle's-head-exposure-position determining portion 50 (see FIG. 13) determines whether the vehicle has passed the position for vehicle's head exposure (see FIG. 4) or not. When the vehicle has the position for vehicle's head exposure, the control proceeds to step S65, where the indication of the imaginary image with the intermittent indication blinking by the composite-image creating portion 26 (see FIG. 13), which has been conducted in the step S58, is stopped.

Hereinafter, the operations and advantages of the third embodiment of the present invention will be described. According to the surroundings monitoring device of the third embodiment of the present invention, the blind area within the area expanding in front of the driver on the both (right and left) sides can be monitored. The cameras 2, 4, 6 are provided at the front portion of the vehicle so as to pick up the real image of the blind area, and the moving object can be recognized by the moving-object detecting portion 30 from the real image picked up by the cameras 2, 4, 6. Further, the moving state of the moving object is detected by the moving-object moving-state detecting portion 32, and the arrival-time calculating portion 36 calculates the arrival time t2 of the moving object. Further, the intersection-passing time calculating portion 54 calculates the time t1 which may be necessary for the vehicle to pass the intersection. The indication manner to indicate the imaginary road image by the imaginary-image creating portion 38 is specified based on these times. Then, the imaginary road image is created by the imaginary-image creating portion 38, and the imaginary road image is indicted on the monitor 14 in the specified indication manner so as to overlap the real image.

Also, according to the third embodiment, the imaginary road image is indicated in front of the moving object moving in accordance with the moving state of the moving object. Thereby, the imaginary indication of the traveling road of the moving object is also conducted, so that the driver can recognize the moving direction and state of the moving object properly. Further, according to the third embodiment, the above-described imaginary road indication is conducted in accordance with the arrival times of the vehicle and the moving object to the intersection. Thereby, the driver can recognize the moving direction and state of the moving object more properly. Also, according to the third embodiment, the above-described imaginary road indication is conducted in accordance with the preciseness degree of the calculation of the arrival times of the vehicle and the moving object to the intersection. Thereby, the driver can recognize the moving direction and state of the moving object more properly and accurately. Herein, it may be preferably determined that the preciseness degree of the information is higher in the order of the autonomic-sensor information, vehicle-to-vehicle transmission information, vehicle-to-road transmission information, and information-center supply information. Further, according to the third embodiment, the imaginary-image creating portion 38 is configured, in case of the moving object detecting portion 30 detecting the plural moving objects, that only the imaginary road indication of the specified moving object which is the closest to the vehicle or whose arrival time to the vehicle is the shortest is conducted. Thereby, the moving state of the moving object which the vehicle may possibly crash against can be recognized surely. Also, according to the third embodiment, in case all of the image images of the plural moving objects are indicated and thereby they are indicated so as to overlap the plural moving objects, only the imaginary road image of the specified moving object which is the closest to the vehicle or whose arrival time to the vehicle is the shortest is created. Thereby, the moving state of the moving object which the vehicle may possibly crash against can be recognized surely. Further, according to the third embodiment, the composite-image creating portion 26 is configured to indicate the imaginary image with only its contour, the transparent light color, or the intermittent indication blinking so that the imaginary image can be differentiated from the real image. Thereby, the driver can recognize the imaginary image properly without confusing it with the real image.

Also, according to the third embodiment, the composite-image creating portion 26 is configured to indicate the imaginary image of the moving object or the imaginary road, overlapping the current (updated) background and moving object. Thereby, the driver can see the current (updated) image as the real image, thereby recognizing the surrounding state and the moving state of the moving object more properly.

Hereinafter, modified embodiments (fourth through eighth embodiments) will be described. The surroundings monitor device for a vehicle according to these modified embodiments has further respective additional functions which are combined with the functions of the above-described embodiments (first through third embodiments). Accordingly, in the following descriptions referring to the accompanying drawings, only the additional part of functions will be described for each of the modified embodiments, omitting descriptions and drawings of the part related to the above-described base embodiments (first through third embodiments). Further, the same portions/structures of the surroundings monitor device as the above-described base embodiments are denoted by the same characters.

Embodiment 4

Figure 17:
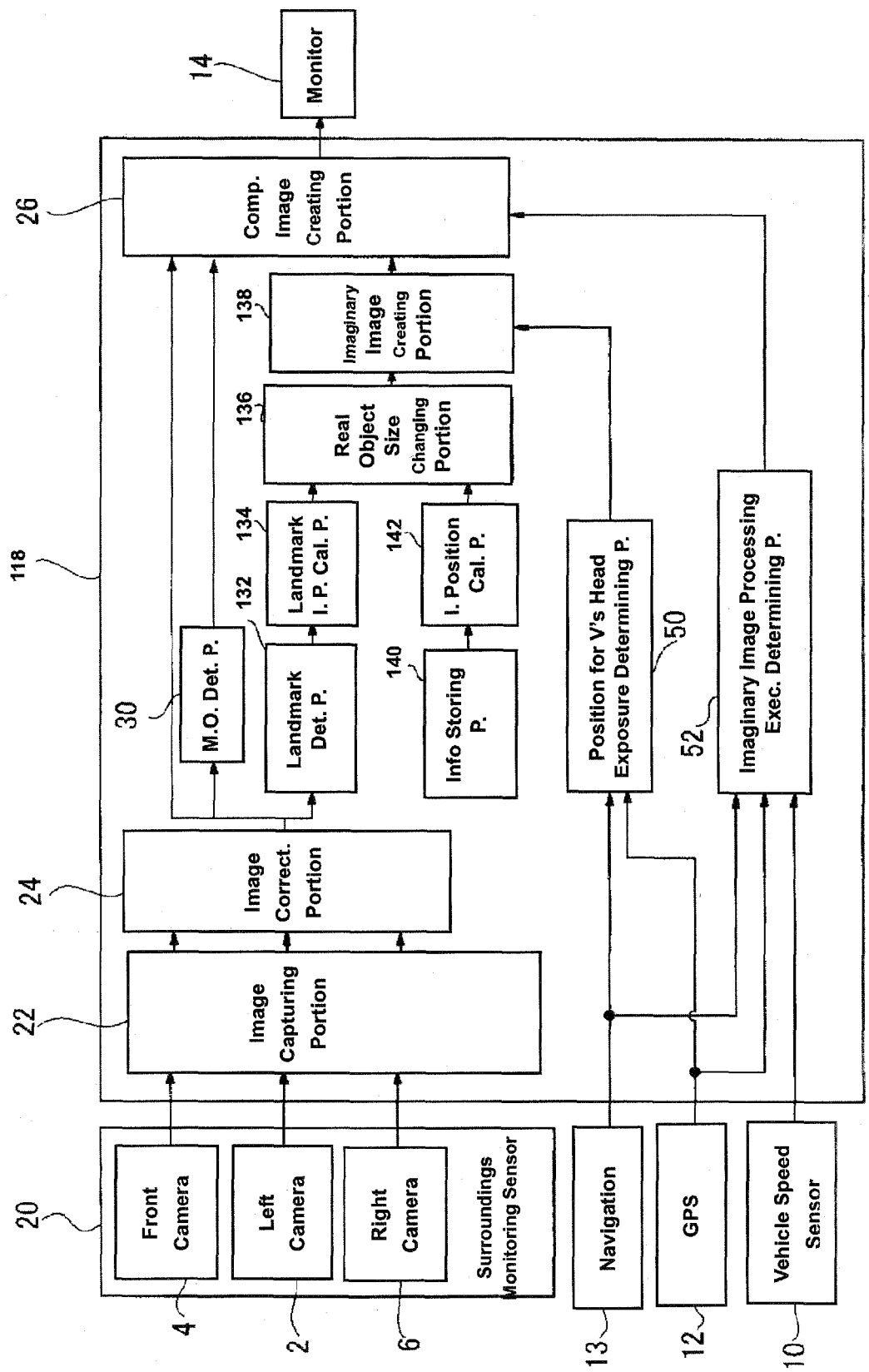
FIG. 17 is a block diagram showing the control content of the surroundings monitoring device for a vehicle according to a fourth embodiment of the present invention.

Hereinafter, the control of the surroundings monitoring device for a vehicle according to the fourth embodiment of the present invention will be described referring to FIG. 17. FIG. 17 is a block diagram showing the control content of the surroundings monitoring device for a vehicle according to the fourth embodiment of the present invention. The image signals from the cameras 2, 4, 6 which are the surroundings monitoring sensor 20 are inputted to the image capturing portion 22 of an ECU 118 as shown in FIG. 17. Herein, the inputted image signals are the wide-angle image and have some distortion, so the image is corrected at the image correcting portion 24. The image signal from the image correcting portion 24 is inputted to the composite-image creating portion 26 as the real image. The moving-object detecting portion 30 detects whether or not any moving object, such as another vehicle, motor cycle, or bicycle, exits in the inputted image from the image correcting portion 24. When such moving object does not exist, the imaginary image, which will be described later, is not indicated at the composite-image creating portion 26 and therefore this non-existence signal is supplied to the composite-image creating portion 26.

A landmark detecting portion 132 detects a landmark (real object) which is located within a range of vision of the driver, which will be described later. Namely, the landmark as the stationary object located around the road which is located within the driver's vision range, such as a utility pole, a street tree, a sign, which exists in the inputted image from the image correcting portion 24 is detected. A landmark indication-position calculating portion 134 determines where the detected landmark should be indicated in the image captured by the cameras 2, 4, 6 as the imaginary image for recognizing the distance. Then, a real-object size changing portion 136 determines how large the detected landmark should be indicated in the image captured by the cameras 2, 4, 6 as the imaginary image. Herein, the "position" of the landmark indication-position calculating portion 134 means any position within the blind area which is outside of the driver's vision range. The landmark located within the driver's vision range is indicated as the imaginary image on the monitor 14 at a specified position which is outside the driver's vision range and near the moving object as described later, so that the driver can recognize the position of the moving object easily. The real-object size changing portion 136 judges how large the moving object at the position may be observed and determines its size, thereby changing the size of the landmark. Accordingly, the driver can intuitively recognize the sense of distance to the moving object. Then, an imaginary-image creating portion 138 creates an imaginary image of the landmark, and the imaginary image is indicated so as to overlap the real image captured from the cameras 2, 4, 6 by the composite-image creating portion 26. In case any landmark is not detected by the landmark detecting portion 132, data of information of the existing object (real object), the size of which is known, such as the utility pole, street tree, or sign, which are stored by an information storing portion 140 are supplied to an existing-object indication-position calculating portion 142, where it is determined where such exiting object should be indicated in the image captured from the cameras 2, 4, 6. Next, as described above, the real-object size changing portion 136 determines how large the existing object should be indicated in the image captured from the cameras 2, 4, 6 as the imaginary image for recognizing the distance.

Herein, as similar to the above-described case of the landmark, the "position" of the existing-object indication-position calculating portion 142 means any position within the blind area which is outside of the driver's vision range. The existing object, the size of which is known, is indicated as the imaginary image on the monitor 14 at a specified position which is outside the driver's vision range and near the moving object as described later, so that the driver can recognize the position of the moving object easily. Likewise, the real-object size changing portion 136 judges how large the moving object at the position may be observed and determines its size, thereby changing the size of the existing object. Accordingly, the driver can intuitively recognize the sense of distance to the moving object. Then, an imaginary-image creating portion 138 creates an imaginary image of the existing object based on the information from the information storing portion 140, and the imaginary image is indicated so as to overlap the real image captured from the cameras 2, 4, 6 by the composite-image creating portion 26.

Figure 19:
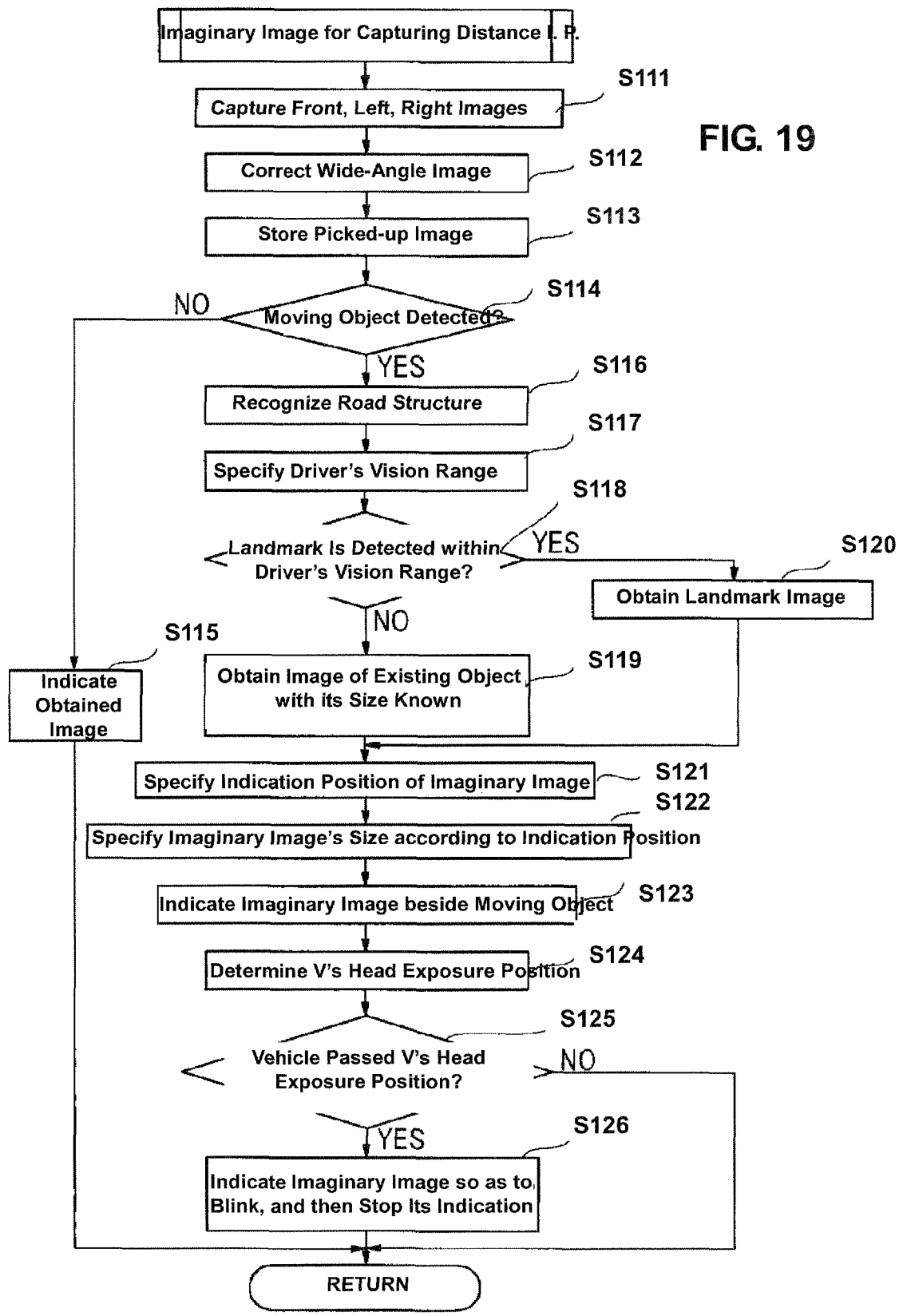
FIG. 19 is a flowchart of an indication processing of the imaginary image for recognizing the distance of the surroundings monitoring device for a vehicle according to the fourth embodiment of the present invention.
Figure 20B:
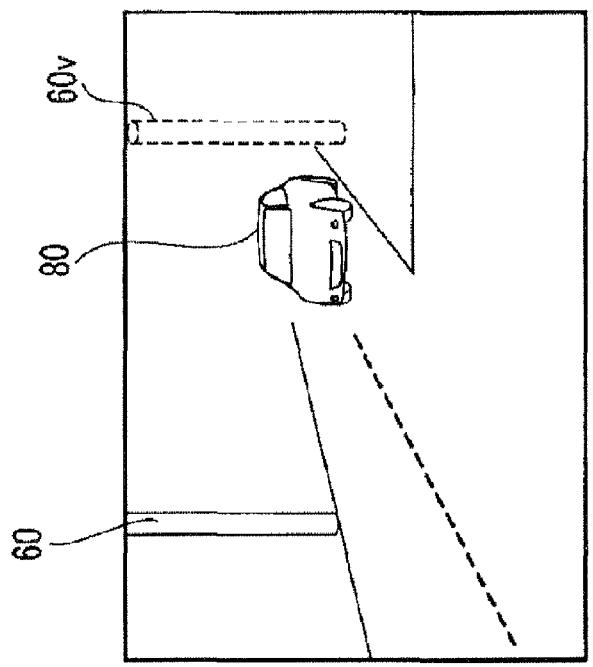
FIG. 20B is a diagram showing an example of the image in which an imaginary image overlaps a real image according to the fourth embodiment of the present invention.
Figure 20A:
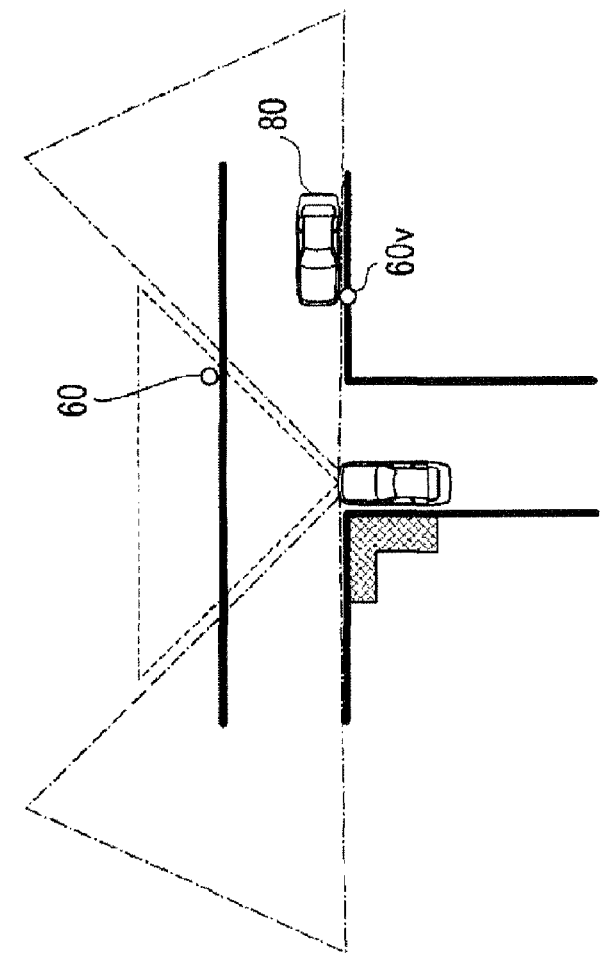
FIG. 20A is a diagram showing an example of the scope of the image picked up by the camera of the surroundings monitoring device for a vehicle, a landmark and a moving object.
Figure 21B:
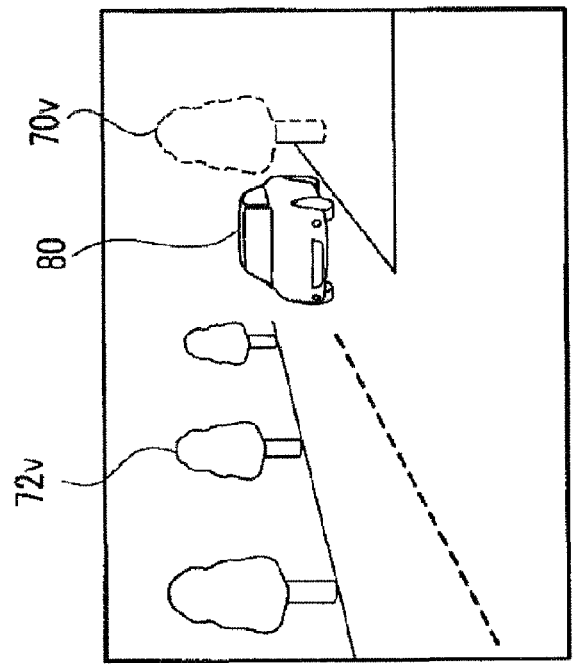
FIG. 21B is a diagram showing an example of the image in which the imaginary image overlaps the real image according to the fourth embodiment of the present invention.
Figure 21A:
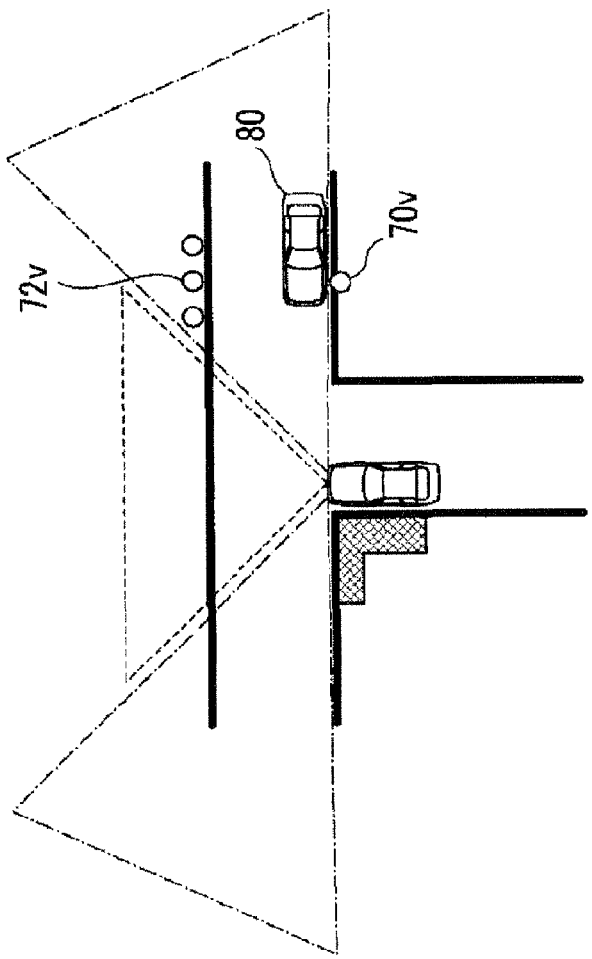
FIG. 21A is a diagram showing an example of the scope of the image picked up by the camera of the surroundings monitoring device for a vehicle and the moving object.
Figure 22:
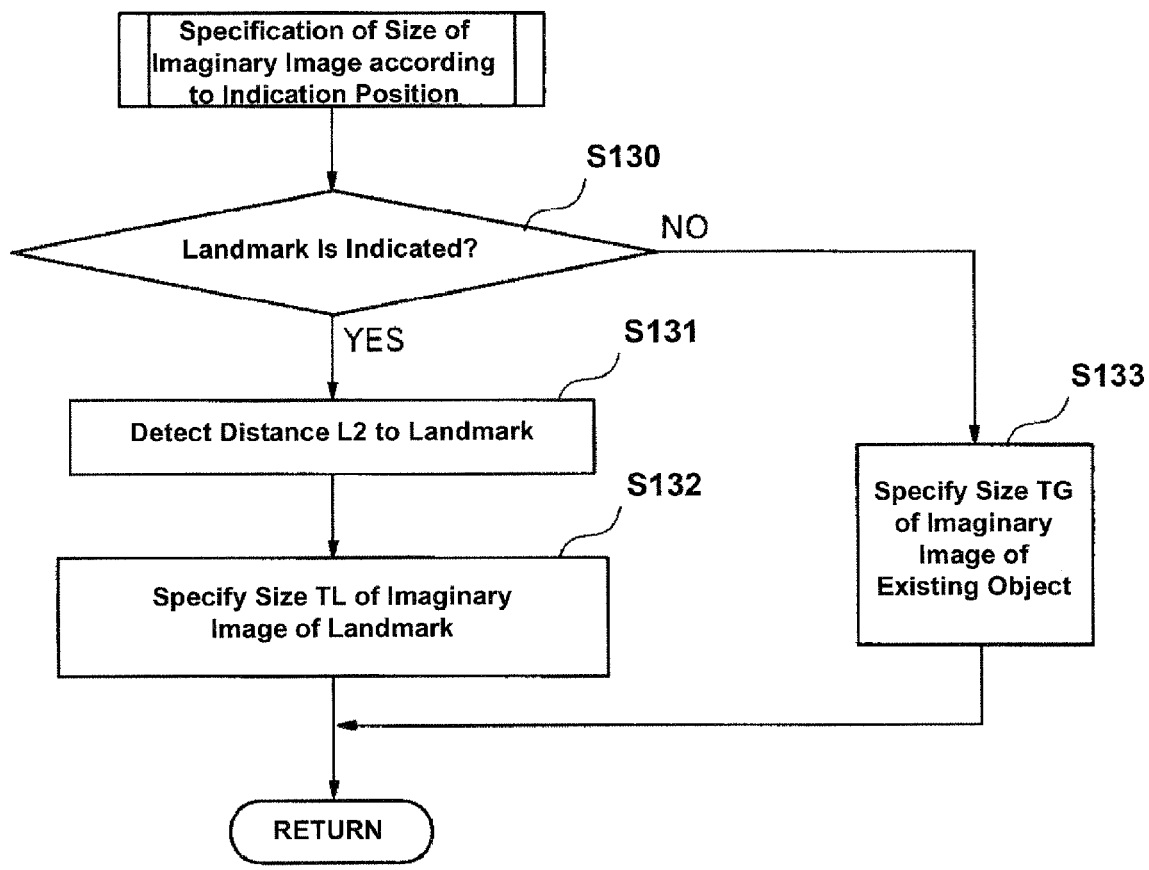
FIG. 22 is a flowchart showing processing content of a size change of the imaginary image of the surroundings monitoring device for a vehicle according to the fourth embodiment of the present invention.

Hereinafter, the control content of the surroundings monitor device for a vehicle according to the fourth embodiment of the present invention referring to FIGS. 19 and 22. FIG. 19 is a flowchart of an indication processing of the imaginary image for recognizing the distance of the surroundings monitoring device for a vehicle according to the fourth embodiment of the present invention. FIG. 20A is a diagram showing an example of the scope of the image picked up by the camera of the surroundings monitoring device for a vehicle, a landmark and a moving object, and FIG. 20B is a diagram showing an example of the image in which an imaginary image overlaps a real image according to the fourth embodiment of the present invention. FIG. 21A is a diagram showing an example of the scope of the image picked up by the camera of the surroundings monitoring device for a vehicle and the moving object, and FIG. 21B is a diagram showing an example of the image in which the imaginary image overlaps the real image according to the fourth embodiment of the present invention. FIG. 22 is a flowchart showing processing content of a size change of the imaginary image of the surroundings monitoring device for a vehicle according to the fourth embodiment of the present invention. Reference characters S denote steps in FIGS. 19 and 22.

Next, the content of the imaginary-image indication processing for recognizing the distance will be described referring to FIG. 19. As shown in FIG. 19, at first in step S111, the image capturing portion 22 (see FIG. 17) captures the images from the camera for the left 2, the camera for the front 4, and the camera for the right 6 at the intersection, for example. Then, the captured wide-angle images are corrected by the image correcting portion 24 in step S112. The picked-up images are saved in a memory (not illustrated) temporarily in step S113. Subsequently, in step S114, the moving object is detected from the real images obtained in the steps S111 and S112 by the ECU 118. This moving-object detection in the step S114 is conducted through the optical flow processing.

Herein, the moving object may be detected in another manner than the optical flow processing, such as the background-differentiation processing, or the between-frames-differentiation processing, or the lazar or millimeter ways. When any moving object is not detected, the control proceeds to step S115, where the real images obtained in the steps S111 and S112 which are inputted to the composite-image creating portion 26 (see FIG. 17) are indicated simply. That is, the indication of the imaginary images is prohibited. When the moving object is detected in the step S114, the control proceeds to step S116, where the road structure is recognized by the ECU 118 by conducting the image processing to the real images obtained in the steps S111 and S112. Herein, the road structure means a road side, a sidewalk, or the like. The recognition of the road structure is for determining where the imaginary image of a landmark or an existing object, which will be described later, is indicated, e.g., for determining such imaginary image is indicated at the road side, the sidewalk, or anywhere. Then, the control proceeds to step S117, where the landmark detecting portion 132 (see FIG. 17) specifies the driver's vision range. A predetermined range within the range of the real image obtained in the steps S111 and S112 is specified in the step S117 as the one which the driver can view. Herein, the driver's vision may be specified with an eye camera or the like.

Next, the control proceeds to step S118, where the landmark detecting portion 132 (see FIG. 17) determines whether or not the landmark is detected within the driver's vision range specified in the step S117. The landmark is the utility pole, street tree, sign, or the like. The detection of landmark may be conducted through an image-pattern matching, a three-dimensional model matching, or the like. As some examples are shown in FIGS. 20A, B and 21A, B, a utility pole 60 as the landmark exists within the driver's vision range in the example shown in FIG. 20A, and no landmark exists within the driver's vision range in the example shown in FIG. 21A. Herein, as shown in FIGS. 20A and 21A, another vehicle 80 as the moving object exists within the blind area of the driver. When the landmark is not detected within the driver's vision range as shown in FIG. 21A in the step S118, the control proceeds to step S119, where an image of the existing object with its size known is obtained from the information storing portion 140. Meanwhile, when the landmark is detected within the driver's vision range as shown in FIG. 20A in the step S118, the control proceeds to step S120, where the landmark detecting portion 132 (see FIG. 17) obtains the image of the landmark itself. Then, the control proceeds to step S121 from the S119 or step S120, where the indication position of the real object (existing object, landmark) is specified by the existing-object indication-position calculating portion 142 (see FIG. 17) or the landmark indication-position calculating portion 134. This is concretely specified as the indication position which is located beside the moving object detected in the step S114. Herein, the distance L1 from the vehicle to the moving object (another vehicle 80) (see FIGS. 20A and 21A) is measured by the laser radar, millimeter-waves or camera image. The position beside the moving object with the distance L1, that is, the position of the road side or the side walk which are the distance L1 away from the vehicle is specified as the indication position. In case the distance is measured by the camera image, the distance may be obtained judging from the height of the moving object in the image.

As described later, in case of the landmark, a landmark 60v of the utility pole as the imaginary image is indicated on the monitor 14 at the position on the sidewalk which is the distance L1 away as shown in FIG. 20B. In case of the existing object, an existing object 70v of the street tree as the imaginary image is indicated on the monitor 14 at the position on the sidewalk which is the distance L1 away as shown in FIG. 21B. Herein, plural street trees 72v or utility poles may be indicated as shown in FIG. 21B so that the drive can get the sense of distance. Next, the control proceeds to step S122, where the size of the imaginary image is specified in accordance with the indication position specified in the step S121. The processing of the step S122 will be described referring to FIG. 22. At first, in step S130 the ECU 118 determines whether the landmark is indicated or not. For example, in case the step S120 is executed, the landmark is indicated. In case the step S119 is executed, the landmark is not indicated. In case the landmark indication is conducted, the control proceeds to step S131, where the ECU 118 detects the distance L2 from the vehicle to the landmark. The detection of the distance L2 may be conducted in the same manner as the above-described detection of the distance L1. Then, the control proceeds to step S132, where the size TL of the imaginary image of the landmark is specified. This size TL is calculated from an equation: $TL = k \times (L2/L1)$. Herein, L1 is the distance to the moving object, a coefficient k is a specified fixed value, and L2 is the distance detected in the step S131. Meanwhile, in case the landmark indication is not conducted, the control proceeds to step S133, where the size TG of the imaginary image of the existing object is specified. This size TG is calculated from an equation: $TG = k \times (L0/L1)$. Herein, L1 is the distance to the moving object, a coefficient k is a specified fixed value, and L0 is a predetermined standard distance for indication of the existing object.

Figure 18:
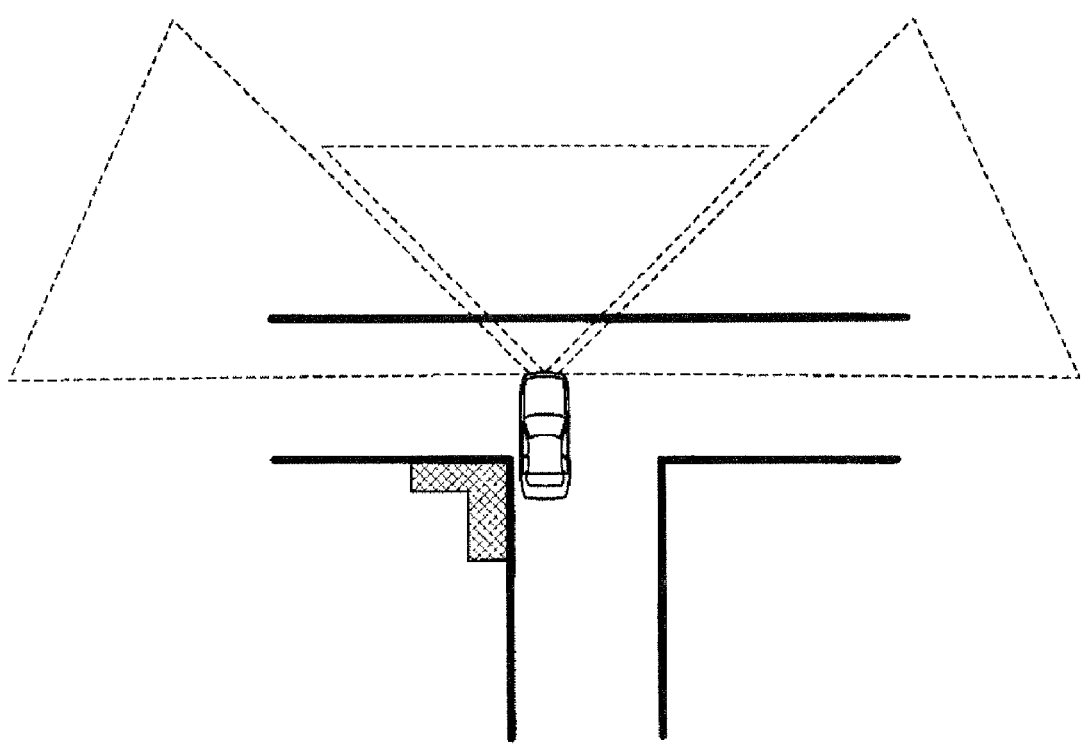
FIG. 18 is an explanatory diagram showing a position for vehicle's head exposure on a road.

Returning to FIG. 19, in step S123 the composite-image creating portion 26 (see FIG. 17) indicates the utility pole 60v (see FIG. 20B) and the street tree 70v (see FIG. 21B) as the imaginary image of the real object at the position beside the moving object in accordance with the position of the real object (landmark, existing object) specified in the step S121 and the size of the real object (landmark, existing object) specified in the step S122 so as to overlap the real image. The control proceeds to step S124, where the vehicle's-bead-exposure-position determining portion 50 (see FIG. 17) determines the position for vehicle's head exposure (see FIG. 18). There are some methods for determining the position for vehicle's head exposure. For example, it is determined from the vehicle's position obtained by the GPS device 12 and the map data of the navigation device 13. Or, it may be determined from the position of the stop line obtained from the cameras 2, 4, 6 and the moving distance obtained from a moving distance sensor (not illustrated) by determining how far the vehicle proceeds from the stop line. Or, it may be determined from the images from the cameras 2, 4, 6 by determining the position for vehicle's head exposure when the right-and-left clear view is obtained (no obstacle to prevent the clear view). Or, it may be determined from the position of the stop line obtained from the cameras 2, 4, 6 and the surrounding image of the intersection. Next, the control proceeds to step S125, where the vehicle's-head-exposure-position determining portion 50 (see FIG. 17) determines whether the vehicle has the position for vehicle's head exposure or not. When the vehicle has the position for vehicle's head exposure, the control proceeds to step S126, where the composite-image creating portion 26 (see FIG. 17) makes the imaginary image indicated in the step S123 blink, and then the indication of the imaginary image is stopped. The blinking indication of the imaginary image may enable the driver to recognize the possibility of actually seeing any moving object with the driver's own eyes or recognize any moving object which cannot be actually seen with the driver's own eyes. Meanwhile, when the vehicle does not have the position for vehicle's dead exposure, the indication of the imaginary image and the real image in the step S123 is maintained.

According to the fourth embodiment, the real object which is memorized, the size of which is known, or the real object which exists within the range of vision of the driver are captured as the imaginary image, and the imaginary-image specifying means is configured to specify the position of the imaginary image of the real object such that the imaginary image of the real object is indicated beside the moving object so as to be located at the roadside. Thereby, the driver can recognize the sense of distance to the moving object precisely.

Embodiment 5

Figure 23:
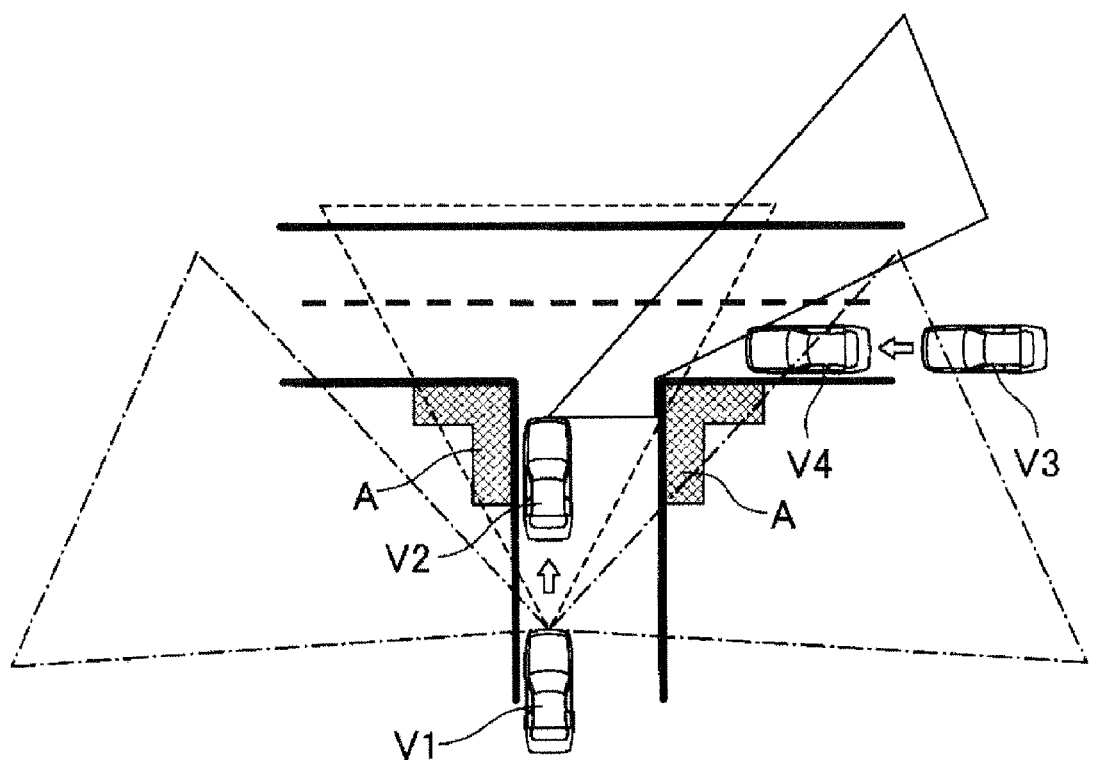
FIG. 23 is an explanatory diagram of the content of the surroundings monitoring device for a vehicle according to a fifth embodiment of the present invention.
Figure 24:
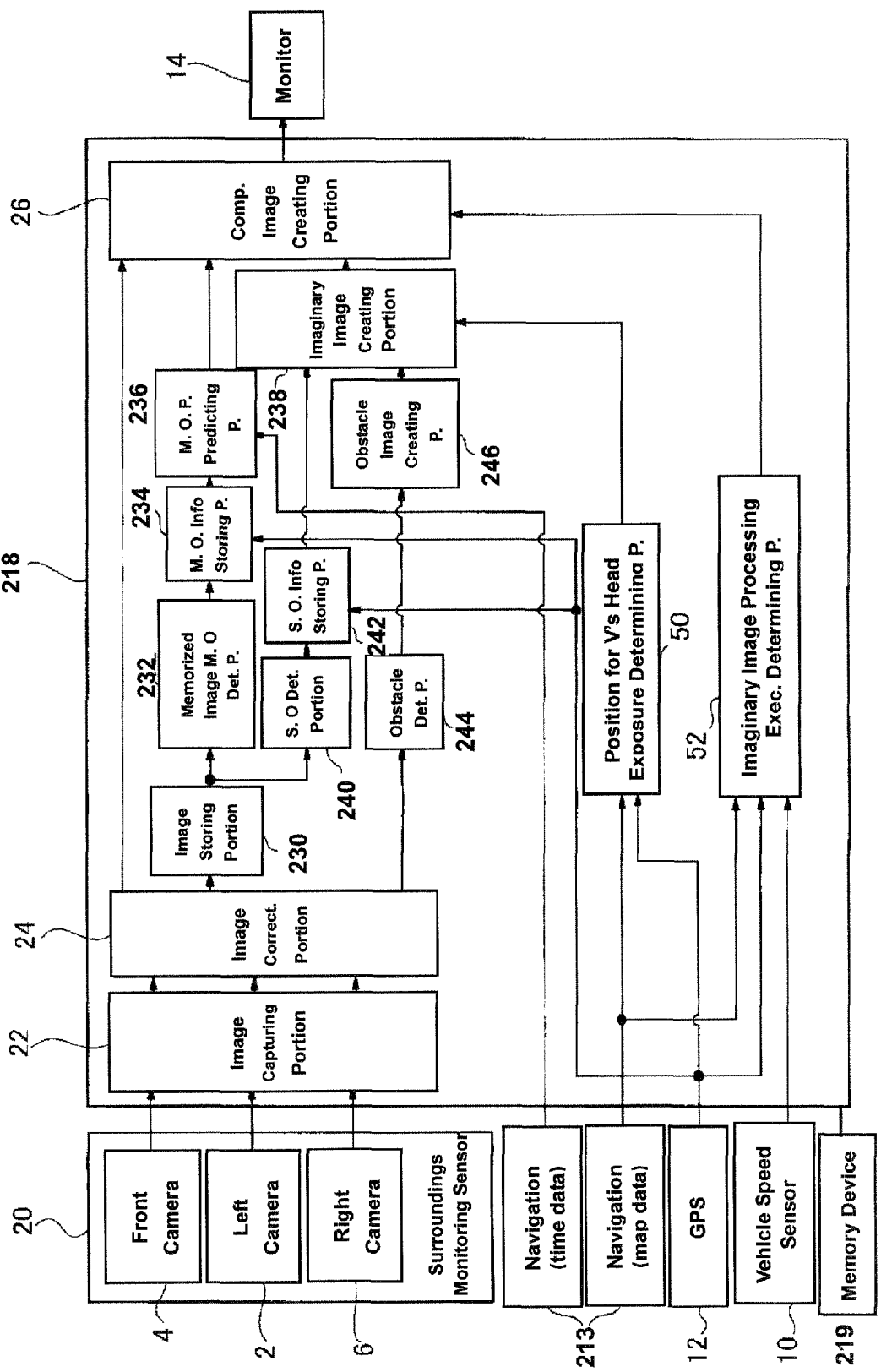
FIG. 24 is a block diagram showing the control content of the surroundings monitoring device for a vehicle according to the fifth embodiment of the present invention.

Hereinafter, the control content of the surroundings monitoring device for a vehicle according to the fifth embodiment of the present invention will be described referring to FIG. 23. FIG. 23 is an explanatory diagram of the content of the surroundings monitoring device for a vehicle according to the fifth embodiment of the present invention. FIG. 24 is a block diagram showing the control content of the surroundings monitoring device for a vehicle according to the fifth embodiment of the present invention. As shown in FIG. 23, the camera of the vehicle V1 may capture the image of another vehicle V3, but as the vehicle approaches the intersection, the view of the camera of the vehicle V2 which has reached more close to the intersection may be interrupted by an obstacle A so that the camera of the vehicle V2 may not capture the image of another vehicle V4. According to the fifth embodiment of the present invention, an image of another vehicle V4 which has moved from the former position of another vehicle V3 is indicated as its imaginary image on the monitor of the vehicle V2 based on a memorized image of another vehicle V3 which has been detected previously. Herein, the obstacle A is indicated transparently in such a manner that an area behind the obstacle is visible therethrough.

The image signals from the cameras 2, 4, 6 which are the surroundings monitoring sensor 20 are inputted to the image capturing portion 22 of an ECU 218 as shown in FIG. 24. Herein, the inputted image signals are the wide-angle image and have some distortion, so the image is corrected at the image correcting portion 24. The image signal from the image correcting portion 24 is inputted to the composite-image creating portion 26 as the real image. A picked-up-image saving portion 230 saves the inputted image from the image correcting portion 24 at a memory device 219 which the vehicle has together with the ECU 218. A memorized-image moving-object detecting portion 232 detects any moving object of the four-wheeled vehicle or the like which is approaching the vehicle from the memorized image saved by the picked-up-image saving portion 230. Specifically, the kind of the moving object (four-wheeled vehicle, pedestrian, and the like) may be detected with the image-pattern matching, and its moving direction and speed may be also detected through the optical flow processing, background-differentiation processing, or between-frames-differentiation processing, or the like. In the present embodiment, the moving object is detected from the image which has been picked up before the vehicle enters into the intersection, such as at a moment the obstacle A does not exist (see FIG. 23), for example.

A moving-object information accumulating portion 234 accumulates data of information of the position, size, speed and direction of the moving object detected by the memorized-image moving-object detecting portion 232 at the memory device 219. A moving-object position predicting portion 236 predicts the current position and the size of the moving object from the time of accumulating the information and the current time based on the information accumulated at the memory device 219. An imaginary-image creating portion 238 creates the imaginary image of the moving object with the predicted position and size of the moving object. Meanwhile, a stationary-object detecting portion 240 detects a stationary object from the image which has been picked up before the vehicle enters into the intersection, such as at a moment the obstacle A does not exist (see FIG. 23), for example, based on the memorized image saved by the picked-up-image saving portion 230. A stationary-object information accumulating portion 242 accumulates information of the position and size of the stationary object detected by the stationary-object detecting portion 240 at the memory device 219. The imaginary-image creating portion 238 creates the imaginary image of the stationary object with the detected position and size of the stationary object. An obstacle detecting portion 244 detects the obstacle, such as a guardrail or wall, which may interrupt the view of the camera from the real image obtained by the image correcting portion 24 through the image-pattern matching or the like. An obstacle-image creation determining portion 246 determines whether only the real image is indicated on the monitor 14 without creating the imaginary image or the imaginary image is indicated so as to overlap the real image. The imaginary-image creating portion 238 creates the imaginary image of the obstacle to be indicated in such a manner that the indicated position of the obstacle is changed or the moving obstacle behind the obstacle is visible through the obstacle. The composite-image creating portion 26 creates the composite image of the respective imaginary images created by the imaginary-image creating portion 238 and the real image.

Figure 25:
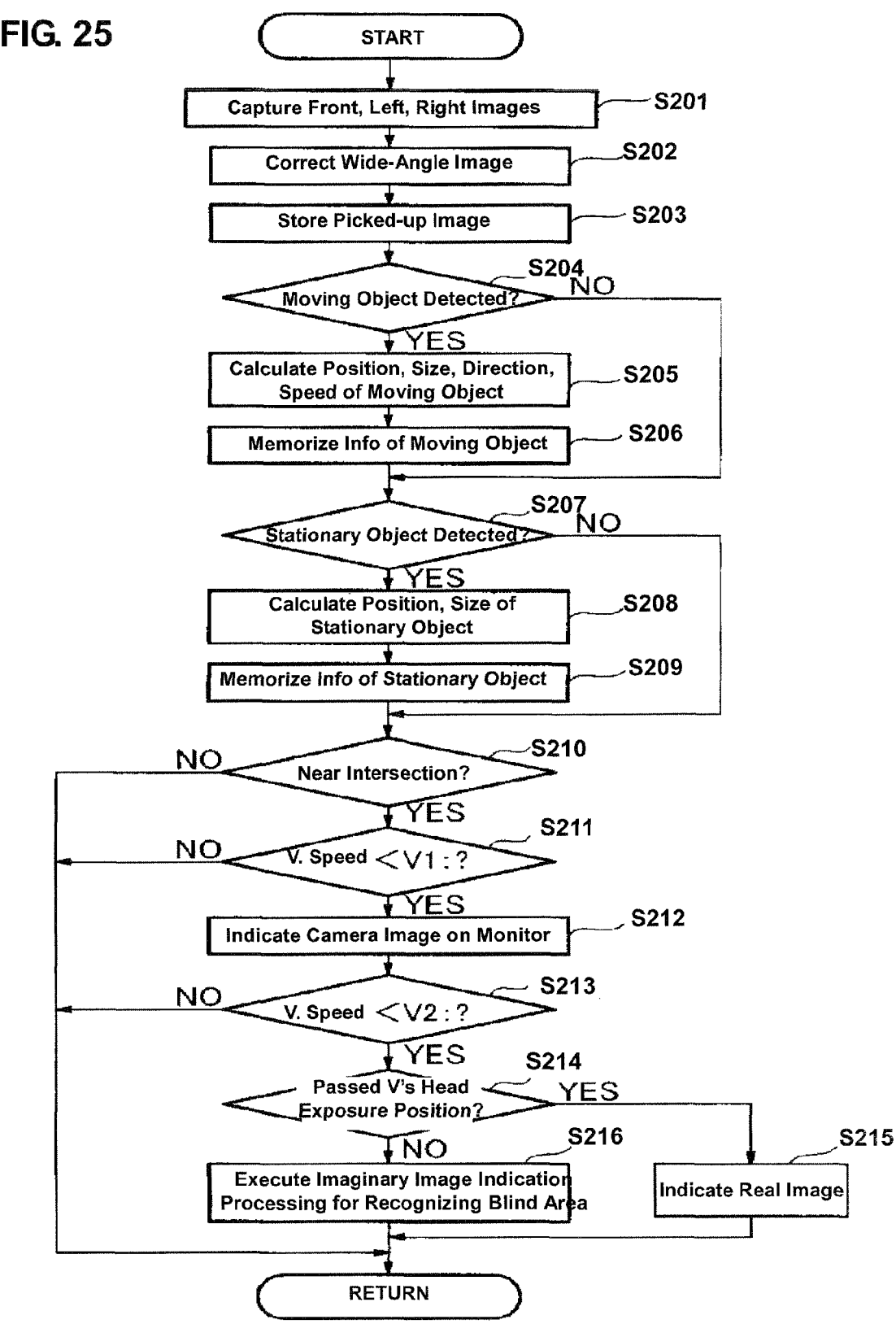
FIG. 25 is a flowchart of processing of determining whether an imaginary image for recognizing a blind area for the surroundings monitoring device for a vehicle is indicated or not according to the fifth embodiment of the present invention.

Hereinafter, the control abstract of the surroundings monitoring device for a vehicle according to the fifth embodiment of the present invention will be described. FIG. 25 is a flowchart of processing of determining whether the imaginary image for recognizing the blind area for the surroundings monitoring device for a vehicle is indicated or not according to the fifth embodiment of the present invention. Reference characters S denotes each step in FIG. 25. As shown in FIG. 25, at first in step S201, the image capturing portion 22 (see FIG. 25) captures the images from the camera for the left 2, the camera for the front 4, and the camera for the right 6 at the intersection, for example. Then, the captured wide-angle images are corrected by the image correcting portion 24 in step S202. The picked-up images are saved in the memory device 219 in step S203. In the present embodiment, the image which is captured by the cameras all the time since the moment before the vehicle enters into the intersection and memorized through the steps S201-S301.

In the next step S204, the memorized-image detecting portion 232 (see FIG. 24) detects the moving object from the real images obtained in the step S201 and S202. This moving-object detection in the step S204 is conducted through the optical flow processing. Herein, the moving object may be detected in another manner than the optical flow processing, such as the background-differentiation processing, or the between-frames-differentiation processing, or a lazar or millimeter ways. When the moving object is detected in the step S204, the control proceeds to step S205, where the memorized-image moving-object detecting portion 232 (see FIG. 24) calculates the position, size, moving direction and moving speed of the moving object. In the next step S206, the moving-object information accumulating portion 234 (see FIG. 24) accumulates the position, size, speed and direction of the moving object which are calculated in the step S205 at the memory device 219. According to the present embodiment, the data of information of the moving object since the moment before the vehicle enters into the intersection is memorized continuously in the step S206. For example, the data of the position, size and moving direction of the moving object relative to the time is accumulated. When any moving object is not detected, the processing of the steps S205 and S206 are not executed. In the next step S207, the stationary-object detecting portion 240 detects the stationary object from the real images obtained in the steps S201 and S202. This detection of the stationary object in the step S207 is conducted through the image processing. When the stationary object is detected in the step S207, the control proceeds to step S208, where the stationary-object detecting portion 240 calculates the position and size of the stationary object. In the next step S209, the stationary-object information accumulating portion 242 (see FIG. 24) accumulates the position and size of the stationary object calculated in the step S208 at the memory device 19. According to the present embodiment, the data of information of the specified stationary object, such as automotive vehicle or pedestrians which moves essentially, since the moment before the vehicle enters into the intersection is memorized continuously in the step S209. Data of another type of stationary object, such as signs or traffic signals, is accumulated all the time. When any stationary object is not detected, the processing of the steps S208 and S209 are not executed.

The imaginary-image processing execution determining portion 52 (see FIG. 24) determines whether the vehicle is located near the intersection or not based on the signals from the GPS 12 and the navigation device 13 in the next step S210. Next, in step S211, the imaginary-image processing execution determining portion 52 (see FIG. 24) determines whether the vehicle speed is less than V1 or not based on the signal from the vehicle-speed sensor 10. Herein, the vehicle speed V1 is set to be slow enough to enable the driver to see the monitor 14 safely. When the vehicle speed decreases below the vehicle speed V1, the control proceeds to step S212, where the real image is indicated based on the image signal from the image correcting portion 24. Then, in step S213, the imaginary-image processing execution determining portion 52 (see FIG. 24) determines whether the vehicle speed is lower than V2 or not. Herein, the value of the vehicle speed V2 is set to be zero or almost zero, whereby it can be determined that the vehicle has stopped substantially. When the vehicle speed is lower than V2, the control proceeds to step S214, considering that the vehicle stops temporarily. In the step S214, it is determined whether the vehicle has passed the position for vehicle's head exposure or not. When the vehicle has passed the position for vehicle's head exposure, the driver may view the surroundings properly. Accordingly, the control proceeds to step S215, where the real image obtained in the steps S201 and 202 is indicated on the monitor 14. When the vehicle has not passed the intersection, the control proceeds to step S216, where an imaginary-image indication processing for recognizing the blind area is executed.

Figure 26:
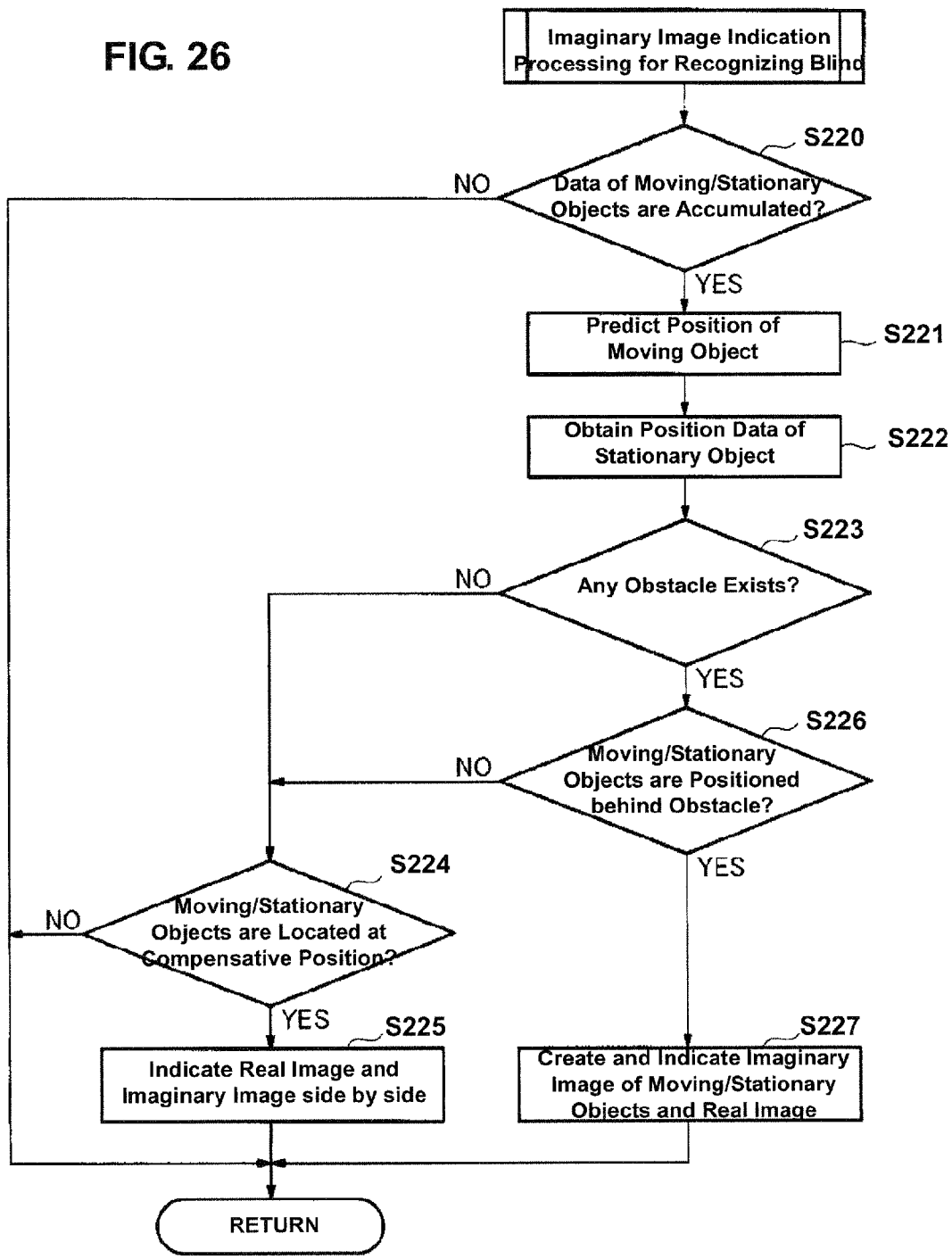
FIG. 26 is a flowchart of an imaginary-image indication processing for recognizing the blind area for the surroundings monitoring device for a vehicle according to the fifth embodiment of the present invention.

Hereinafter, the content of the imaginary-image indication processing for recognizing the blind area for the surroundings monitoring device for a vehicle according to the present embodiment will be described referring to FIG. 26. FIG. 26 is a flowchart of the imaginary-image indication processing for recognizing the blind area for the surroundings monitoring device for a vehicle according to the fifth embodiment of the present invention. Reference characters S denote each step in FIG. 26. In step S220, it is determined whether or not the data of the moving object or the data of the stationary object are accumulated. Specifically, it is determined whether or not the moving-object information is accumulated in the step S206 or the stationary-object information is accumulated in the step S209 for a specified time before the vehicle enters into the intersection. In case of no data accumulated, the indication of the imaginary image for recognizing the blind area is not conducted. Meanwhile, in case the data is accumulated, the control proceeds to step S221, where the moving-object position predicting portion 236 (see FIG. 24) predicts the current position of the moving object. This predicted position is indicated as the imaginary image, as described later. However, the position recognition of the moving object may be left to the driver's judgment without the prediction of the position in the step S221 and the indication of the predicted position. In this case, a vector indication for showing the moving direction and speed may be attached to the moving object indicated. The control proceeds to step S222, where the position data of the stationary object accumulated by the stationary-object information accumulating portion 242 is obtained.

Figure 27:
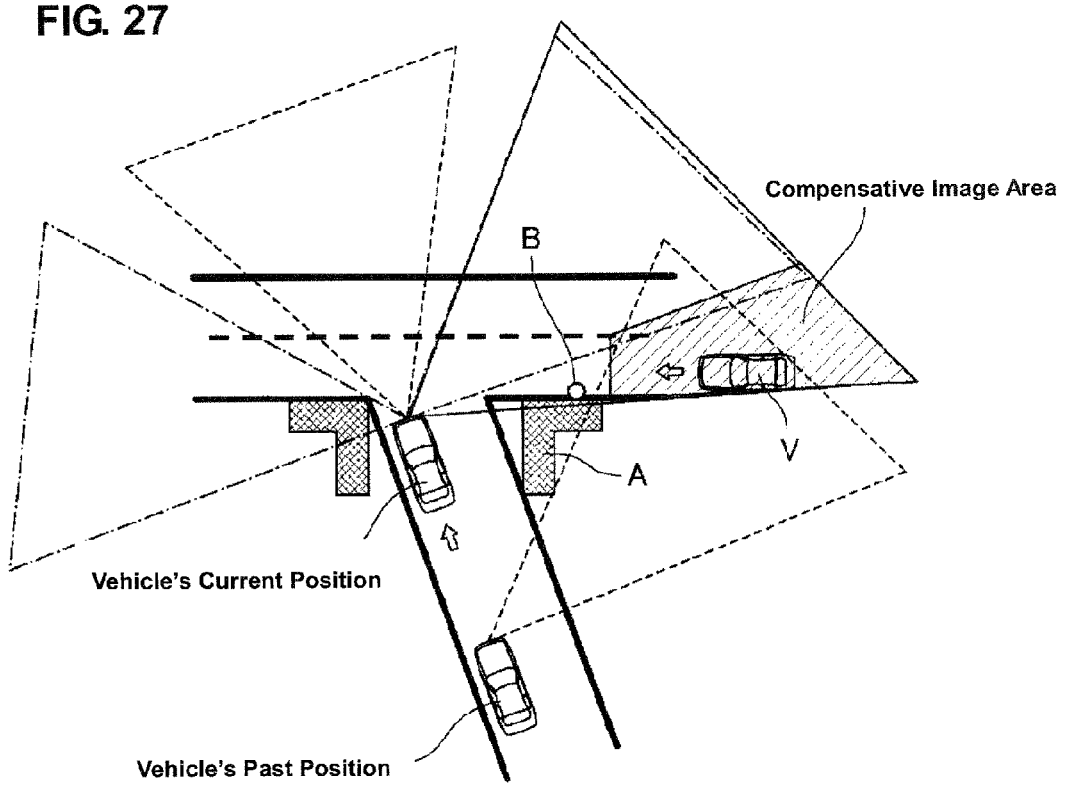
FIG. 27 is a diagram showing a vehicle equipped with the surroundings monitoring according to the fifth embodiment of the present invention, an image-capturing area of a camera, and a surrounding road condition.
Figure 28:
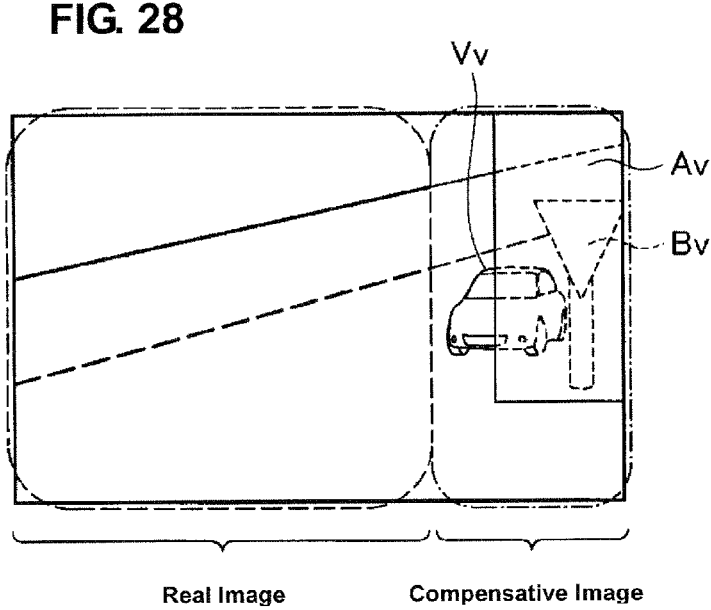
FIG. 28 is an example of a real image and a panorama image of a compensative image which are indicated on the monitor by the surroundings monitoring device for a vehicle according to the fifth embodiment of the present invention.

Next, it is determined in step S223 whether any obstacle to interrupt the view of the cameras 2, 6 exists or not. For example, any object which limits the view range to a specified near range is determined as the obstacle. For example, as shown in FIG. 27, in case the intersection is formed with roads which do not cross at right angles, no obstacle is located in the view range of the right camera 6, but the driver of the vehicle may not see another vehicle V. In this case, the control proceeds to step S224, whether it is determined whether the moving object or the stationary object are located at a compensative position or not. Herein, the compensative position means a case in which, as shown in FIG. 27 no obstacle is located in the view range of the right camera, but the moving object or the stationary object are located at a location outside the view range of both the driver and the cameras. Such compensative position is illustrated as a compensative image area in FIG. 27. When the moving object or the stationary object are located at the compensative position, the control proceeds to step S225, where the real image captured by the cameras and the imaginary image are indicated side by side. This compensative image is the imaginary image which is created based on the past information of the moving object or the stationary object at the past time which are specified from the moving-object accumulated data or the stationary-object accumulated data. For example, in the case shown in FIG. 27, an imaginary image shown in FIG. 28, in which the real image from the cameras is indicated on the left, and an imaginary image Av of the obstacle A (see FIG. 27), an imaginary image of the sign B (see FIG. 27), and an imaginary image Vv of another vehicle V (see FIG. 27) as the moving object are indicated on the right as the compensative image, is created by the composite-image creating portion 26 (see FIG. 24). This imaginary image is indicated on the monitor 14. Thereby, the state of the range which becomes the blind area for both the driver and the cameras can be recognized by using the past data. Herein, the moving object may be preferably indicated at the current position of the moving object which has been predicted in the step S221.

Figure 29:
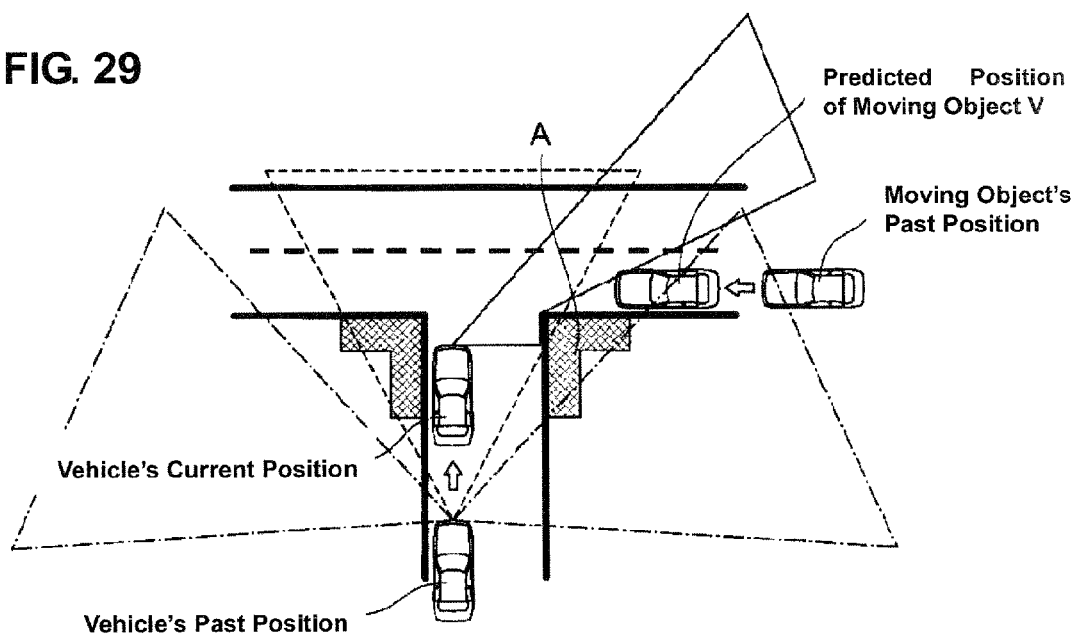
FIG. 29 is a diagram showing the vehicle equipped with the surroundings monitoring according to the fifth embodiment of the present invention, another image-capturing area of the camera, and another surrounding road condition.
Figure 30:
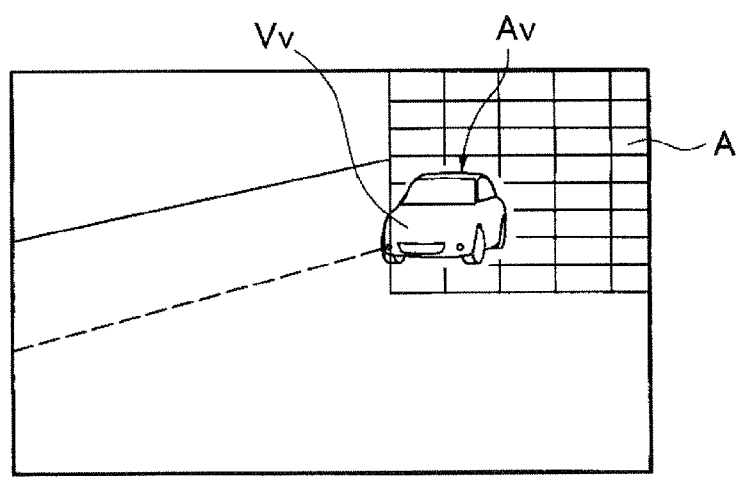
FIG. 30 is an example of a composite image of a real image and an imaginary image which is indicated on the monitor by the surroundings monitoring device for a vehicle according to the fifth embodiment of the present invention.
Figure 31:
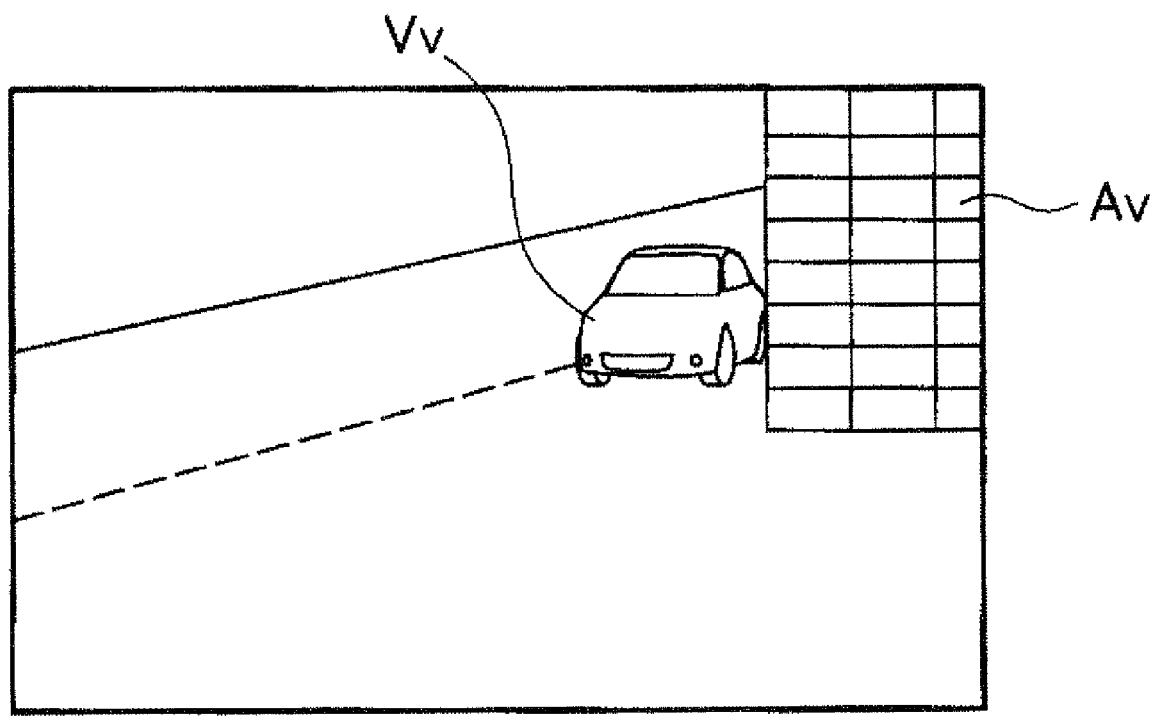
FIG. 31 is another example of the composite image of the real image and the imaginary image which is indicated on the monitor by the surroundings monitoring device for a vehicle according to the fifth embodiment of the present invention.

Then, when it is determined in the step S223 that the obstacle to interrupt the view is located in the view range of the cameras 2, 6, for example, that the obstacle A exists within the view range of the cameras when seen from the current vehicle position as shown in FIG. 29, the control proceeds to step S226, where it is determined whether or not the moving object or the stationary object are poisoned behind the obstacle. When they are not positioned behind the obstacle, the control proceeds to step S224, where the above-described processing is executed. Meanwhile, when they are positioned behind the obstacle, the control proceeds to step S227, where the composite-image creating portion 26 (see FIG. 24) creates the composite image of the imaginary image and the real image of the moving object or the stationary object, and the composite image is indicated on the monitor 14. The moving object may be indicated at the past position based on the past information, or at current position which is predicted in the step S221. The stationary object is indicated at the past-accumulated position. Herein, the timing of "past" regarding the stationary object includes both the timing which is right before the vehicle entering into the intersection and the timing the vehicle is used to pass. The timing of "past" regarding the moving object means the timing right before the vehicle entering into the intersection. In the next step S227, as shown in FIG. 30, for example, the imaginary image Av of the obstacle A is indicated in such a manner that the moving object or the stationary object which are located behind the obstacle A are visible through the indicated obstacle A. Thereby, the imaginary image Vv of another vehicle V is indicated overlapping part of the obstacle A indicated as illustrated. Further, the imaginary image Av of the obstacle may be indicated so as to be off set from its actual position so that the driver can recognize the imaginary image Vv of another vehicle V as shown in FIG. 31.

According to the fifth embodiment, the memory device 219 memorizes the real image picked up by the cameras 2, 4, 6, the imaginary-image creating portion 238 creates the imaginary image of the area which is blind for the cameras 2, 4, 6 from the real image which has been memorized by the memory device 219, and the memorized-image moving-object detecting portion 232 detects the moving object from the real image memorized by the memory device 219. Herein, the imaginary-image creating portion 238 is configured to create the imaginary image of the moving object at the point before the view of the moving object is interrupted by the obstacle. The composite-image creating portion 26 creates the composite image of the imaginary image of the moving object when the view of the moving object is interrupted by the obstacle, overlapping the real image. This composite image is indicated on the monitor 14. Thereby, the driver can recognize the existence of the moving object which the vehicle may possibly collide against. Further, according to the fifth embodiment, the imaginary-mage creating portion 238 is further configured to create the imaginary image of the obstacle within the real image picked up by the cameras 2, 4, 6 in such a manner that the area behind the obstacle is visible through the imaginary image of the obstacle. The composite-image creating portion 26 creates the composite image of the imaginary image of the moving object and the imaginary image of the obstacle. This composite image is indicated on the monitor 14. Thereby, the driver can recognize the existence of the moving object more effectively. Also, according to the fifth embodiment, the imaginary-image creating portion 238 is further configured to create the imaginary image of the obstacle within the real image picked up by the cameras 2, 4, 6 in such a manner that the position of the imaginary image of the obstacle created is off set from its actual position such that the area behind the obstacle is visible beside the imaginary image of the obstacle. The composite-image creating portion 26 creates the composite image of the imaginary image of the moving object and the imaginary image of the obstacle. This composite image is indicated on the monitor 14. Thereby, the driver can recognize the existence of the moving object more effectively.

Embodiment 6

Figure 32:
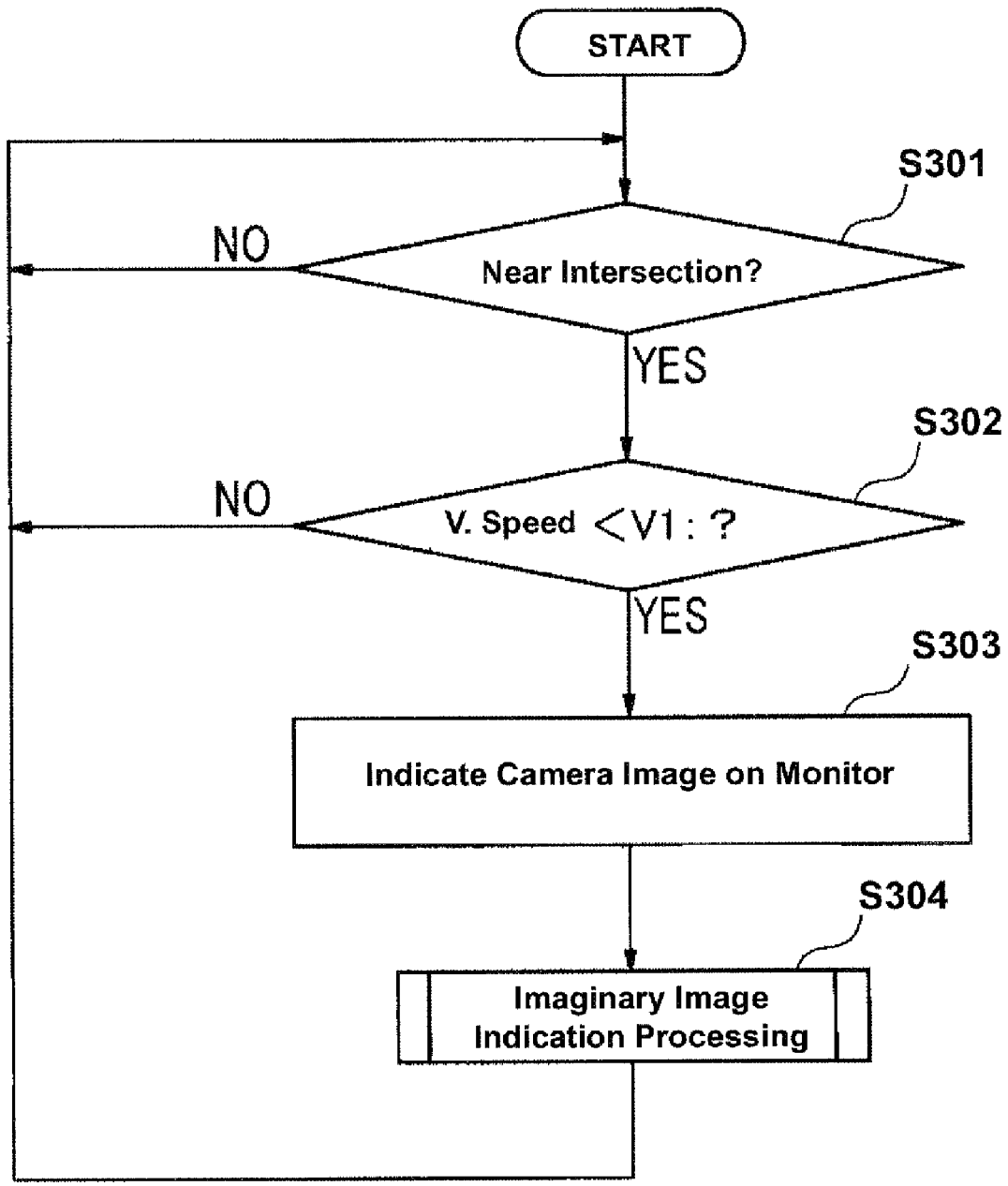
FIG. 32 is a flowchart of processing of determination as to whether an imaginary image for capturing the distance is indicated or not by the surroundings monitoring device for a vehicle according to a sixth embodiment of the present invention.
Figure 33:
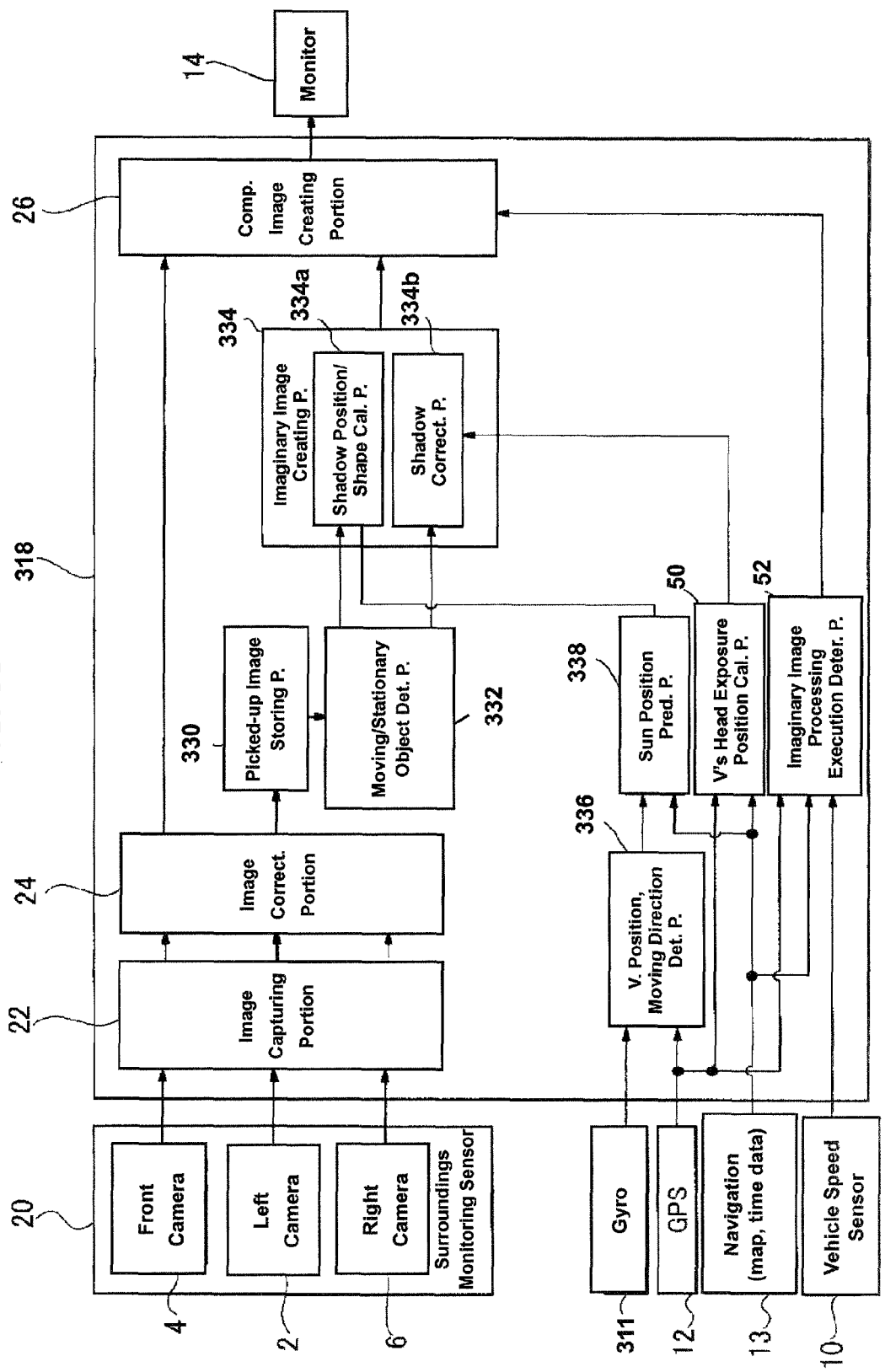
FIG. 33 is a block diagram showing the constitution of the surroundings monitoring device for a vehicle according to the sixth embodiment of the present invention.

Hereinafter, the control of determining whether an imaginary image indication processing is executed or not by the surroundings monitoring device for a vehicle according to the sixth embodiment of the present invention will be described referring to FIG. 33. FIG. 33 is a flowchart of processing of determination as to whether an imaginary image for capturing the distance is indicated or not by the surroundings monitoring device for a vehicle according to the sixth embodiment of the present invention. In FIG. 32, it is determined whether the vehicle is located near the intersection or not based on the signals of the GPS 12 and the navigation device 13 in step S301. It is determined whether or not the vehicle speed is smaller than V1 based on the signal of the vehicle speed sensor 10 in step S302. Herein, the vehicle speed V1 is set to be slow enough to enable the driver to see the monitor 14 safely. When the vehicle speed reduces below the vehicle speed V1, the control proceeds to step S303, where the actual image is indicated based on the image signal from the image correcting portion 24. Then, an imaginary-shadow-image indication processing is executed in the next step S304.

Hereinafter, the constitution of the surroundings monitoring device for a vehicle according to the sixth embodiment of the present invention will be described referring to FIG. 33. FIG. 33 is a block diagram showing the constitution of the surroundings monitoring device for a vehicle according to the sixth embodiment of the present invention. According to the sixth embodiment, the position of the sun, which is obtained with calculation, is set to be a position of the imaginary light source for making an imaginary shadow for the moving object and the stationary object, and an image of the imaginary shadow which is made for the moving object and the stationary object when the moving object and tie stationary object are lighted with the imaginary light source is created and indicated. Herein, the position of the sun may be obtained with calculation and thereby the imaginary shadow image may be created despite a situation in which it is a cloudy day or the moving object (another vehicle approaching the intersection) or the stationary object (sign, traffic signal, etc.) exist right behind a building or the like so as to be located in a shadow area of such building or the like. The driver sees the imaginary shadow of the object, and determines how far the moving object or the like are away from the vehicle based on the direction and length of the shadow, for example. As a result, the driver can be properly helped in determining whether the vehicle is to be started or not.

The image signals from the cameras 2, 4, 6 which are the surroundings monitoring sensor 20 are inputted to the image capturing portion 22 of an ECU 318 as shown in FIG. 33. Herein, the inputted image signals are the wide-angle image and have some distortion, so the image is corrected at the image correcting portion 24. The image signal from the image correcting portion 24 is inputted to the composite-image creating portion 26 as the real image. A picked-up-image storing portion 330 stores the image corrected by the image correcting portion 24. A moving-object stationary-object detecting portion 332 detects the existence of the moving object, such as another vehicle, and the stationary object, such as a sign, within the inputted image from the image correcting portion 24. This moving-object detection is conducted through the optical flow processing. Herein, the moving object may be detected in another manner than the optical flow processing, such as the background-differentiation processing, or the between-frames-differentiation processing, or the lazar or millimeter ways. The stationary-object detection is conducted through the image processing. In case the stationary object exists, the position and shape of the stationary object is detected by the image processing, lazar radar 7 or the like. The information of the moving object and the stationary object detected by the moving-object stationary-object detecting portion 332 is supplied to an imaginary-image creating portion 334. A shadow position/shape calculating portion 334a of the imaginary-image creating portion 334 calculates shapes and indication positions of the imaginary shadow images of the moving object and the stationary object based on the information supplied and information of the position of the sun as the imaginary light source, which will be described later. The imaginary shadow images are corrected by a shadow correcting portion 334b in accordance with the state of the moving object and the stationary object as described later.

A vehicle position/moving-direction detecting portion 336 detects the change of moving direction of the vehicle with a gyroscope 311, and detects the position and moving direction of the vehicle with the gyroscope 311 and the GPS device 12. An imaginary light-source position setting portion 338 calculates the position of the sun as the imaginary light source based on the information of the latitude and the longitude from the GPS device 12, the information of the moving direction of the vehicle from the gyroscope 311, and the current time. The shadow position/shape calculating portion 334a calculates the shapes and indication positions of the imaginary shadow images of the moving object and the stationary object based on this calculated position of the sun. The shadow correcting portion 334b corrects the images in accordance with the state of the moving object and the stationary object. The ECU 318 includes the vehicle's-head-exposure determining portion 50, which determines that the vehicle has the position for vehicle's head exposure. When the vehicle has the position for vehicle's head exposure, the driver can view over the intersection, so the creation of the imaginary image by the imaginary-image creating portion 334 is stopped. As a result, only the real image is indicated on the monitor 14. The ECU 318 further includes the imaginary-image processing execution determining portion 52, which determines whether or not the vehicle is located near the intersection and the vehicle stops temporarily based on the map data from the navigation device 14, the position data from the GPS 12, and the vehicle speed data from the vehicle-speed sensor 10. When the vehicle is located near the intersection and the vehicle stops temporarily, the specified signal for the indication of the imaginary image is supplied to the composite-image creating portion 26 as described later.

Figure 34:
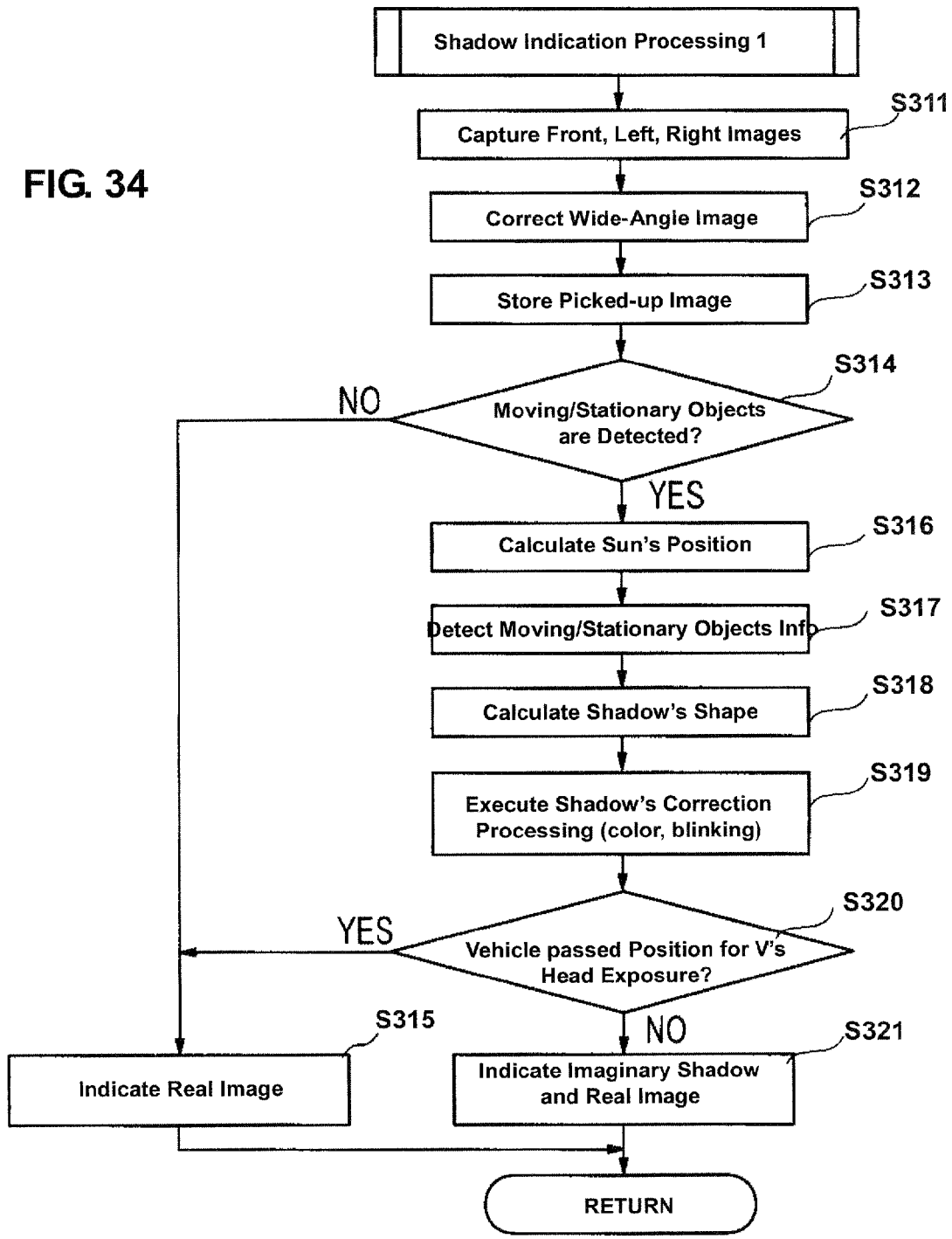
FIG. 34 is a flowchart of indication processing of the imaginary image for capturing the distance by the surroundings monitoring device for a vehicle according to the sixth embodiment of the present invention.
Figure 35A:
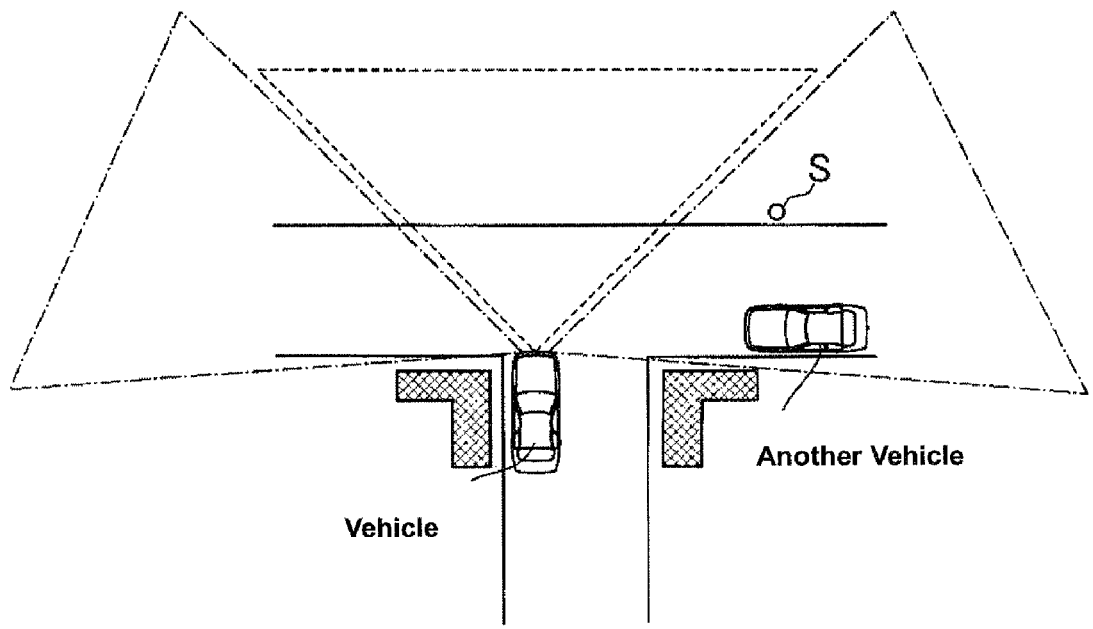
FIG. 35A is a diagram showing an example of a scope of an image picked up by the camera and an moving object.
Figure 35B:
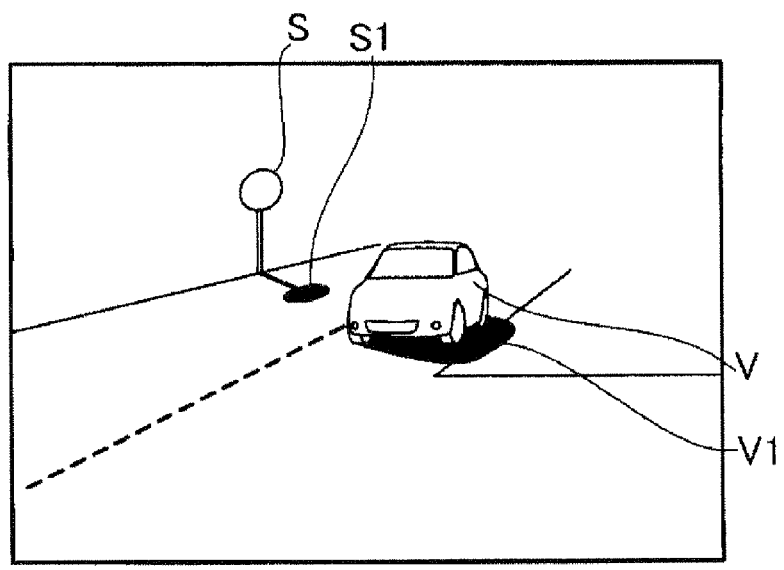
FIG. 35B is an example of an image of an imaginary image overlapping a real image according to the sixth embodiment of the present invention.

Next, the control of the surroundings monitoring device for a vehicle according to the sixth embodiment of the present invention will be described referring to FIGS. 34 and 35A, B. FIG. 34 is a flowchart of indication processing of the imaginary image for capturing the distance by the surroundings monitoring device for a vehicle according to the sixth embodiment of the present invention. FIG. 35A is a diagram showing an example of a scope of the image picked up by the camera and the moving object, and FIG. 35B is an example of an image of the imaginary image overlapping the real image according to the sixth embodiment of the present invention. Reference characters S denotes each step in FIG. 34. As shown in FIG. 34, at first in step S311, the image capturing portion 22 captures the images from the camera for the left 2, the camera for the front 4, and the camera for the right 6 at the intersection, for example. Then, the captured wide-angle images are corrected by the image correcting portion 24 in step S312. In the next step S313, the picked-up image is stored. Subsequently, in step S314, the moving object and the stationary object are detected from the real images obtained in the steps S311 and S312 by the moving-object stationary-object detecting portion 332. When any moving object or stationary object are not detected, the control proceeds to step S315, where the real images obtained in the steps S311 and S312 are indicated simply. When the moving object or the stationary object are detected in the step S314, the control proceeds to step S316, where the imaginary light-source position setting portion 338 (see FIG. 33) calculates (predicts) the position of the sun as the imaginary light source as descried above. Then, in the next step S317, the moving-object stationary-object detecting portion 332 (see FIG. 33) detects the shape, position, and moving direction and speed of the moving object and the shape and position of the stationary object.

In the next step S318, the shadow position/shape calculating portion 334a (see FIG. 33) calculates the shapes of the imaginary shadow images of the moving object and the stationary object based on the position of the sun predicted in the step S316 and the shapes of the moving object and the stationary object as described above. Subsequently, the correction processing of the shade is executed by the shadow correcting portion 334b (see FIG. 33) in step S319. Herein, as one of the corrections, in case it is detected by the moving-object stationary-object detecting portion 332 (see FIG. 33) that there is another vehicle which travels at a high speed or zigzags, the indication color of the imaginary shadow image of such vehicle may be changed from its original color of black to a red color. Or, as another example of correction, the indication color of the imaginary shadow image is changed, such as black, green, blue, in accordance with the kinds (four-wheeled vehicle, two-wheeled vehicle, traffic signal, sign, etc.) of the moving object or the stationary object detected by the moving-object stationary-object detecting portion 332 (see FIG. 33). As further another example of correction, in case the plurality of moving objects are detected by the moving-object stationary-object detecting portion 332 (see FIG. 33), the imaginary shadow image of a following vehicle is indicated so as to blink or in a gray color. Further, the indication manner of the imaginary shadow image may be changed in accordance with the moving speed and direction of the moving object. In the next step S320, it is determined whether the vehicle has passed the position for vehicle's head exposure. When the vehicle has passed the position for vehicle's head exposure, the driver may get a clear surrounding view. Then, the control proceeds to step S315, where the real images captured in the steps S311 and S312 are indicated on the monitor 14 simply. When the vehicle has not passed the position for vehicle's head exposure, the control proceeds to step S321, where the imaginary shadow image corrected in the step S319 is indicated so as to overlap the real images captured in the steps S311 and S312. FIGS. 35A, B show such example. In case another vehicle V1 and a sign S exist on the road which the vehicle is approaching as shown in FIG. 35A, imaginary shadow images are indicated respectively so as to be attached to another vehicle V1 and the sign S as shown in FIG. 35B. In the present embodiment, the imaginary shadow image is created based on the position of the sun. This may be configured to emphasize the shadow of the sun when the sun actually appears. Likewise, the shadow of the moving object or the like by the light of a street light may be created as the imaginary shadow image, thereby emphasizing the shadow.

Hereinafter, the operations and advantages of the sixth embodiment of the present invention will be described. According to the surroundings monitoring device for a vehicle of the sixth embodiment, the imaginary-shadow image of the stationary object or the moving object when receiving the light from the sun as the imaginary light source is indicated so as to overlap the real image in such a manner that the imaginary-shadow image is attached to the stationary object or the moving object indicated. Thereby, the driver can see the imaginary shadow image of the moving object within the image of the blind area, and therefore intuitively recognize the sense of the distance to the moving object or the sense of the length of the moving object. Further, according to the present embodiment, the imaginary light source is the sun. Thereby, the sun is set as the imaginary light source, so that the driver can more intuitively recognize the sense of the distance to the moving object or the sense of the length of the moving object. Also, according to the present embodiment, the moving object is detected from the real image picked up by the cameras 2, 4, 6, and at least one of the kind of the moving object, the moving speed of the moving object. Herein, the moving direction of the moving object is detected, and the indication manner of the imaginary-shadow image is changed in accordance with the above of the moving object. Thereby, the driver can get the information (kind, moving speed, and moving direction) of the moving object from the imaginary shadow image, and therefore more precisely recognize the sense of the distance to the moving object or the sense of the length of the moving object and the state of the moving object.

Embodiment 7

Figure 36:
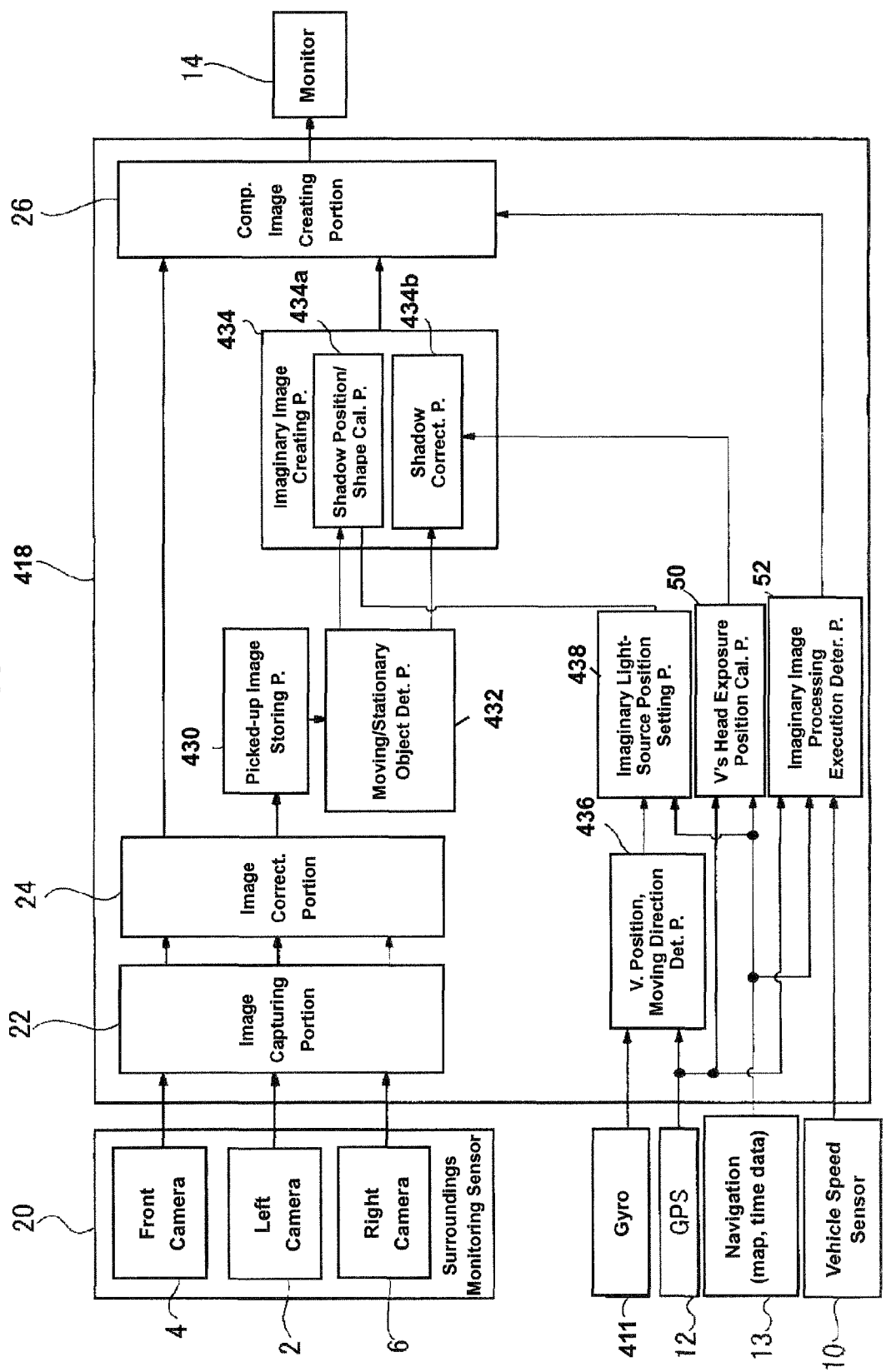
FIG. 36 is a block diagram showing the constitution of the surroundings monitoring device for a vehicle according to a seventh embodiment of the present invention.

Hereinafter, the constitution of the surroundings monitoring device for a vehicle according to the seventh embodiment of the present invention will be described referring to FIG. 36. FIG. 36 is a block diagram showing the constitution of the surroundings monitoring device for a vehicle according to the seventh embodiment of the present invention. According to the seventh embodiment, the imaginary light source is set at a imaginary position, and an image of the imaginary shadow which is made for the moving object and the stationary object when the moving object (another vehicle approaching to the intersection) and the stationary object (sign, traffic signal, etc.) are lighted with the imaginary light source is indicated. The driver sees the imaginary shadow of the object, and determines how far the moving object or the like are away from the vehicle based on the direction and length of the shadow, for example. As a result, the driver can be properly helped in determining whether the vehicle is to be started or not. Herein, the position of the imaginary light source is set to be a position which is a specified distance away from an intersection which the vehicle approaches and a specified height above a surface of a road on which the vehicle travels, the specified distance being long enough for the driver to determine that the vehicle is to be started or stopped when another vehicle approaches the vehicle. The distance may be about 30-50 m, for example (imaginary light source L1, see FIG. 38).

The image signals from the cameras 2, 4, 6 which are the surroundings monitoring sensor 20 are inputted to the image capturing portion 22 of an ECU 418 as shown in FIG. 36. Herein, the inputted image signals are the wide-angle image and have some distortion, so the image is corrected at the image correcting portion 24. The image signal from the image correcting portion 24 is inputted to the composite-image creating portion 26 as the real image. A picked-up-image storing portion 430 stores the image corrected by the image correcting portion 24. A moving-object stationary-object detecting portion 432 detects the existence of the moving object, such as another vehicle, and the stationary object, such as a sign, within the inputted image from the image correcting portion 24. This moving-object detection is conducted through the optical flow processing. Herein, the moving object may be detected in another manner than the optical flow processing, such as the background-differentiation processing, or the between-frames-differentiation processing, or the lazar or millimeter ways. The stationary-object detection is conducted through the image processing. In case the stationary object exists, the position and shape of the stationary object is detected by the image processing, lazar radar 7 or the like. In case the moving object exits, the shape of the moving object is detected through the image processing and the like. Further, the distance of the moving object approaching to the vehicle, speed and moving direction of the moving object are detected by the laser radar 7 as the state of the moving object, and the arrival time of the moving object to the vehicle is calculated. Herein, the kind, this distance, speed and moving direction may be detected from the vehicle-to-vehicle transmission system or the vehicle-to-road transmission system at the picked-up-image storing portion 430 and the moving-object stationary-object detecting portion 432 in place of the laser radar 7. Also, the indication manner of the imaginary shadow image may be changed in accordance with the moving speed and direction of the moving object. The information of the moving object and the stationary object detected by the moving-object stationary-object detecting portion 432 is supplied to an imaginary-image creating portion 434. A shadow position/shape calculating portion 434*a* of the imaginary-image creating portion 434 calculates shapes and indication positions of the imaginary shadow images of the moving object and the stationary object based on the information supplied and information of the position of the sun as the imaginary light source, which will be described later. The imaginary shadow images are corrected by a shadow correcting portion 434*b* in accordance with the state of the moving object and the stationary object as described later.

A vehicle position/moving-direction detecting portion 436 detects the change of moving direction of the vehicle with a gyroscope 411, and detects the position and moving direction of the vehicle with the gyroscope 411 and the GPS device 12. An imaginary light-source position setting portion 438 sets the position of the imaginary light source at a specified position, which is a specified distance away from the intersection. Herein, the specified distance of this position is long enough for the driver to determine that the vehicle is to be started or stopped when another vehicle approaches the vehicle (30-50 m in the present embodiment), and this position is located on the side of the moving object and the like so that the driver can see their shadows (imaginary light source L1, see FIG. 38). As described above, the shadow position/shape calculating portion 434*a* calculates the shapes and indication positions of the imaginary shadow images of the moving object and the stationary object based on this set position of the imaginary light source. The shadow correcting portion 434*b* corrects the images in accordance with the state of the moving object and the stationary object as described later. The ECU 418 includes the vehicle's-head-exposure determining portion 50, which determines that the vehicle has the position for vehicle's head exposure. When the vehicle has the position for vehicle's head exposure, the driver can view over the intersection, so the creation of the imaginary image by the imaginary-image creating portion 434 is stopped. As a result, only the real image is indicated on the monitor 14. The ECU 418 further includes the imaginary-image processing execution determining portion 52, which determines whether or not the vehicle is located near the intersection and the vehicle stops temporarily based on the map data from the navigation device 14, the position data from the GPS 12, and the vehicle speed data from the vehicle-speed sensor 10. When the vehicle is located near the intersection and the vehicle stops temporarily, the specified signal for the indication of the imaginary image is supplied to the composite-image creating portion 26 as described later.

Figure 37:
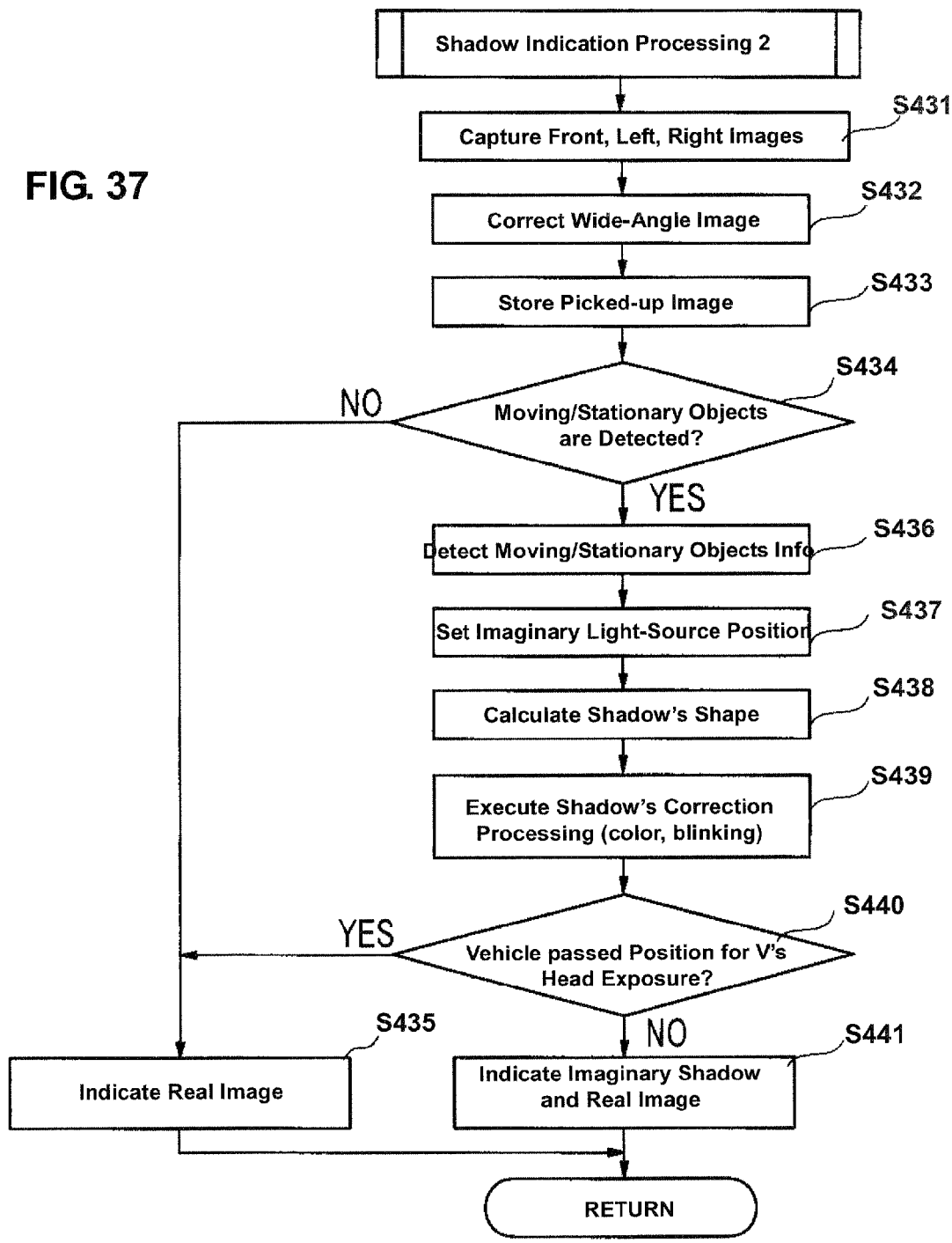
FIG. 37 is a flowchart of indication processing of the imaginary image for capturing the distance by the surroundings monitoring device for a vehicle according to the seventh embodiment of the present invention.
Figure 38:
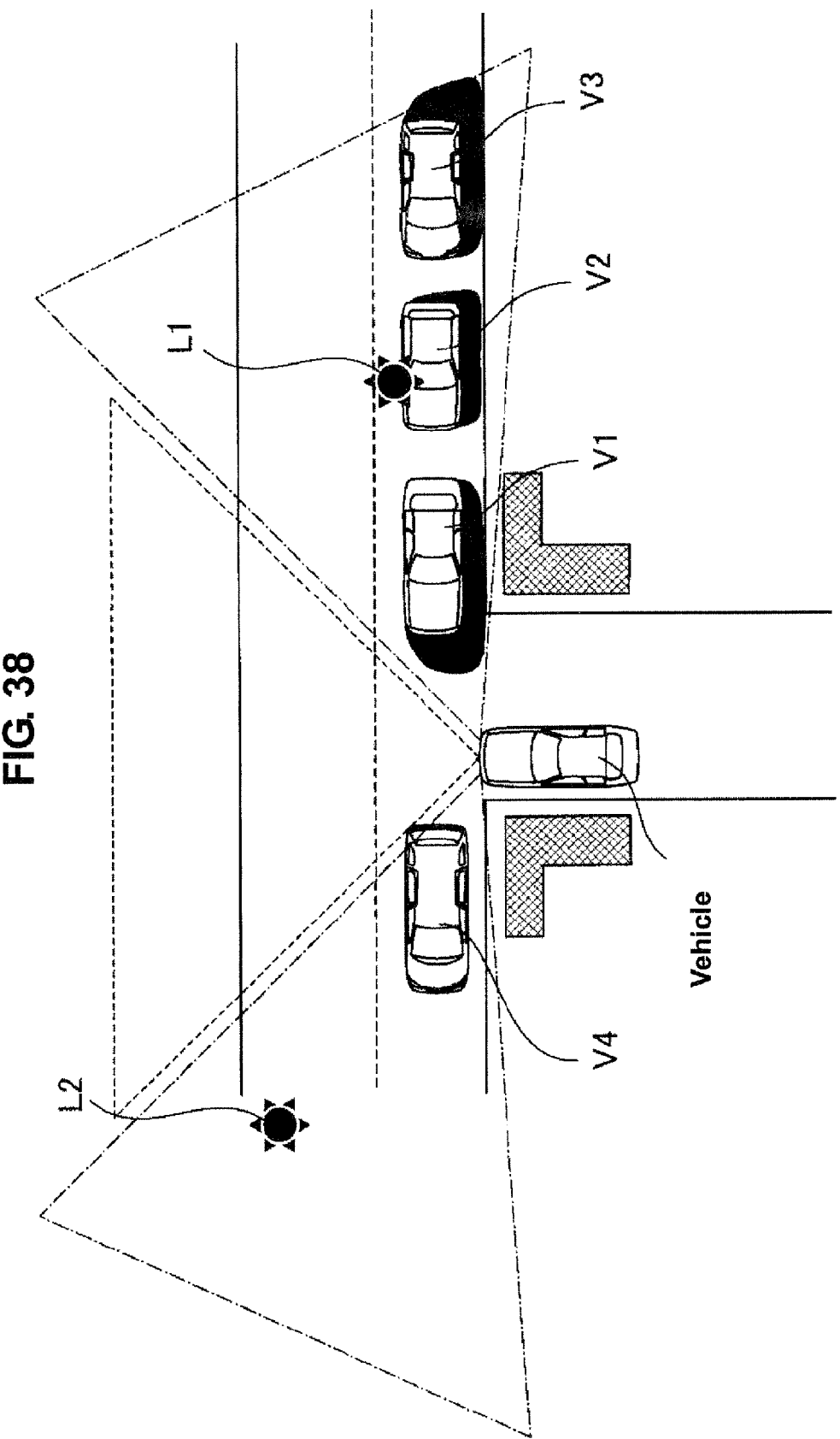
FIG. 38 is a diagram showing an example of a scope of an image picked up by the camera, an moving object, and an image of an imaginary image overlapping a real image according to the seventh embodiment of the present invention.

Next, the control of the surroundings monitoring device for a vehicle according to the seventh embodiment of the present invention will be described referring to FIGS. 37 and 38. FIG. 37 is a flowchart of indication processing of the imaginary image for capturing the distance by the surroundings monitoring device for a vehicle according to the seventh embodiment of the present invention. FIG. 38 is a diagram showing an example of a scope of an image picked up by the camera, the moving object, and the image of the imaginary image overlapping the real image according to the seventh embodiment of the present invention. Reference characters S denotes each step in FIG. 37. As shown in FIG. 37, at first in step S431, the image capturing portion 22 captures the images from the camera for the left 2, the camera for the front 4, and the camera for the right 6 at the intersection, for example. Then, the captured wide-angle images are corrected by the image correcting portion 24 in step S432. In the next step S433, the picked-up image is stored. Subsequently, in step S434, the moving object and the stationary object are detected from the real images obtained in the steps S431 and S432 by the moving-object stationary-object detecting portion 432. When any moving object or stationary object are not detected, the control proceeds to step S435, where the real images obtained in the steps S431 and S432 are indicated simply. When the moving object or the stationary object are detected in the step S434, the control proceeds to step S436, where the moving-object stationary-object detecting portion 432 (see FIG. 36) detects the shape, position, and moving direction and speed of the moving object and the shape and position of the stationary object as described above. Then, in the next step S437, the imaginary light-source position setting portion 438 (see FIG. 36) sets the position of the imaginary light source as descried above. As described above, the position of the imaginary light source is 30-50 m away from the intersection and located on the side of the moving object and the like. Herein, as an alternative, the position of the imaginary light source may be set such that the arrival time of the moving object approaching to the intersection where the vehicle exits is a specified time, 2 second for example (it takes 2 seconds for the moving object to reach the vehicle). Herein, the specified time is set to be long enough for the driver to determine that the vehicle is to be started or stopped when another vehicle approaches the vehicle. This setting is conducted for the lead moving object in case of a plurality of moving objects. The above-described specified time or specified distance from the intersection may be set optionally by the driver.

In the next step S438, the shadow position/shape calculating portion 434a (see FIG. 36) calculates the shapes of the imaginary shadow images of the moving object and the stationary object based on the position of the imaginary light source set in the step S437 and the shapes of the moving object and the stationary object as described above. Specifically, as shown in FIG. 38, the imaginary shadow image of another vehicle V1, which is located closest to the intersection on this (near) side, extends relatively long on this side. Meanwhile, another following vehicle V2 is located near the imaginary light source L1, so its imaginary shadow image extends relatively short. Another following vehicle V3 is located further than the imaginary light source L1, so its imaginary shadow image extends rearward relatively long. The imaginary shadow images of these vehicles V1-V3 extends toward the vehicle as apparent from the illustration. Herein, since another vehicle V4 has passed the intersection, its imaginary shadow image is not calculated. The color of the imaginary shadow image may be changed or the indication may be changed so as to blink in accordance with the traveling location of the vehicle, such as before passing the imaginary light source L1, during the passing through the imaginary light source L1, or after passing the imaginary light source L1. The imaginary light source L2 for the left road may be preferably positioned on the far side relative to the central portion of the left lane. In this case, its position may be preferably set to be 2-second arrival-time away of the moving object or 30-50 m away from the intersection.

Subsequently, the correction processing of the shade is executed by the shadow correcting portion 434b (see FIG. 36) in the next step S439. Herein, as one of the corrections, in case it is detected by the moving-object stationary-object detecting portion 432 (see FIG. 36) that there is another vehicle which travels at a high speed or zigzags, the indication color of the imaginary shadow image of such vehicle may be changed from its original color of black to a red color. Or, as another example of correction, the indication color of the imaginary shadow image is changed, such as black, green, blue, in accordance with the kinds (four-wheeled vehicle, two-wheeled vehicle, traffic signal, sign, etc.) of the moving object or the stationary object detected by the moving-object stationary-object detecting portion 432 (see FIG. 36). As further another example of correction, in case the plurality of moving objects are detected by the moving-object stationary-object detecting portion 432 (see FIG. 36), the imaginary shadow image of a following vehicle is indicated so as to blink or in a gray color. Further, the indication manner of the imaginary shadow image may be changed in accordance with the moving speed and direction of the moving object. In the next step S440, it is determined whether the vehicle has passed the position for vehicle's head exposure. When the vehicle has passed the position for vehicle's head exposure, the driver may get a clear surrounding view. Then, the control proceeds to step S435, where the real images captured in the steps S431 and S432 are indicated on the monitor 14 simply. When the vehicle has not passed the position for vehicle's head exposure, the control proceeds to step S441, where the imaginary shadow image corrected in the step S439 is indicated so as to overlap the real images captured in the steps S431 and S432. FIG. 38 shows such example. The imaginary shadow image is created based on the imaginary light source in the present embodiment. However, the imaginary shadow image may be created based on the position of a street light which is a specified distance away from the intersection as the imaginary light source at night, for example.

Hereinafter, the operations and advantages of the seventh embodiment of the present invention will be described. According to the surroundings monitoring device for a vehicle of the seventh embodiment, the position of the imaginary light source is set to be the position which is the specified distance away from the intersection which the vehicle approaches and the specified height above the surface of the road on which the vehicle travels. Thereby, the driver see the imaginary shadow image of the moving object or the stationary object, considering the position of the imaginary light source, and therefore more precisely recognize the sense of the distance to the moving object or the sense of the length of the moving object and the state of the moving object. Further, the specified distance is set to be long enough for the driver to determine that the vehicle is to be started or stopped when another vehicle approaches the vehicle (for example, 30-50 m). Thereby, the driver can determine the start or stop of the vehicle more safely. Also, according to the present embodiment, the moving object is detected from the real image picked up by the cameras 2, 4, 6, and at least one of the kind of the moving object, the moving speed of the moving object. Herein, the moving direction of the moving object is detected, and the indication manner of the imaginary-shadow image is changed in accordance with the above of the moving object. Thereby, the driver can get the information (kind, moving speed, and moving direction) of the moving object from the imaginary shadow image, and therefore more precisely recognize the sense of the distance to the moving object or the sense of the length of the moving object and the state of the moving object.

Embodiment 8

Figure 39:
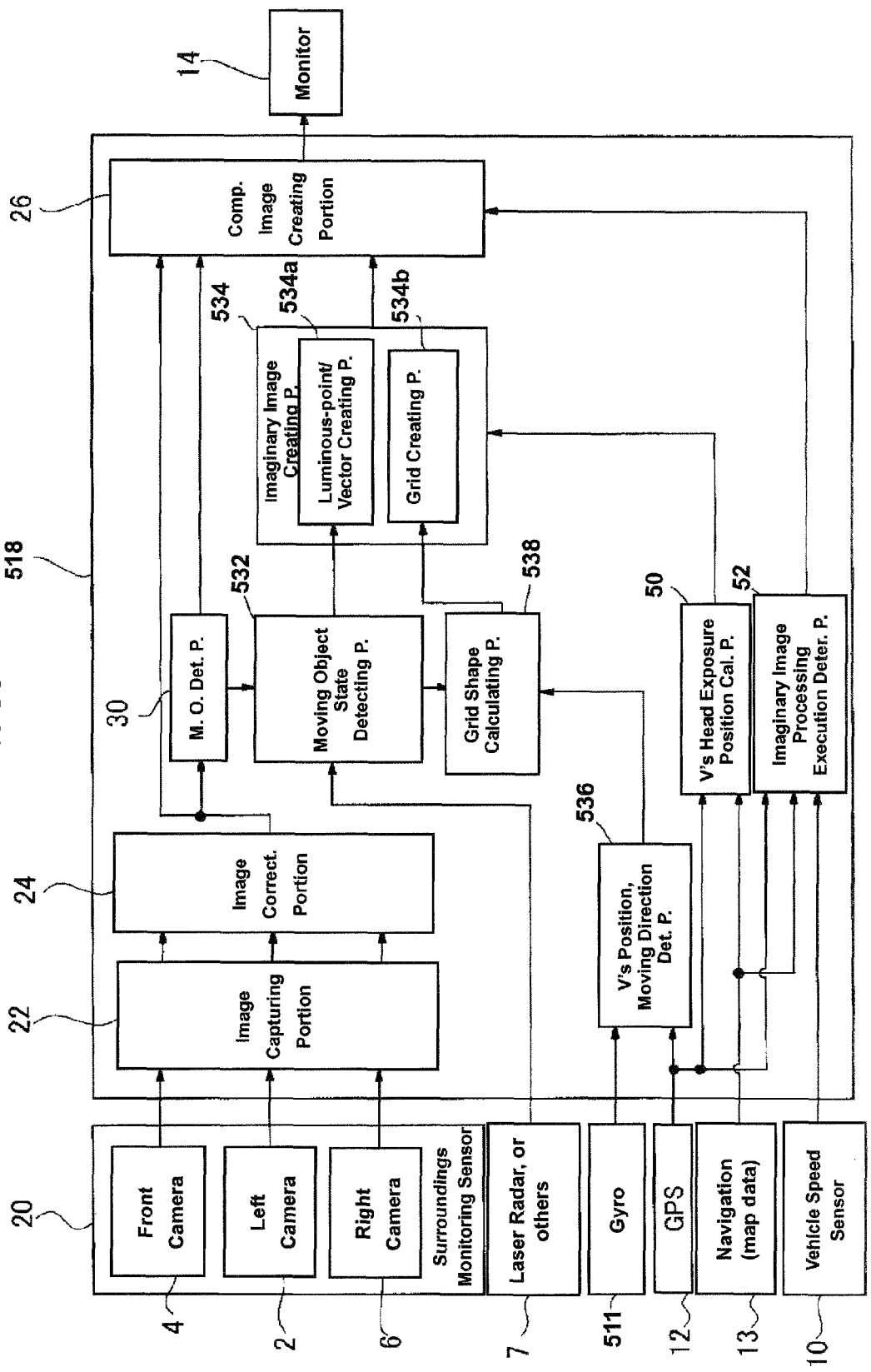
FIG. 39 is a block diagram showing the constitution of the surroundings monitoring device for a vehicle according to an eighth embodiment of the present invention.
Figure 43A:
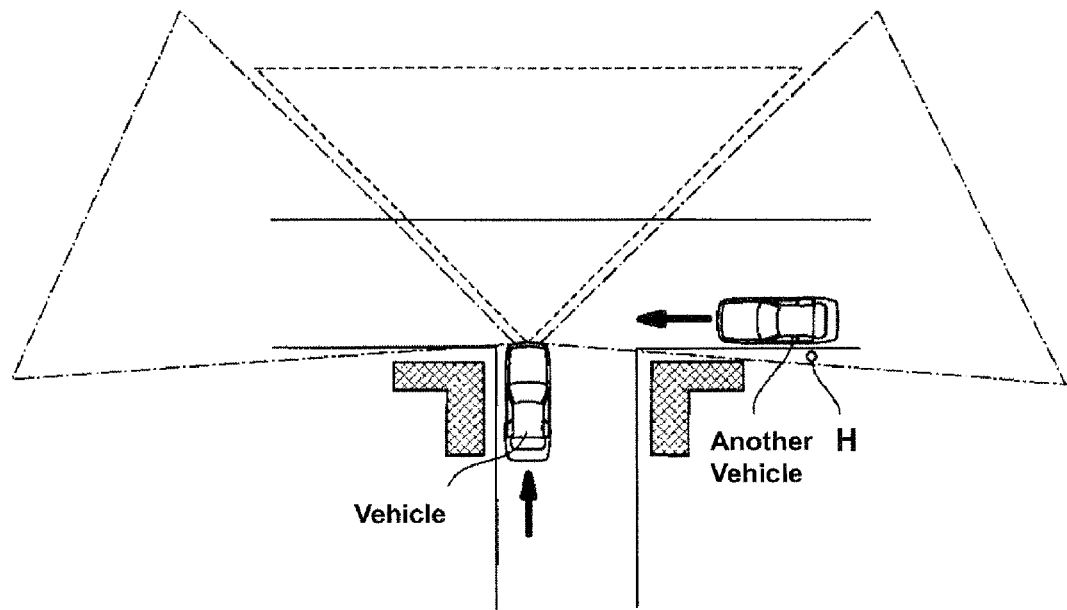
FIG. 43A is a diagram showing an example of the scope of the image picked up by the camera of the surroundings monitoring device for a vehicle and the moving object.

Hereinafter, the constitution of the surroundings monitoring device for a vehicle according to the eighth embodiment of the present invention will be described referring to FIG. 39. FIG. 39 is a block diagram showing the constitution of the surroundings monitoring device for a vehicle according to the eighth embodiment of the present invention. According to the eighth embodiment, the distance of the moving object (another vehicle approaching the intersection or the like) to the vehicle, the kind of the moving object, the moving speed and direction of the moving object are indicated with imaginary images of a grid, an luminous point, a vector or the like, as shown in FIGS. 43A, B, so that the driver can recognize the moving state of the moving object easily. Thereby, the driver can be helped in determining whether the vehicle may be started or not. Further, the driver can properly recognize the sense of the width of the intersection and the like with the indication of the grid even in case of no moving object.

The image signals from the cameras 2, 4, 6 which are the surroundings monitoring sensor 20 are inputted to the image capturing portion 22 of an ECU 518 as shown in FIG. 39. Herein, the inputted image signals are the wide-angle image and have some distortion, so the image is corrected at the image correcting portion 24. The image signal from the image correcting portion 24 is inputted to the composite-image creating portion 26 as the real image. The moving-object detecting means 30 detects the existence of any moving object, such as another vehicle, motorcycle, bicycle, or pedestrian, within the inputted image from the image correcting means 24. A moving-object state detecting portion 532 detects the state of the moving object. The information detected is supplied to an imaginary-image creating portion 534. The composite-image creating portion 26 indicates a composite image of the created imaginary image and the real image. The image created by the composite-image creating portion 26 is indicated on the monitor 14. The moving-object state detecting portion 532 receives the detection signal of the moving object from the moving-object detecting means 30 detects the distance of the approaching moving object to the vehicle and moving speed and direction of the moving object with the laser radar 7, and further calculates the arrival time to the vehicle. Herein, the kind of the moving object, this distance, moving speed and direction of the moving objet may be obtained from the vehicle-to-vehicle transmission system or the vehicle-to-road transmission system in place of the laser radar 7 at the moving-object detecting means 30 and the moving-object state detecting portion 532. A vehicle position/moving direction detecting portion 536 detects change of the moving direction with a gyro 511 and detects the position and the moving direction of the vehicle with the gyro 511 and the GPS 12. A grid-shape calculating portion 538 indicates a grid imaginary image shown in FIGS. 43A, B in accordance with the state of the moving object, such as the distance from the object to the vehicle and the kind of the moving object. The measure (e.g., several meters), brightness, color or the like of a grid of the grid image are adjustable in accordance with the state of the vehicle or the states of the vehicle and the moving object. Further, a vector indication for showing the speed and moving direction or an indication mark (●, ■) for showing the kind of the moving object are indicated as a gird imaginary image, as shown in FIGS. 43A, B. Herein, the grid-shape calculating portion 538 may be configured to change a color of the grid in accordance with the position of the vehicle, such as the position for vehicle's nose exposure, the position for camera's exposure, the position for vehicle's head exposure.

A luminous-point/vector creating portion 534a of the imaginary-image creating portion 534 creates the luminous light for showing the position of the moving object. The composite-image creating portion 26 indicates the luminous point with the marks of ●, ■ so as to overlap the real image on the monitor 14, so that the drive can recognize the position and the kind of the moving object. The luminous-point/vector creating portion 534a creates the vector for showing the moving direction and speed of the moving object with an arrow, and the vector is indicated on the monitor 14 so as to overlap the real image by the composite-image creating portion 26. A grid creating portion 534b of the imaginary-image creating portion 534 creates a grid imaginary image (grid image) shown in FIGS. 43A, B in accordance with the moving state of the moving object, the distance to the vehicle, an extending direction of the road, the brightness outside the vehicle (daytime, evening, night, etc.) or setting of the driver. This created grid imaginary image is indicated on the monitor 14 so as to overlap the real image by the composite-image creating portion 26. The ECU 518 includes the vehicle's-head-exposure determining portion 50, which determines that the vehicle has the position for vehicle's head exposure. When the vehicle has the position for vehicle's head exposure, the driver can view over the intersection, so the creation of the imaginary image by the imaginary-image creating portion 534 is stopped. As a result, only the real image is indicated on the monitor 14. The ECU 518 further includes the imaginary-image processing execution determining portion 52, which determines whether or not the vehicle is located near the intersection and the vehicle stops temporarily based on the map data from the navigation device 13, the position data from the GPS 12, and the vehicle speed data from the vehicle-speed sensor 10. When the vehicle is located near the intersection and the vehicle stops temporarily, the specified signal for the indication of the imaginary image is supplied to the composite-image creating portion 26 as described later.

Figure 40:
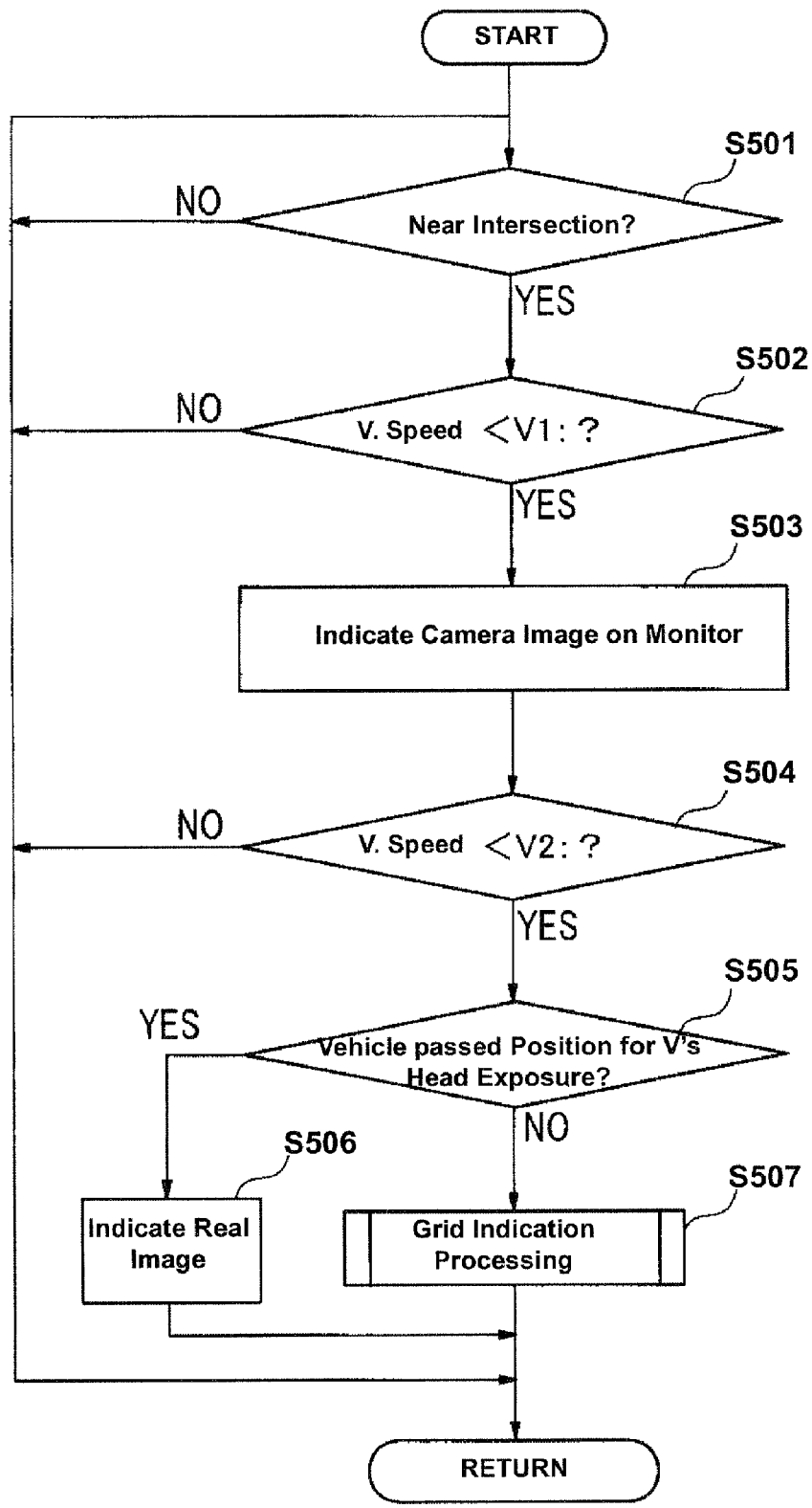
FIG. 40 is a flowchart of processing as to whether an imaginary image for recognizing the blind area of the surroundings monitoring device for a vehicle according to the eighth embodiment of the present invention.

Hereinafter, the control of the surroundings monitoring device for a vehicle according to the present embodiment will be described referring to FIG. 40. FIG. 40 is a flowchart of processing as to whether the imaginary image for recognizing the blind area of the surroundings monitoring device for a vehicle according to the eighth embodiment of the present invention. Reference characters S denote each step. At first, in step 501, the imaginary-image processing execution determining portion 52 (see FIG. 39) determines whether the vehicle is located near the intersection or not based on the signals from the GPS 12 and the navigation device 13. In the next step S502, the imaginary-image processing execution determining portion 52 (see FIG. 39) determines whether the vehicle speed is smaller than V1 or not based on the signal of the vehicle speed sensor 10. Herein, the vehicle speed V1 is set to be slow enough to enable the driver to see the monitor 14 safely. When the vehicle speed decreases below the vehicle speed V1, the control proceeds to step S503, where the real image is indicated based on the image signal from an image correcting portion 24 (see FIG. 39). Then, in step S504, the imaginary-image processing execution determining portion 52 (see FIG. 39) determines whether the vehicle speed is lower than V2 or not. Herein, the value of the vehicle speed V2 is set to be zero or almost zero, whereby it can be determined that the vehicle has stopped substantially. When the vehicle speed is lower than V2, the control proceeds to processing of an imaginary-image indication for distance recognition of step S505. In the step S505, it is determined whether or not the vehicle has passed the position for vehicle's head exposure. When the vehicle has passed the position for vehicle's head exposure, the driver may see over the surroundings. Accordingly, the control proceeds to step S506, where the real images captured in the steps S510 and S502 are indicated on the monitor 14 simply. When the vehicle has not passed the position for vehicle's head exposure yet, the control proceeds to step S507, where an indication processing of the grid imaginary image is executed.

Figure 41:
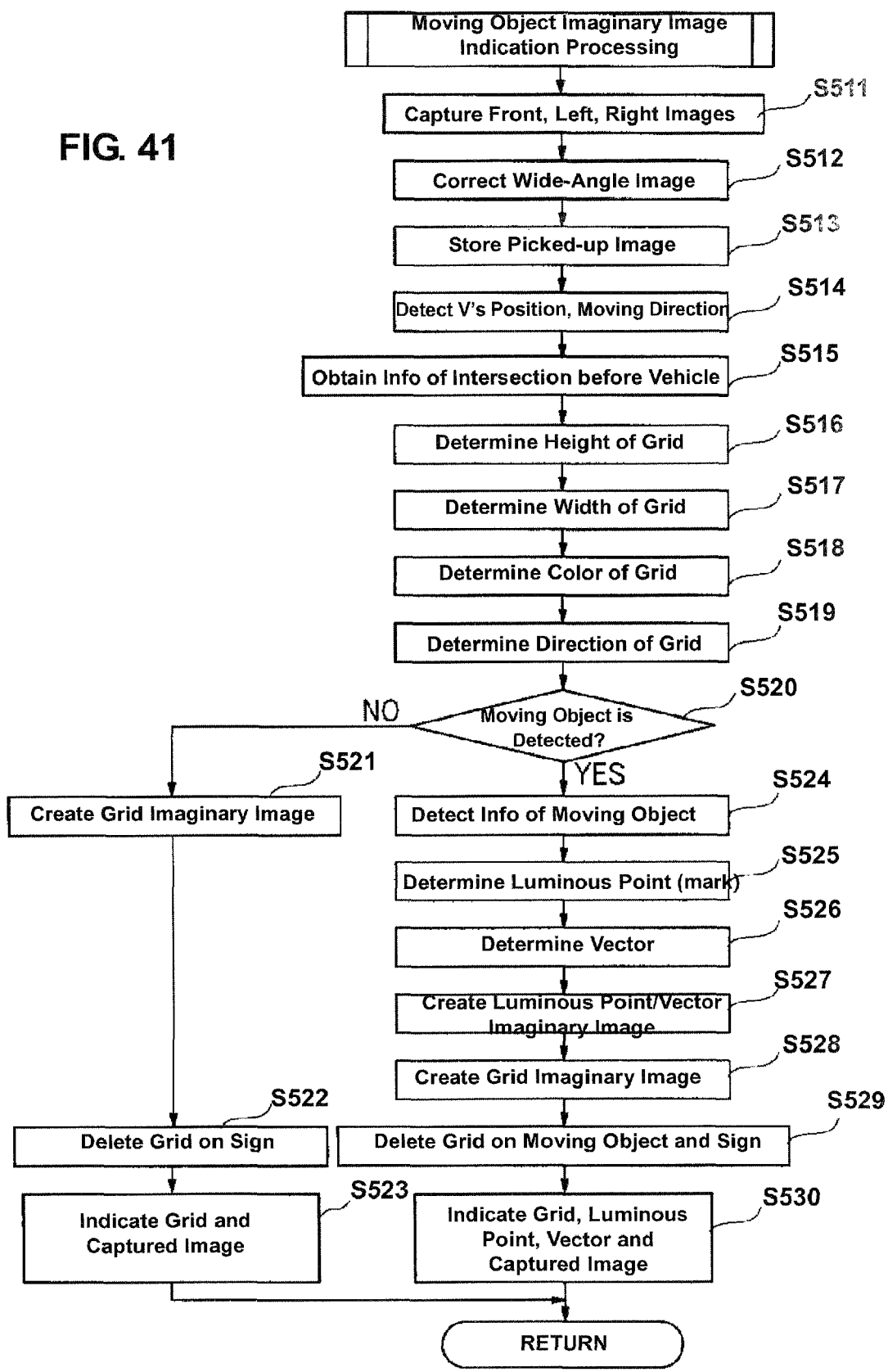
FIG. 41 is a flowchart of an indication processing of an imaginary image for recognizing the distance of the surroundings monitoring device for a vehicle according to the eighth embodiment of the present invention.
Figure 42:
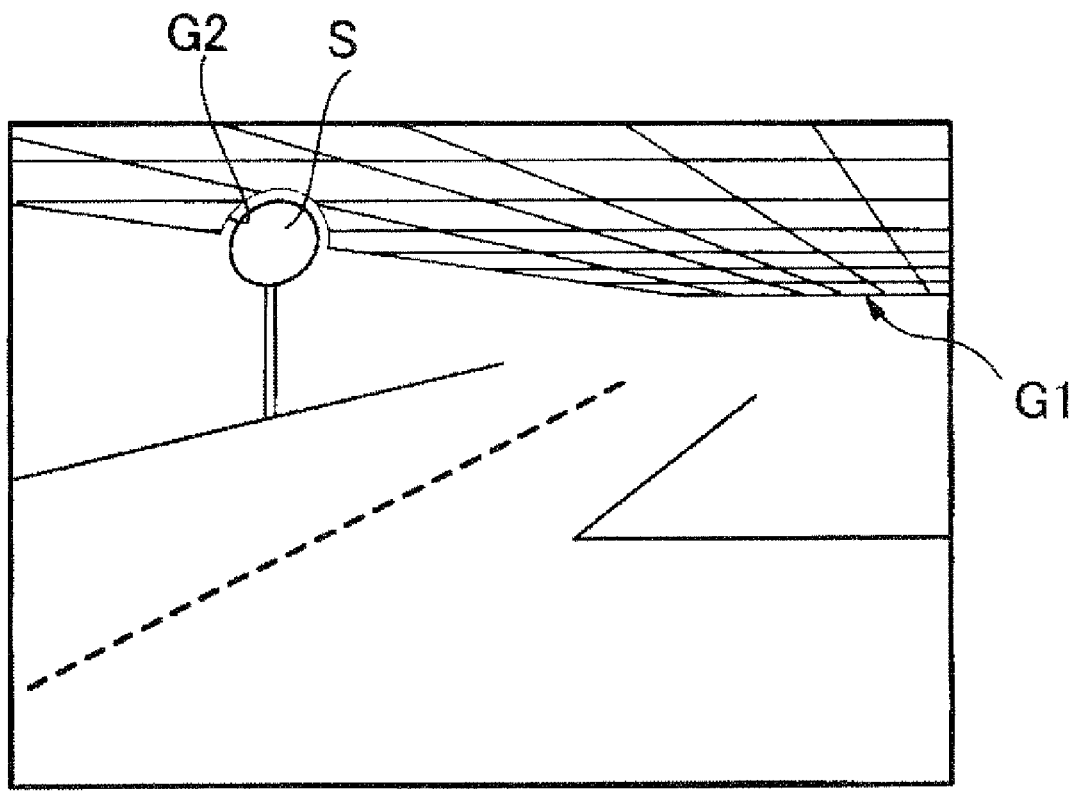
FIG. 42 is an example of an image in which the imaginary image is indicated so as to overlap the real image by the surroundings monitoring device for a vehicle according to the eighth embodiment of the present invention.
Figure 43B:
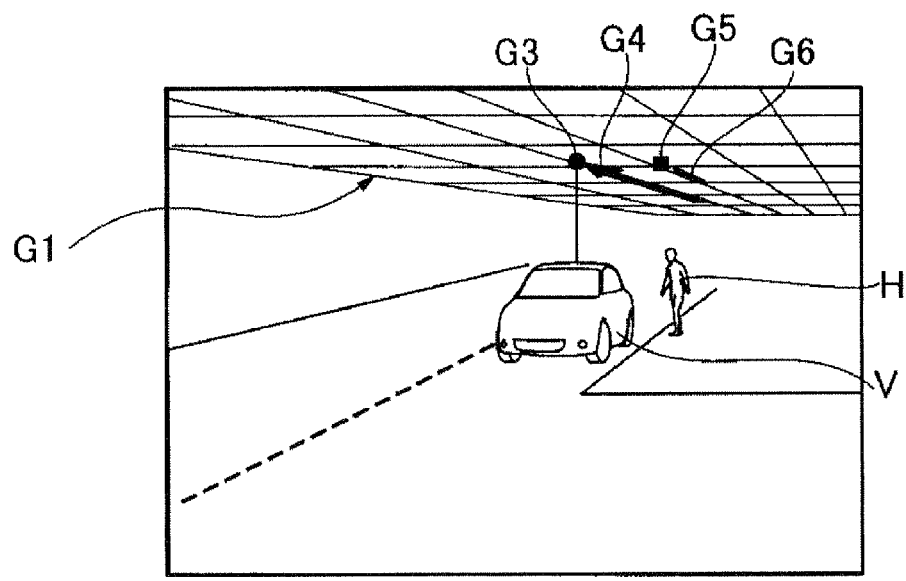
FIG. 43B is a diagram showing an example of the image in which the imaginary image overlaps the real image according to the eighth embodiment of the present invention.
Figure 44A:
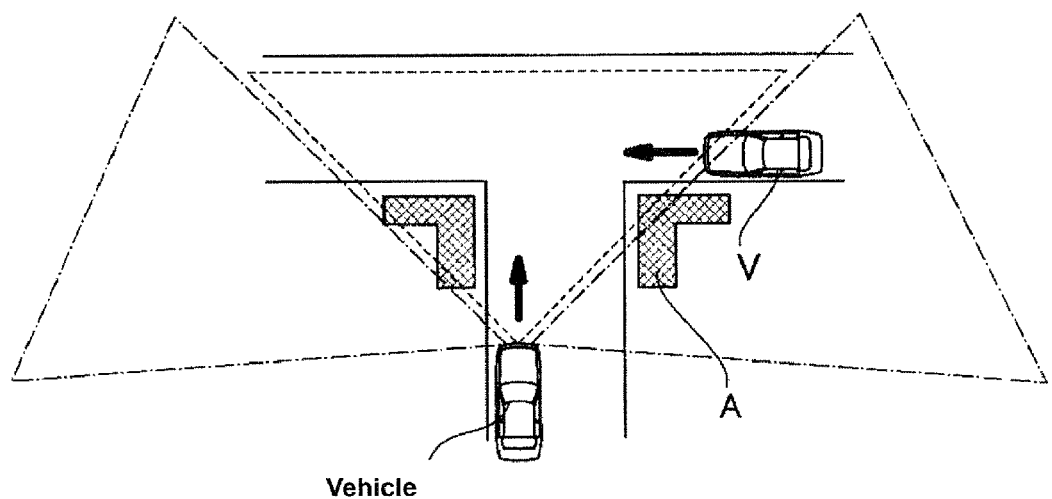
FIG. 44A is a diagram showing another example of the scope of the image picked up by the camera of the surroundings monitoring device for a vehicle and the moving object.
Figure 44B:
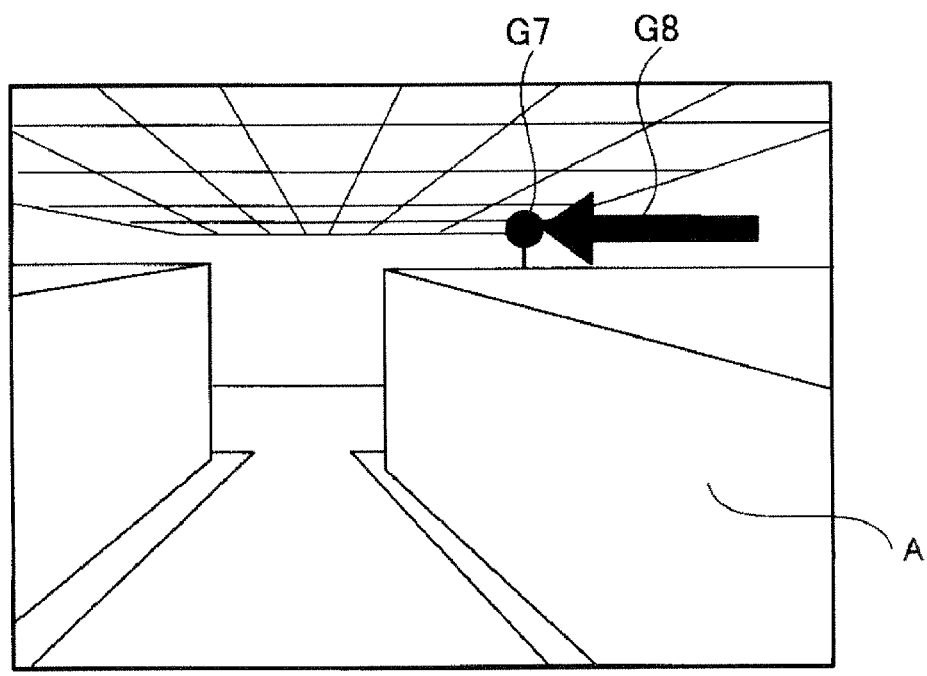
FIG. 44B is a diagram showing another example of the image in which the imaginary image overlaps the real image according to the eighth embodiment of the present invention.

Hereinafter, the control of the surroundings monitoring device for a vehicle according to the eighth embodiment of the present invention will be described referring to FIGS. 40-44A, B. FIG. 40 is a flowchart of processing as to whether the imaginary image for recognizing the blind area of the surroundings monitoring device for a vehicle according to the eighth embodiment of the present invention. FIG. 41 is a flowchart of an indication processing of the imaginary image for recognizing the distance of the surroundings monitoring device for a vehicle according to the eighth embodiment of the present invention. FIG. 42 is an example of an image in which the imaginary image is indicated so as to overlap the real image by the surroundings monitoring device for a vehicle according to the eighth embodiment of the present invention. FIG. 43A is a diagram showing an example of the scope of the image picked up by the camera of the surroundings monitoring device for a vehicle and the moving object, and FIG. 43B is a diagram showing an example of the image in which the imaginary image overlaps the real image according to the eighth embodiment of the present invention. FIG. 44A is a diagram showing another example of the scope of the image picked up by the camera of the surroundings monitoring device for a vehicle and the moving object, and FIG. 44B is a diagram showing another example of the image in which the imaginary image overlaps the real image according to the eighth embodiment of the present invention. Reference characters S denote each step. As shown in FIG. 41, at first in step S511, the image capturing portion 22 (see FIG. 40) captures the images from the camera for the left 2, the camera for the front 4, and the camera for the right 6 at the intersection, for example. Then, the captured wide-angle images are corrected by the image correcting portion 24 in step S512. Subsequently, in step S513, the picked-up image is stored. In the next step S514, the vehicle position/moving direction detecting portion 536 detects the position and the moving direction of the vehicle, and obtains information of the intersection in front of the vehicle in step S515. Then, the height of the grid (see G1 in FIG. 42) which is to be indicated is determined in the next step S516. In the present embodiment, the indication height of the grid is set by the driver, and in case the grid overlaps the moving object or the like, part of the grid is deleted in steps S522 and S529, which will be described later, so that driver can see the moving object or the like. Herein, the indication height of the grid may be previously set to be 3 m so that important objects, such as moving objects, signs, on the road do not overlap the grid.

In the next step S517, the width of the grid is determined. The width of the grid is the one of each grid. According to the present embodiment, when the distance of the moving object to the vehicle is short, the width of the grid is set to be small one. Meanwhile, when its distance is long, the width of the grid is set to be large one. Herein, the width of the grid may be set to be a specified value, and the grid may be indicated with the width of the specified value in case no moving object exits. Herein, the width of the grid may be changed in accordance with the width of the road. In the next step S518, the color of the grid is determined. For example, when it is in the evening or at night, the color of the grid is set to be a white-color based bright color with a proper brightness. When it is in the daytime, it is set to be a dark color such as black. Herein, the color may be changed when the vehicle has the position for vehicle's head exposure for an easy recognition of such situation. Further, when another vehicle is located at a specified position where the derive wavers in judgment as to whether the vehicle is to be started or stopped in the intersection (30-50 m away from the vehicle, for example), the color of the whole grid may be set to be a noticeable color, or the color of only an area where another vehicle exists may be set to be a noticeable color. Also, the color may be changed in accordance with the distance of another vehicle to the vehicle. The grid color may be set to be a light color so that the real image can be recognizable. Further, the color of a specified grid which is located near the intersection may be set to be a noticeable color (e.g., red), and the color of a specified grid which is located far away from the intersection may be set to be a unnoticeable color (e.g., blue).

In the next step S519, the direction of the grid is determined. The direction of the grid is the one in which each grid extends. According to the present embodiment, the longitudinal grid indicated on the monitor 14 is configured to extend in the same direction as the road which intersects in front of the vehicle (the road on which another vehicle moves) extends, and the lateral grid indicated on the monitor 14 is configured to extend in a direction which is perpendicular to the direction in which the road extends. Herein, the direction of the grid which has been determined once is fixed despite change of the moving direction of the vehicle. Thereby, the driver may have a driving feeling of going down under the gird when changing the moving direction of the vehicle. In the next step S520, the moving-object detecting portion 30 detects the moving object from the real images obtained in the steps S511 and S512. This moving-object detection in the step S520 is conducted through the optical flow processing. Herein, the moving object may be detected in another manner than the optical flow processing, such as the background-differentiation processing, or the between-frames-differentiation processing, or the lazar or millimeter ways. When any moving object is not detected, the control proceeds to step S521, where the imaginary-image creating portion 534 (see FIG. 39) creates the grid image with the gird height, width, color and direction determined in the steps S516-519. In the next step S522, part of the grid image is deleted by the composite-image creating portion 26 (see FIG. 39) so that the grid imaginary image does not overlap the important structures on the road such as signs in the real image. Or, the height of the grid to be indicated may be reduced in the step S516 so that the grid does not overlap the signs and the like. In the next step S523, as shown in FIG. 42, for example, the grid imaginary image G1 which has been created in the step S521 and the adjusted in the step S522 is indicated on the monitor so as to overlap the real image. In the imaginary image G1, part G2 of the grid imaginary image is deleted so that the important object as a traffic rule, such as the sign S, can be seen from the driver.

Meanwhile, when the moving object is detected in the next step S520, the control proceeds to step S524, where the kind of the moving object, the distance of the moving object to the vehicle, the speed and the moving direction of the moving object are detected by the moving-object detecting portion 30 and the moving-object state detecting portion 532 (see FIG. 39). In case a plurality of moving objects exist, the detection of the distance, speed and moving direction of the moving object is conducted for one of the moving objects which has the shortest distance or arrival time to the vehicle. In the next step S525, the luminous point (to be indicated to show the position and the kind of the moving object) is indicated differently in accordance with the kind of the moving object. For example, another vehicle is indicated with the mark "●," and the pedestrian is indicated with the mark "■." Examples will are described referring to step S530 with FIGS. 43A, B and 44A, B. In the next step S526, the vector indication is determined in accordance with the moving state of the moving object. The direction which the vector shows is the moving direction of the moving object. The length of the vector shows the moving speed of the moving object. Herein, the vector length may be configured to show the arrival time of the moving object to the intersection. The start point of the vector shows the current location of the moving object, but may show its location after a specified time has passed. Further, the vector may be configured such that its length shows the moving speed and its width shows the arrival time to the intersection.

In the next step S527, the imaginary-image creating portion 534 (see FIG. 39) creates the imaginary image of the luminous point and the vector which have been determined in the step S525 and S526, and the grid imaginary image is created in step S528. In step S529, part of the grid, luminous point and vector are deleted by the composite-image creating portion 26 in the same manner as the step S522 so that the important objects, such as the sign, and the moving object are not hidden by the imaginary image. In case the sign and the moving object are not hidden, the deletion is not conducted. In the next step S530, the grid, luminous point and vector are indicated on the monitor 14 by the composite-image creating portion 26. An example is shown in FIGS. 43A, B. As shown in FIG. 43A, the vehicle has the position for camera exposure, and another vehicle V and a pedestrian H exist. As shown in FIG. 43B, the grid G1 is indicated as the imaginary image, the mark of "●" (indicated as G3) for showing the kind and the position of the vehicle are indicated above another vehicle V so as to correspond to the grid G1, thereby making the driver recognize the position of another vehicle V. Further, an arrow G4 for showing the moving direction and speed of another vehicle V is indicated so as to correspond to the grid G1. The moving speed is recognizable with the length of the arrow G4. Further, the mark of "■" (indicated as G5) for showing the pedestrian and its position and an arrow G6 for showing the moving direction and speed are indicated above the pedestrian H as well. Another example is shown in FIGS. 44A, B. In these figures, the vehicle is located before the intersection, where the cameras 2, 4, 6 picking up the image of the right and left views are interrupted by the obstacle A. In the example shown in FIGS. 44A, B, the information of the position, moving speed and the like of another vehicle V is obtained from the vehicle-to-vehicle transmission system, and as shown in FIG. 44B, the grid imaginary image G1 is indicated above the obstacle A, and a mark of "●" (indicated as G7) for showing another vehicle and an arrow G8 for showing the moving direction and speed of another vehicle are indicated. Herein, while the grid is indicated in an upper space in the present embodiment, it may be indicated on the road or a wall face in case a proper wall face exists.

Hereinafter, the operations and effects will be described of the present embodiment. According to the present embodiment, imaginary-image creating portion 534 and the grid-shape calculating portion 538 create the imaginary grid image for giving the sense of the width of the road to the bind area picked up by the cameras 2, 4, 6, and also specify the size, the shape and the direction of the grid of the imaginary grid image in accordance with the real image of the blind area picked up by the cameras. The imaginary grid image is indicated so as to overlap the real image with the specified size, shape and direction by the composite-image creating portion 26 and the monitor 14. The moving-object state detecting portion 532 detects the position and/or the kind of the moving object when the moving object is detected. The luminous point which makes the position and/or kind of the moving object recognizable is also indicated so as to overlap the imaginary grid image. Thereby, the driver can recognize the position and/or the kind of the moving object easily. Further, the moving-object state detecting portion 532 detects at least one of the kind, moving speed and moving direction of the moving object when the moving object is detected. The arrow which makes the moving speed and/or moving direction of the moving object recognizable is also indicated so as to overlap the imaginary grid image. Thereby, the driver can recognize the moving speed and/or the moving direction of the moving object easily.

While the above-described embodiments described the vehicle mainly as the moving object, the moving object may be a four-wheeled vehicle, two-wheeled vehicle, bicycle, or pedestrian. Further, stationary object may be the four-wheeled vehicle, two-wheeled vehicle, pedestrian or bicycle which stop, any object located at the road side, building or the like. The preset invention should not be limited to the above-described embodiments, and any modifications and improvements may be applied within the scope of a sprit of the present invention.

What is claimed is:

1. A surroundings monitoring device for a vehicle, which monitors a blind area within an area expanding in front of a driver on both sides, comprising:
   a real-image picking-up means provided at a front portion of the vehicle so as to pick up a real image of the blind area;
   a moving object detecting means operative to recognize a moving object from the real image picked up by the real-image picking-up means and detect a moving state of the moving object;
   an imaginary-image specifying means operative to specify an indication manner of an imaginary image which is to be indicated for showing the moving state of the moving object detected by the moving object detecting means; and
   an indicating means operative to indicate the imaginary image of the moving object in the indication manner which is specified by the imaginary-image specifying means such that the imaginary image of the moving object indicated by the indicating means overlaps the real image picked up by the real-image picking-up means;
   wherein said imaginary-image specifying means is configured to specify the indication manner of the imaginary image of the moving object such that the imaginary image of the moving object is indicated at an arrival position where the moving object is predicted to arrive after a specified time on an extended line of a moving direction of the moving object.

2. A surroundings monitoring device for a vehicle, which monitors a blind area within an area expanding in front of a driver on both sides, comprising:
   a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means; and an indicating means operative to indicate the imaginary image of the moving object in the indication manner which is specified by the imaginary-image specifying means such that the imaginary image of the moving object indicated by the indicating means overlaps the real image picked up by the real-image picking-up means;

wherein said imaginary-image specifying means is configured to specify the indication manner of the imaginary image of the moving object such that the imaginary image of the moving object is indicated as an afterimage at plural positions where the moving object has actually passed.

3. The surroundings monitoring device for a vehicle of claim 2, wherein said indicating means is configured such that an indication size of the imaginary image of the moving object to be indicated thereby changes in accordance with the distance to the moving object from the vehicle in such a manner the indication size is enlarged in case the distance to the moving object is greater than a specified distance.

4. A surroundings monitoring device for a vehicle, which monitors a blind area within an area expanding in front of a driver on both sides, comprising:

a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means; and an indicating means operative to indicate the imaginary image of the moving object in the indication manner which is specified by the imaginary-image specifying means such that the imaginary image of the moving object indicated by the indicating means overlaps the real image picked up by the real-image picking-up means;

wherein said imaginary-image specifying means is configured to specify the indication manner of the imaginary image of the moving object in case of said moving object detecting means detecting plural moving objects such that only the imaginary image of a specified moving object which is the closest to the vehicle or whose arrival time to the vehicle is the shortest is indicated.

5. A surroundings monitoring device for a vehicle, which monitors a blind area within an area expanding in front of a driver on both sides, comprising:

a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means; and an indicating means operative to indicate the imaginary image of the moving object in the indication manner which is specified by the imaginary-image specifying means such that the imaginary image of the moving object indicated by the indicating means overlaps the real image picked up by the real-image picking-up means;

wherein said imaginary-image specifying means is configured to specify the indication manner of the imaginary image of the moving object such that an imaginary road image which is to be indicated for showing the moving state of the moving object is indicated in front of the moving object moving.

6. A surroundings monitoring device for a vehicle, which monitors a blind area within an area expanding in front of a driver on both sides, comprising:

a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means; and an indicating means operative to indicate the imaginary image of the moving object in the indication manner which is specified by the imaginary-image specifying means such that the imaginary image of the moving object indicated by the indicating means overlaps the real image picked up by the real-image picking-up means;

wherein a real object which is memorized, a size of which is known, or a real object which exists within a range of vision of the driver are captured as an imaginary image, and said imaginary-image specifying means is configured to specify a position of the imaginary image of the real object such that the imaginary image of the real object is indicated beside said moving object so as to be located at a roadside.

7. A surroundings monitoring device for a vehicle, which monitors a blind area within an area expanding in front of a driver on both sides, comprising:

a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means;

an indicating means operative to indicate the imaginary image of the moving object in the indication manner which is specified by the imaginary-image specifying means such that the imaginary image of the moving object indicated by the indicating means overlaps the real image picked up by the real-image picking-up means; and a real-image memorizing means operative to memorize the real image picked up by said real-image picking-up means, an imaginary-image creating means operative to create an imaginary image of an area which is blind for said real-image picking-up means from the real image which has been memorized by the real-image memorizing means, and a memorized-image moving-object detecting means operative to detect a moving object from the real image memorized by the real-image memorizing means, wherein said imaginary-image creating means is configured to create the imaginary image of the moving object at a point before a view of the moving object is interrupted by an obstacle, and said indicating means is configured to indicate the imaginary image of the moving object which is created by the imaginary-image creating means when the view of the moving object is interrupted by the obstacle; and wherein said imaginary-image creating means is further configured to create the imaginary image of the obstacle within the real image picked up by said real-image picking-up means in such a manner that a position of the imaginary image of the obstacle created is off set from an actual position of the obstacle such that an area behind the obstacle is visible beside the imaginary image of the obstacle, and said indicating means is configured to indicate the imaginary image of the obstacle and the imaginary image of the moving object side by side.

8. A surroundings monitoring device for a vehicle, which monitors a blind area within an area expanding in front of a driver on both sides, comprising:

a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means; and an indicating means operative to indicate the imaginary image of the moving object in the indication manner which is specified by the imaginary-image specifying means such that the imaginary image of the moving object indicated by the indicating means overlaps the real image picked up by the real-image picking-up means;

further comprising an imaginary light-source setting means operative to set an imaginary light source for making an imaginary shadow for the moving object, and an imaginary-shadow-image creating means operative to create an image of the imaginary shadow which is made for the moving object when the moving object is lighted with the imaginary light source set by the imaginary light-source setting means, wherein said indicating means is configured to indicate the created image of the imaginary shadow for the moving object in such a manner that the imaginary-shadow image is attached to the moving object indicated.

9. The surroundings monitoring device for a vehicle of claim 8, wherein a position of the imaginary light source set by said imaginary light-source setting means is set to be a position which substantially corresponds to the position of the sun.

10. The surroundings monitoring device for a vehicle of claim 8, wherein a position of the imaginary light source set by said imaginary light-source setting means is set to be a position which is a specified distance away from an intersection which the vehicle approaches and a specified height above a surface of a road on which the vehicle travels, the specified distance being long enough for the driver to determine that the vehicle is to be started or stopped when another vehicle approaches the vehicle.

11. The surroundings monitoring device for a vehicle of claim 10, wherein said indicating means is configured to change an indication manner of the imaginary-shadow image in accordance with a traveling location of another vehicle relative to said position which is the specified distance away from the intersection.

12. The surroundings monitoring device for a vehicle of claim 8, wherein a state of the moving object which includes at least one of the kind of the moving object, a moving speed of the moving object, and a moving direction of the moving object is configured to be detected, and said indicating means is configured to change an indication manner of the imaginary-shadow image in accordance with the state of the moving object.

13. A surroundings monitoring device for a vehicle, which monitors a blind area within an area expanding in front of a driver on both sides, comprising:

a real-image picking-up means provided at a front portion of the vehicle so as to pick up a real image of the blind area;

a moving object detecting means operative to recognize a moving object from the real image picked up by the real-image picking-up means and detect a moving state of the moving object;

an imaginary-image specifying means operative to specify an indication manner of an imaginary image which is to be indicated for showing the moving state of the moving object detected by the moving object detecting means; and an indicating means operative to indicate the imaginary image of the moving object in the indication manner which is specified by the imaginary-image specifying means such that the imaginary image of the moving object indicated by the indicating means overlaps the real image picked up by the real-image picking-up means;

further comprising a grid-image creating means operative to create an imaginary grid image for giving a sense of the width of a road to the blind area picked up by said real-image picking-up means, and an imaginary-grid image specifying means operative to specify a size, and a shape and a direction of a grid of the imaginary grid image in accordance with the real image of the blind area picked up by said real-image picking-up means, wherein said indicating means is configured to indicate the imaginary grid image so as to overlap the real image with the size, the shape and the direction specified by said imaginary-grid image specifying means, there is further provided a moving-object-state detecting means operative to detect a position and/or kind of the moving object when said moving-object detecting means detects the moving object, and said indicating means is further configured to indicate a luminous point which makes the position and/or kind of the moving object recognizable so as to overlap the imaginary grid image.

14. A surroundings monitoring device for a vehicle, which monitors a blind area within an area expanding in front of a driver on both sides, comprising:
- a real-image picking-up means provided at a front portion of the vehicle so as to pick up a real image of the blind area;
- a moving object detecting means operative to recognize a moving object from the real image picked up by the real-image picking-up means and detect a moving state of the moving object;
- an imaginary-image specifying means operative to specify an indication manner of an imaginary image which is to be indicated for showing the moving state of the moving object detected by the moving object detecting means; and
- an indicating means operative to indicate the imaginary image of the moving object in the indication manner which is specified by the imaginary-image specifying means such that the imaginary image of the moving object indicated by the indicating means overlaps the real image picked up by the real-image picking-up means;
- further comprising a grid-image creating means operative to create an imaginary grid image for giving a sense of the width of a road to the blind area picked up by said real-image picking-up means, and an imaginary-grid image specifying means operative to specify a size, and a shape and a direction of a grid of the imaginary grid image in accordance with the real image of the blind area picked up by said real-image picking-up means, wherein said indicating means is configured to indicate the imaginary grid image so as to overlap the real image with the size, the shape and the direction specified by said imaginary-grid image specifying means, there is further provided a moving-object-state detecting means operative to detect at least one of a kind, a moving speed and a moving direction of the moving object when said moving-object detecting means detects the moving object, and said indicating means is further configured to indicate an arrow which makes the moving speed and/or moving direction of the moving object recognizable so as to overlap the imaginary grid image.

* * * * *